United States Patent
Kai et al.

(12) 
(10) Patent No.: US 6,278,536 B1
(45) Date of Patent: Aug. 21, 2001

(54) OPTICAL TRANSMISSION DEVICE FOR BI-DIRECTIONAL OPTICAL COMMUNICATION

(75) Inventors: Yutaka Kai; Terumi Chikama, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/044,127

(22) Filed: Mar. 19, 1998

(30) Foreign Application Priority Data

Oct. 20, 1997 (JP) .................................................. 9-287485

(51) Int. Cl.[7] .................................................. H04J 14/02
(52) U.S. Cl. .......................... 359/127; 359/119; 359/110; 359/124
(58) Field of Search .................................... 359/124, 127, 359/128, 119, 110, 130; 385/24

(56) References Cited

U.S. PATENT DOCUMENTS

| 5,633,741 | * | 5/1997 | Giles ..................................... 359/124 |
| 5,742,416 | * | 4/1998 | Mizrahi ................................ 359/134 |
| 5,986,783 | * | 11/1999 | Sharma et al. ...................... 359/119 |
| 5,999,290 | * | 12/1999 | Li ........................................ 359/127 |

FOREIGN PATENT DOCUMENTS 7-231305    8/1995  (JP) .

* cited by examiner

Primary Examiner—Kinfe-Michael Negash
(74) Attorney, Agent, or Firm—Staas & Halsey LLP

(57) ABSTRACT

This invention discloses an optical transmission device used for bi-directional optical communications. The optical transmission device comprises a uni-directional optical signal processing unit for performing specified optical signal processing for optical signals transmitted in a single direction and a uni-direction/bi-direction changing unit for unifying the flows of clockwise and counterclockwise optical signals in a single direction, inputting these flow-unified optical signals to the uni-directional optical signal processing unit and dividing the flow of optical signals from the uni-directional optical signal processing unit between clockwise and counterclockwise directions. Bi-directional wavelength-division multiplexing optical communications can be performed by unifying the transmission routes (flows) of optical signals transmitted in two ways in a single direction and using the existing optical transmission device for uni-directional optical communications.

59 Claims, 24 Drawing Sheets

OPTICAL TRANSMISSION DEVICE FOR BI-DIRECTIONAL OPTICAL COMMUNICATION

BACKGROUND OF THE INVENTION (1) Field of the Invention

This invention relates to an optical transmission device for bi-directional optical communications, which performs bi-directional optical communications by transmitting optical signals having different wavelengths in two ways.

(2) Description of the Related Art

For a transmission type communication system designed to construct a multimedia network, an optical communication system capable of increasing transmission capacity has been used in recent years. Various multiplexing systems have been available in order to attain extra-large capacity in the optical communication system. Such multiplexing systems include, for example, a time-division multiplexing (abbreviated as TDM) transmission system, an optical time-division multiplexing (OTDM) transmission system, a wavelength-division multiplexing (WDM) transmission system, and so on.

Among these multiplexing systems, the WDM transmission system is promising, because it facilitates flexible construction of an optical communication network (lightwave network) by using an erbium-doped optical fiber amplifier (EDFA) having a wide gain band so as to perform optical level cross connection, branching/insertion of optical signals or multiplexing of various services.

In the lightwave network employing such a WDM transmission system, for example, an optical add/drop multiplexer (ADM) is used. This optical ADM includes transit points called nodes provided in the middle way of a transmission line, and enables free branching or insertion of optical signals by selectively transmitting, among multiplexed optical signals, an optical signal having a specified wavelength through the nodes and receiving the other optical signals having wavelengths different from the specified one by the nodes.

In other words, in the WDM transmission system, by utilizing the optical ADM, a speed for performing transmission among the nodes can be increased, and the network can be made flexible.

The lightwave network employing the foregoing WDM transmission system typically uses a uni-directional wavelength-division multiplexing system, which transmits optical signals by using optical fibers [single mode fiber (SMF)] individually allocated to clockwise and counterclockwise directions.

Referring to FIG. 19, there is shown an example of a wavelength-division multiplexing communication system 50 which employs the foregoing uni-directional wavelength-division multiplexing system. The wavelength-division multiplexing system 50 shown includes two opposing optical transmission devices 501 and 502 which are connected to each other by two uni-directional optical fibers 81A and 81B.

Specifically, between the optical transmission devices 501 and 502, optical signal transmission is performed as follows. Optical signals ($\lambda_1$–$\lambda_8$) are transmitted from the optical sender (OS) 80A of the optical transmission device 501. These optical signals are then received through the optical fiber 81A by the optical receiver (OR) 82A of the optical transmission device 502. Optical signals ($\lambda_1$–$\lambda_8$) are transmitted from the OS 80B of the optical transmission device 502. These optical signals are then received through the optical fiber 81B by the OR 82B of the optical transmission device 501.

Thus, in the wavelength-division multiplexing communication system 50 shown in FIG. 19, the optical fibers 81A and 81B are individually allocated to the two directions of the optical signals. All the optical signals transmitted through each of the optical fibers 81A and 81B are transmitted in the same direction.

However, in the wavelength-division multiplexing communication system 50, it may become impossible to perform normal communications between the optical transmission devices 501 and 502. This problem occurs because the transmission of the clockwise optical signals is interrupted if, among the two optical fibers 81A and 81B, for example, as shown in FIG. 20, a failure occurs in one optical fiber 81A and the communications are cut off (may be referred to as communication cut-off, hereinafter).

SUMMARY OF THE INVENTION

The present invention was made in order to solve the problems discussed above. It is an object of the invention to provide an optical transmission device for bi-directional optical communications, which enables bi-directional wavelength-division multiplexing optical communications to be performed by unifying transmission routes (flows) of optical signals transmitted in two ways in a single direction and using the existing optical transmission device for uni-directional optical communications.

In order to achieve the objective, according to an aspect of the present invention, an optical transmission device for bi-directional optical communications is provided. This optical transmission device used for bi-directional optical communications is positioned between bi-directional communication optical transmission lines for performing bi-directional optical communications by transmitting optical signals having wavelengths different between clockwise and counterclockwise directions, and performs specified optical transmission processing for optical signals transmitted through the bi-directional communication optical transmission lines. The optical transmission device used for bi-directional optical communications comprises a uni-directional optical signal processing unit for performing specified optical signal processing for optical signals transmitted in a single direction and a uni-direction/bi-direction changing unit for unifying the flows of clockwise and counterclockwise optical signals in a single direction, then inputting these flow-unified optical signals to the uni-directional optical signal processing unit and dividing the flow of optical signals from the uni-directional optical signal processing unit into two ways between clockwise and counterclockwise directions.

In the optical transmission device of the present invention used for bi-directional optical communications, the uni-directional optical signal processing unit includes at least one input port and one output port. The uni-direction/bi-direction changing unit inputs clockwise optical signals inputted through one bi-directional communication optical transmission line and counterclockwise optical signals inputted through the other bi-directional communication optical transmission line to the input port of the uni-directional optical signal processing unit. The uni-direction/bi-direction changing unit outputs, among optical signals outputted from the output port of the unidirectional optical signal processing unit, clockwise optical signals to the latter bi-directional communication optical transmission line and counterclockwise optical signals to the former bi-directional communication optical transmission line.

In the optical transmission device of the present invention used for bi-directional optical communications, the uni-direct-on/bi-direction changing unit includes an optical wavelength multiplexing unit for multiplexing clockwise and counterclockwise optical signals and outputting the multiplexed optical signals to the input port of the uni-directional optical signal processing unit, an optical wavelength demultiplexing unit for demultiplexing processed optical signals from the output port of the uni-directional optical signal processing unit into clockwise and counterclockwise optical signals, a first optical signal branching unit for branching clockwise optical signals from the former bi-directional communication optical transmission line to the optical wavelength multiplexing unit and counterclockwise optical signals obtained by demultiplexing performed in the optical wavelength demultiplexing unit to the former bi-directional communication optical transmission line, and a second optical signal branching unit for branching counterclockwise optical signals from the latter bi-directional communication optical transmission line to the optical wavelength multiplexing unit and clockwise optical signals obtained by demultiplexing performed in the optical wavelength demultiplexing unit to the latter bi-directional communication optical transmission line.

In the optical transmission device of the present invention used for bi-directional optical communications, the optical wavelength multiplexing and demultiplexing units are respectively constructed as wavelength-division multiplexing/demultiplexing type optical couplers.

In the optical transmission device of the present invention used for bi-directional optical communications, the first and second optical signal branching units are respectively constructed as optical circulators.

With the optical transmission device of the present invention used for bi-directional optical communications, which is constructed in the foregoing manner, the flows of optical signals transmitted in two ways can be unified in a signal direction by changing the network configuration. Accordingly, the invention is advantageous in that branching/insertion of optical signals transmitted in two ways or returning thereof in emergency can be normally performed by using the existing optical transmission device for uni-directional optical communications and an optical transmission device for bi-directional optical communications can be provided at low costs.

In the optical transmission device of the present invention used for bi-directional optical communications, the first and second optical signal branching units are respectively constructed as wavelength-division multiplexing/demultiplexing type optical couplers.

With the optical transmission device of the present invention used for bi-directional optical communications, since the wavelength-division multiplexing/demultiplexing type optical couplers can be included, costs can be reduced for the entire circuitry. Accordingly, costs for constructing the optical transmission device can be reduced.

In the optical transmission device of the present invention used for bi-directional optical communications, the uni-direction/bi-direction changing unit is constructed as a wavelength-division multiplexing/demultiplexing type optical coupler, which includes a first I/O port connected to one of the bi-directional communication optical transmission line, a second I/O port connected to the other bi-directional communication optical transmission line, a third I/O port connected to the input port of the uni-directional optical signal processing unit and a fourth I/O port connected to the output port of the uni-directional optical signal processing unit. The wavelength-division multiplexing/demultiplexing type optical coupler multiplexes the wavelengths of clockwise optical signals inputted to the first I/O port with those of counterclockwise optical signals inputted to the second I/O port and outputs the multiplexed optical signals to the third I/O port. Also, this optical coupler outputs, among processed optical signals inputted to the fourth I/O port, clockwise optical signals to the second I/O port and counterclockwise optical signals to the first I/O port.

With the optical transmission device of the present invention used for bi-directional optical communications, since the flows of optical signals transmitted in two ways are unified in a single direction or two directions by using the wavelength-division multiplexing/demultiplexing type optical coupler, the circuitry can be simplified. Accordingly, the entire optical communication system can be reduced in size.

In the optical transmission device of the present invention used for bi-directional optical communications, the uni-directional optical signal processing unit includes a batch distribution compensating unit for batch-compensating for distribution of clockwise and counterclockwise optical signals flow-unified in a single direction by the uni-direction/bi-direction changing unit.

With the optical transmission device of the present invention used for bi-direction optical communications, since the distribution of clockwise and counterclockwise optical signals is batch-compensated for, the circuitry can be simplified in this case, as well.

In the optical transmission device of the present invention used for bi-directional optical communications, the uni-direction/bi-direction changing unit includes an individual distribution compensating unit for individually compensating for distribution of clockwise and counterclockwise optical signals.

In the optical transmission device of the present invention used for bi-directional optical communications, the individual distribution compensating unit includes a first distribution compensator for compensating for the distribution of clockwise optical signals before the flows of clockwise and counterclockwise optical signals are unified in a single direction and a second distribution compensator for compensating for the distribution of the counterclockwise optical signals before the flows of the clockwise and counterclockwise optical signals are unified in a single direction.

With the optical transmission device of the present invention used for bi-directional optical communications, since the distribution of clockwise and counterclockwise optical signals is individually compensated for, a distance between the nodes can be freely set without keeping the distance constant. Accordingly, the degree of flexibility for constructing a system can be increased.

In the optical transmission device of the present invention used for bi-directional optical communications, the uni-directional optical signal processing unit includes an optical signal level adjusting unit for keeping constant the signal levels of optical signals of respective wavelengths.

In the optical transmission device of the present invention used for bi-directional optical communications, the optical signal level adjusting unit includes a plurality of optical attenuators for adjusting the attenuation degrees of optical signals by wavelength units.

In the optical transmission device of the present invention used for bi-directional optical communications, the unidirectional optical signal processing unit includes an add/drop processing unit for performing branching/insertion by wavelength units for optical signals flow-unified in a single direction by the uni-direction/bi-direction changing unit.

In the optical transmission device of the present invention used for bi-directional optical communications, the add/drop processing unit includes an optical wavelength demultiplexer for demultiplexing inputted optical signals by wavelength units, a plurality of branching optical switches for branching, by wavelength units, the optical signals obtained by demultiplexing performed in the optical wavelength demultiplexer, a plurality of insertion optical signals for inserting optical signals having wavelengths equal to those of the optical signals branched by the branching optical signals and an optical wavelength multiplexer for multiplexing the optical signals inputted by the insertion optical switches.

In the optical transmission device of the present invention used for bi-directional optical communications, the uni-directional optical signal processing unit includes an optical amplifier for amplifying optical signals flow-unified in a single direction by the uni-direction/bi-direction changing unit.

With the optical transmission device of the present invention used for bi-directional optical communications, since branching/insertion is performed by wavelength units for the optical signals flow-unified in a single direction by the uni-directional optical signal processing unit, signals carrying information can be processed in optical conditions. Accordingly, a processing speed of the optical transmission device can be increased.

In the optical transmission device of the present invention used for bi-directional optical communications, the add/drop processing unit includes an acousto-optical tunable filter for branching optical signals of desired wavelengths by impressing frequency signals equivalent to the wavelengths of the optical signals to be branched and a light source for producing optical signals of wavelengths to be inserted.

With the optical transmission device of the present invention used for bi-directional optical communications, since branching/insertion can be performed for optical signals by using the acousto-optical tunable filter, the degree of flexibility for constructing a system can be increased.

In the optical transmission device of the present invention used for bi-directional optical communications, the uni-directional optical signal processing unit includes a spectrum monitoring unit for monitoring the spectral states of processed optical signals flow-unified in a single direction by the uni-direction/bi-direction changing unit.

With the optical transmission device of the present invention used for bi-directional optical communications, since the spectral states of the processed optical signals flow-unified in a single direction are monitored, the situation of transmitted optical signals can always be identified. Accordingly, power variance, and so on, among the transmitted optical signals can be surely corrected.

The optical transmission device of the present invention used for bi-directional optical communications further comprises an emergency uni-direction/bi-direction changing unit, which is positioned between emergency bi-directional communication optical transmission lines. These emergency bi-directional communication optical transmission lines are used, in an emergency when bi-directional communications by the bi-directional communication optical transmission lines are made impossible, for performing the bi-directional communications instead of the bi-direction communication transmission lines. The emergency uni-direction/bi-direction changing unit flow-unifies clockwise and counterclockwise optical signals in a single direction, the clockwise optical signals being inputted through one emergency bi-directional communication optical transmission line and counterclockwise optical signals being inputted through the other emergency bi-directional communication optical transmission line in the emergency. The uni—direction/bi-direction changing units then inputs these flow-unified optical signals to the uni-directional optical signal processing unit. The emergency uni-direction/bi-direction changing unit also divides the flow of optical signals supplied from the unidirectional optical signal processing unit into two ways, that is, between clockwise and counterclockwise directions.

In the optical transmission device of the present invention used for bi-directional optical communications, the uni-directional optical signal processing unit includes at least one emergency input port and one emergency output port. The emergency uni-direction/bi-direction changing unit outputs clockwise and counterclockwise optical signals to the emergency input port of the unidirectional optical signal processing unit, the clockwise optical signals being inputted through one emergency bi-directional communication optical transmission line and counterclockwise optical signals being inputted through the other emergency bi-directional communication optical transmission line in the emergency. The emergency uni-direction/bi-direction changing unit also outputs, among optical signals outputted from the emergency output port of the uni-directional optical signal processing unit, clockwise optical signals to the latter emergency bi-directional communication optical transmission line and counterclockwise optical signals to the former emergency bi-directional communication optical transmission line.

In the optical transmission device of the present invention used for bi-directional optical communications, the emergency uni-direction/bi-direction changing unit includes an emergency optical wavelength multiplexing unit for multiplexing clockwise and counterclockwise optical signals, the clockwise optical signals being inputted through one of the emergency bi-directional communication optical transmission lines and the counterclockwise optical signals being inputted through the other emergency bi-directional communication optical transmission line in the emergency, and outputting the multiplexed optical signals to the emergency input port of the uni-directional optical signal processing unit, an emergency optical wavelength demultiplexing unit for demultiplexing optical signals from the emergency output port of the uni-directional optical signal processing unit into clockwise and counterclockwise optical signals, a first emergency optical signal branching unit for branching clockwise optical signals from the former emergency bi-directional communication optical transmission line to the emergency optical wavelength multiplexing unit and counterclockwise optical signals obtained by demultiplexing performed in the emergency optical wavelength demultiplexing unit to the former emergency bi-directional communication optical transmission line, and a second emergency optical signal branching unit for branching counterclockwise optical signals from the latter emergency bi-directional communication optical transmission line to the emergency optical wavelength multiplexing unit and clockwise optical signals obtained by demultiplexing performed in the emergency optical wavelength demultiplexing unit to the latter emergency bi-directional communication optical transmission line.

In the optical transmission device of the present invention used for bi-directional optical communications, the emergency optical wavelength multiplexing and demultiplexing units are respectively constructed as wavelength-division multiplexing/demultiplexing type optical couplers.

In the optical transmission device of the present invention used for bi-directional optical communications, the first and second emergency optical signal branching units are respectively constructed as optical circulators.

With the optical transmission device of the present invention used for bi-directional optical communications, since specified optical transmission processing can be performed in an emergency as in the case of a normal time, constant throughput can always be maintained. Accordingly, the transmission performance of the optical transmission device can be increased.

In the optical transmission device of the present invention used for bi-directional optical communications, the first and second emergency optical signal branching units are respectively constructed as wavelength-division multiplexing/demultiplexing type optical couplers.

With the optical transmission device of the present invention used for bi-directional optical communications, since the wavelength-division multiplexing/demultiplexing type optical couplers are included, costs for the entire circuitry can be reduced. Accordingly, costs for constructing the optical transmission device can be reduced.

In the optical transmission device of the present invention used for bi-directional optical communications, the uni-direction/bi-direction changing unit is constructed as a wavelength-division multiplexing/demultiplexing type optical coupler, which includes a first emergency I/O port connected to one of the emergency bi-directional communication optical transmission lines, a second emergency I/O port connected to the other emergency bi-directional communication optical transmission line, a third emergency I/O port connected to the emergency input port of the uni-directional optical signal processing unit and a fourth emergency I/O port connected to the emergency output port of the uni-directional optical signal processing unit. The wavelength-division multiplexing/demultiplexing type optical coupler multiplexes the wavelengths of clockwise optical signals inputted to the first emergency I/O port with those of counterclockwise optical signals inputted to the second emergency I/O port and outputs the multiplexed optical signals to the third emergency I/O port. The wavelength-division multiplexing/demultiplexing type optical coupler also outputs, among optical signals inputted to the fourth emergency I/O port, clockwise optical signals to the second emergency I/O port and counterclockwise optical signals to the first emergency I/O port.

With the optical transmission device of the present invention used for bi-directional optical communications, since the flows of optical signals transmitted in two ways are unified in a single direction or divided between two directions by using the wavelength-division multiplexing/demultiplexing type optical coupler, the circuitry can be simplified. Accordingly, the entire optical communication system can be reduced in size.

In the optical transmission device of the present invention used for bi-directional optical communications, the unidirectional optical signal processing units includes a uni-directional returning optical switch for returning clockwise or counterclockwise optical signals inputted from the uni-direction/bi-direction changing unit in the emergency to the emergency bi-directional communication optical transmission line side. The emergency uni-directional/bi-directional changing unit outputs the clockwise optical signals returned by the uni-directional returning optical switch to the foregoing latter emergency bi-directional communication optical transmission line and the counterclockwise optical signals returned by the uni-directional returning optical switch to the foregoing former emergency bi-directional communication optical transmission line.

With the optical transmission device of the present invention used for bi-direction optical communications, since the transmission direction of the inputted clockwise or counterclockwise optical signals is switched, separation of transmission directions between a normal time and an emergency can be facilitated. Accordingly, the processing speed of the optical transmission device can be increased.

In the optical transmission device of the present invention used for bi-directional optical communications, the uni-directional optical signal processing unit includes an emergency optical level adjusting unit for keeping constant the signal level of each wavelength optical signal returned by the uni-directional returning optical switch in the emergency.

In the optical transmission device of the present invention used for bi-directional optical communications, the emergency optical level adjusting unit is constructed as a gain equalizer for adjusting the gains of optical signals by wavelength units.

With the optical transmission device of the present invention used for bi-directional optical communications, since the signal levels of the optical signals returned in the emergency are kept constant, variance in wavelengths among the optical signals can be surely eliminated. Accordingly, highly accurate optical signals can be transmitted.

In order to achieve the objective, according to another aspect of the present invention, an optical transmission device for bi-directional optical communications is provided. This optical transmission device used for bi-directional optical communications is positioned between bi-directional communication optical transmission lines for performing bi-directional optical communications by transmitting optical signals having wavelengths different between clockwise and counterclockwise directions, and performs specified optical transmission processing for optical signals transmitted through the bi-directional communication optical transmission lines. The optical transmission device used for bi-directional optical communications comprises a first optical signal processing unit for performing specified optical signal processing for clockwise optical signals, a second optical signal processing unit for performing specified optical signal processing for counterclockwise optical signals, a first branching unit for branching clockwise optical signals inputted through one of the bi-directional communication optical transmission lines to the first optical signal processing unit and counterclockwise optical signals from the second optical signal processing unit to the same bi-directional communication optical transmission line and a second branching unit for branching counterclockwise optical signals inputted through the other bi-directional communication optical transmission line to the second optical signal processing unit and clockwise optical signals from the first optical signal processing unit to this other bi-directional communication optical transmission line.

The optical transmission device of the present invention used for bi-directional optical communications further comprises emergency bi-directional communication optical transmission lines for performing, in an emergency when bi-directional communications through the bi-directional communication optical transmission lines are made impossible, the bi-directional communications instead of the bi-directional communication optical transmission lines, the optical transmission device being positioned between these emergency bi-directional optical transmission lines. The first optical signal processing unit includes a first returning optical switch for returning, when bi-directional communications through the latter bi-directional optical transmission line are made impossible, the clockwise optical signals inputted through the former bi-directional communication optical transmission line to one of the emergency bi-directional communication optical transmission lines. The second optical signal processing unit includes a second returning optical switch for returning, when bi-directional communications through the former bi-directional communication optical transmission line are made impossible, the counterclockwise optical signals inputted through the latter bi-directional communication optical transmission line to the other emergency bi-direction communication optical transmission line.

The optical transmission device of the present invention used for bi-directional optical communications further comprises a third branching unit for branching the clockwise optical signals returned by another optical transmission device and inputted through the latter emergency bi-directional directional communication optical transmission line in the emergency to the first optical signal processing unit and the counterclockwise optical signals from the second optical processing unit to the latter emergency bi-directional communication optical transmission line, and a fourth branching unit for branching the counterclockwise optical signals returned by another optical transmission device and inputted through the former emergency communication optical transmission line in the emergency to the second optical signal processing unit and the clockwise optical signals from the first optical signal processing unit to the former emergency bi-directional communication optical transmission line.

With the optical transmission device of the present invention used for bi-directional optical communications, since optical signals transmitted from two directions are individually processed, the number of optical signals to be processed can be reduced. Accordingly, specified optical transmission processing speeds in the first and second optical signal processing units can be increased.

In the optical transmission device of the present invention used for bi-directional optical communications, the first optical signal processing unit includes a third distribution compensator for compensating for the distribution of clockwise optical signals inputted through one of the bi-directional communication optical transmission lines. The second optical signal processing unit includes a fourth distribution compensator for compensating for the distribution of counterclockwise optical signals inputted through the other bi-directional communication optical transmission line.

In the optical transmission device of the present invention used for bi-directional optical communications, the first optical signal processing unit includes a fifth distribution compensator for compensating for the distribution of clockwise optical signals returned by another optical transmission device and inputted through the latter emergency bi-directional communication optical transmission line in the emergency. The second optical signal processing unit includes a sixth distribution compensator for compensating for the distribution of counterclockwise optical signals returned by another optical transmission device and inputted through the former emergency bi-directional communication optical transmission line in the emergency.

In the optical transmission device of the present invention used for bi-directional optical communications, the first optical signal processing unit includes a third distribution compensator for compensating for the distribution of clockwise optical signals inputted through one of the bi-directional communication optical transmission lines and a fifth distribution compensator for compensating for the distribution of clockwise optical signals returned by another optical transmission device and inputted through the latter emergency bi-directional communication optical transmission line in the emergency. The second optical processing unit includes a fourth distribution compensator for compensating for the distribution of counterclockwise optical signals inputted through the other bi-direction communication optical transmission line and a sixth distribution compensator for compensating for counterclockwise optical signals returned by another optical transmission device and inputted through the former emergency bi-directional communication optical transmission line in the emergency.

With the optical transmission device of the present invention used for bi-directional optical communications, since distribution compensation is performed for each of the clockwise and counterclockwise optical signals of a normal time and the clockwise and counterclockwise optical signals in an emergency, distances among nodes need not be kept constant. Accordingly, the degree of flexibility for constructing an optical communication network can be increased.

The optical transmission device of the present invention used for bi-directional optical communications further comprises a spectrum monitoring unit for monitoring the spectral state of each of the clockwise optical signals processed by the first optical signal processing unit at a normal time, the counterclockwise optical signals processed by the second optical signal processing unit at a normal time, the clockwise optical signals processed by the first optical signal processing unit in the emergency and the counterclockwise optical signals processed by the second optical signal processing unit in the emergency.

In the optical transmission device of the present invention used for bi-directional optical communications, the spectrum monitoring unit alternately monitors the spectral states of the optical signals at the normal time and those of the optical signals in the emergency at specified cycles.

With the optical transmission device of the present invention used for bi-directional optical communications, since the spectral states of clockwise and counterclockwise optical signals at a normal time and those of clockwise and counterclockwise optical signals in an emergency are monitored altogether by one spectrum monitoring unit, the circuitry can be reduced in size and costs.

In the optical transmission device of the present invention used for bi-directional optical communications, the first and second optical signal processing units each includes an add/drop processing unit for performing branching/insertion for inputted optical signals by wavelength units.

In the optical transmission device of the present invention used for bi-directional optical communications, the add/drop processing unit includes an optical wavelength demultiplexer for demultiplexing inputted optical signals by wavelength units, a plurality of branching optical switches for branching the optical signals demultiplexed by the optical wavelength demultiplexer by wavelength units, a plurality of insertion optical switches for inserting optical signals having wavelengths equal to the wavelengths of the optical signals branched by the branching optical switches and an optical wavelength multiplexer for multiplexing the wavelengths of the optical signals inputted by the insertion optical switches.

With the optical transmission device of the present invention used for bi-directional optical communications, since the first and second optical signal processing units respectively perform branching/insertion for optical signals by wavelength units, signals carrying information regarding clockwise and counterclockwise optical signals can be individually processed in optical conditions. Accordingly, the processing speed of the optical transmission device can be increased.

In the optical transmission device of the present invention used for bi-directional optical communications, the add/drop processing units includes an acousto-optical tunable filter for branching optical signals of desired wavelengths by impressing frequency signals equivalent to the wavelengths of the optical signals to be branched and a light source for producing optical signals of wavelengths to be inserted.

With the optical transmission device of the present invention used for bi-directional optical communications, since branching/insertion can be performed for optical signals by using the acousto-optical tunable filter as well, the degree of flexibility for constructing a system can be increased.

In the optical transmission device of the present invention used for bi-directional optical communications, the first and second optical signal processing units each includes an optical signal level adjusting unit for keeping constant the signal levels of optical signals of respective wavelengths.

In the optical transmission device of the present invention used for bi-directional optical communications, the optical signal level adjusting unit includes a plurality of optical attenuators for adjusting the attenuation degrees of optical signals by wavelength units.

In the optical transmission device of the present invention used for bi-directional optical communications, the first and second optical signal processing unit each includes an optical amplifier for amplifying inputted optical signals.

With the optical transmission device of the present invention used for bi-directional optical communications, since the first and second optical signal processing units respectively perform branching/insertion for optical signals by wavelength units, signals carrying information regarding clockwise and counterclockwise optical signals can be individually processed in optical conditions. Accordingly, the processing speed of the optical transmission device can be increased.

In the optical transmission device of the present invention used for bi-directional optical communications, the first and second optical signal processing units each includes an emergency optical signal level adjusting unit for keeping constant the signal levels of the optical signals of wavelengths respectively returned to the emergency bi-directional communication optical transmission lines by the first and second returning switches in the emergency.

In the optical transmission device of the present invention used for bi-directional optical communications, the emergency optical signal level adjusting unit is constructed as a gain equalizer for adjusting the gains of optical signals by wavelength units.

With the optical transmission device of the present invention used for bi-directional optical transmissions, since the first and second optical signal processing units respectively keep constant the signal levels of optical signals returned in an emergency, variance in wavelength among optical signals can be surely eliminated. Accordingly, highly accurate optical signals can be transmitted.

BRIEF DESCRIPTION OF THE DRAWINGS

These and other objects, features and advantages of the present invention will become more apparent upon reading of the following detailed description and drawings, in which.

DESCRIPTION OF THE PREFERRED EMBODIMENTS

Before describing the concrete embodiments, a description will now be made on a wavelength-division multiplexing communication system to which a uni-directional wavelength-division multiplexing system or a bi-directional wavelength-division multiplexing system is applied.

Figure 20:
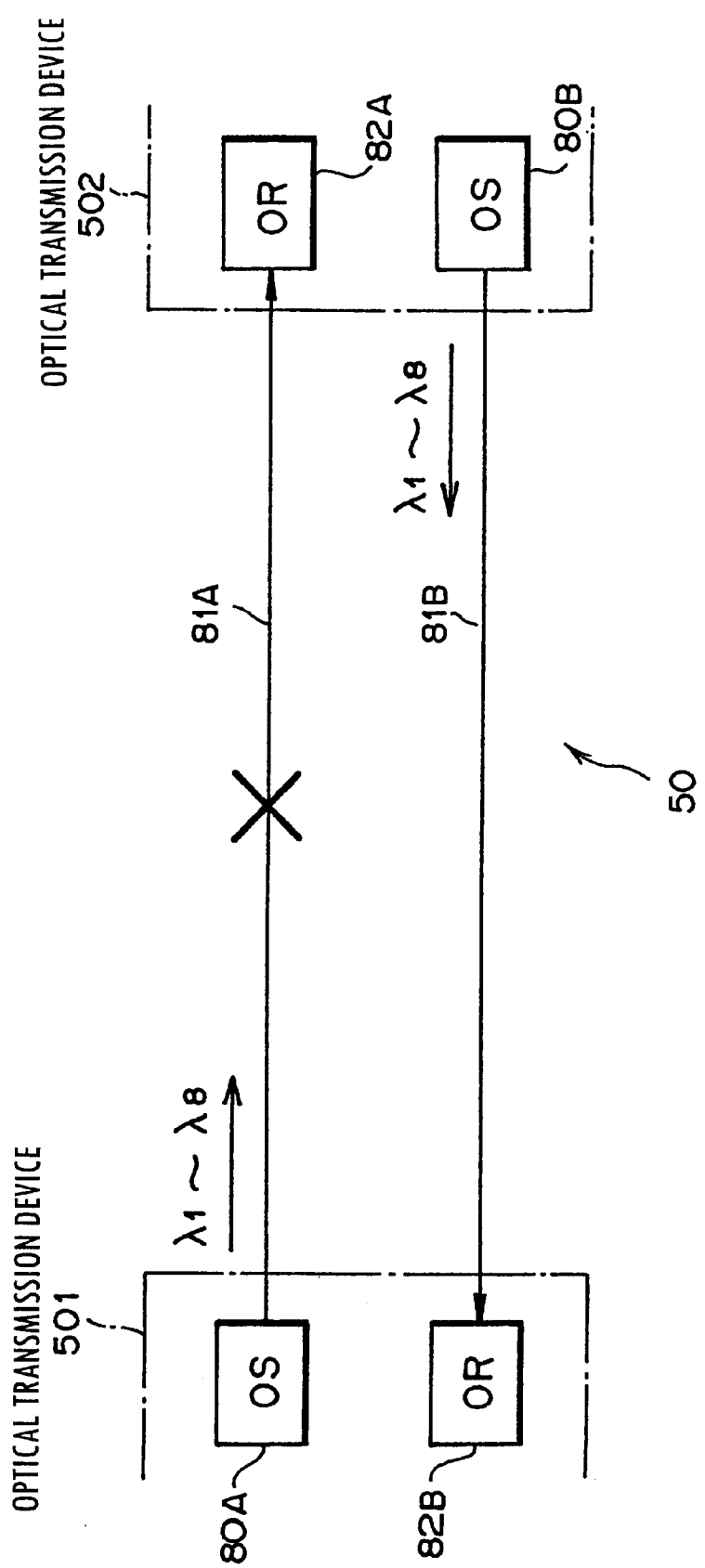
FIG. 20 is a view illustrating an emergency operation performed in the wavelength-di vision multiplexing communication system show n in FIG. 19.

First, in a wavelength-division multiplexing communication system employing a uni-directional wavelength-division multiplexing system, a 4 fiber bi-directional line switched ring (BLSR) network or a uni-directional path switched ring (UPSR) network may be provided in order to prevent the communication disability as described above with reference to FIG. 20. The 4 fiber BLSR network includes optical fibers to be used when a failure occurs. The UPSR network limits transmission capacity of optical fibers used for actual communications so as to use remaining transmission capacity when a failure occurs.

Figure 21:
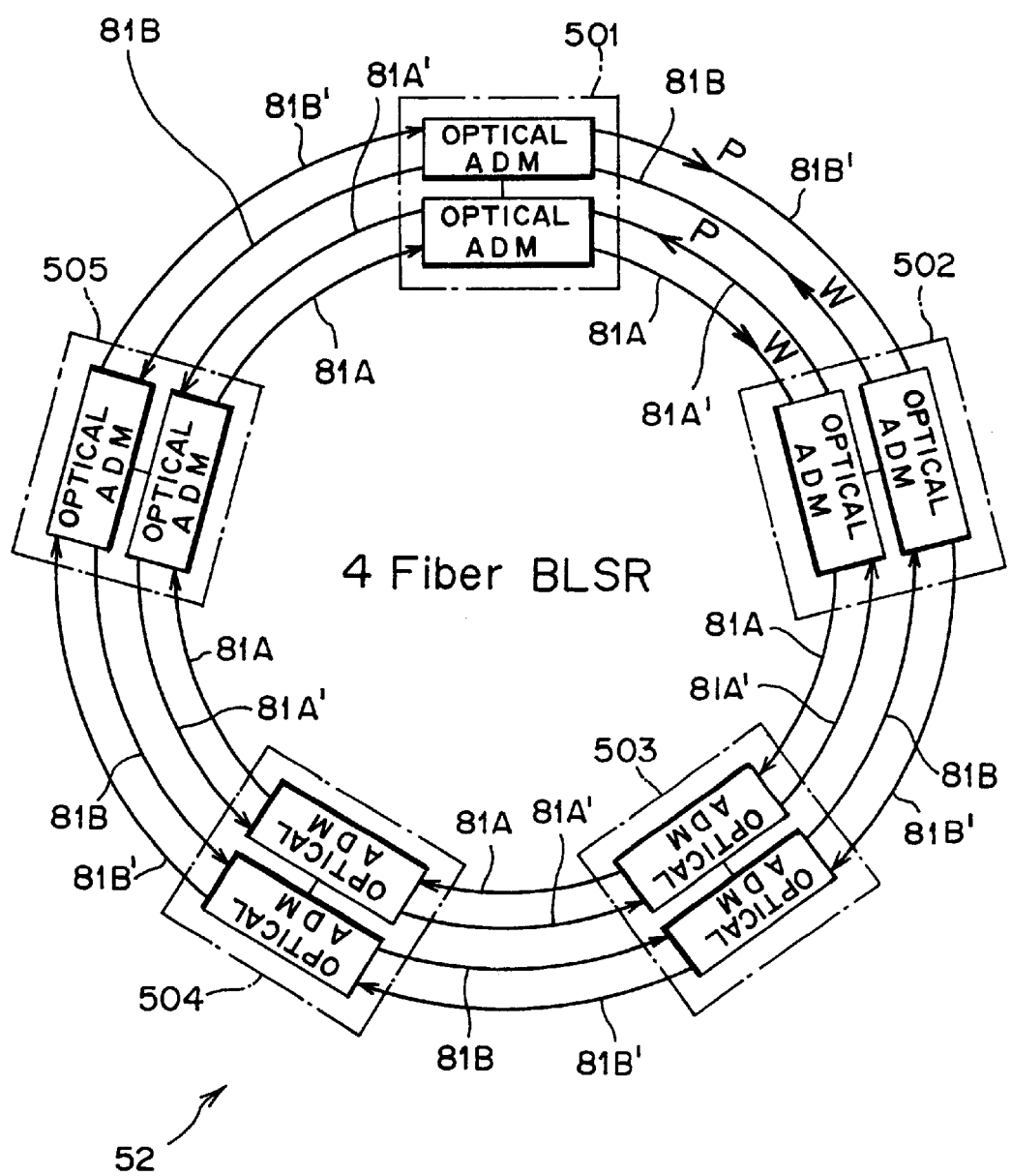
FIG. 21 is a block diagram showing a constitution of a 4 fiber BLSR network of a typical wavelength-division multiplexing communication system.

Referring to FIG. 21, there is shown an example of a 4 fiber BLSR network. The 4 fiber BLSR network 52 shown includes optical transmission devices (optical ADM) 501 to 505 and unidirectional optical fibers 81A, 81A', 81B and 81B' used for making connections among the optical ADM devices 501 to 505.

Specifically, the 4 fiber BLSR network 52 usually transmits clockwise optical signals by using the working (W; work) optical fiber 81A and counterclockwise optical signals by using the optical fiber 81B. If a failure occurs, the 4 fiber BLSR network 52 transmits the clockwise optical signals by using the optical fiber 81A' for emergency (P; protection) and the counterclockwise optical signals by using the optical fiber 81B'.

For example, if a failure occurs between the optical ADM devices 501 and 502, the clockwise optical signals are returned to the optical ADM device 501 and transmitted through the optical fiber 81A' for emergency. In other words, the clockwise optical signals directed to the optical ADM device 502 are returned to the optical ADM device 501 and then transmitted through the optical ADM devices 505, 504 and 503 to the optical ADM device 502.

On the other hand, the counterclockwise optical signals directed to the optical ADM device 501 are returned to the optical ADM device 502. The counterclockwise optical signals are then transmitted, by using the optical fiber 81B' for emergency, through the optical ADM devices 503, 504 and 505 to the optical ADM device 501.

Accordingly, in the 4 fiber BLSR network 52 shown in FIG. 21, even if communications are cut off in certain areas in the optical fibers 81A and 81B through which optical communications are performed, the optical communications can be continued without reducing overall throughput.

Figure 22:
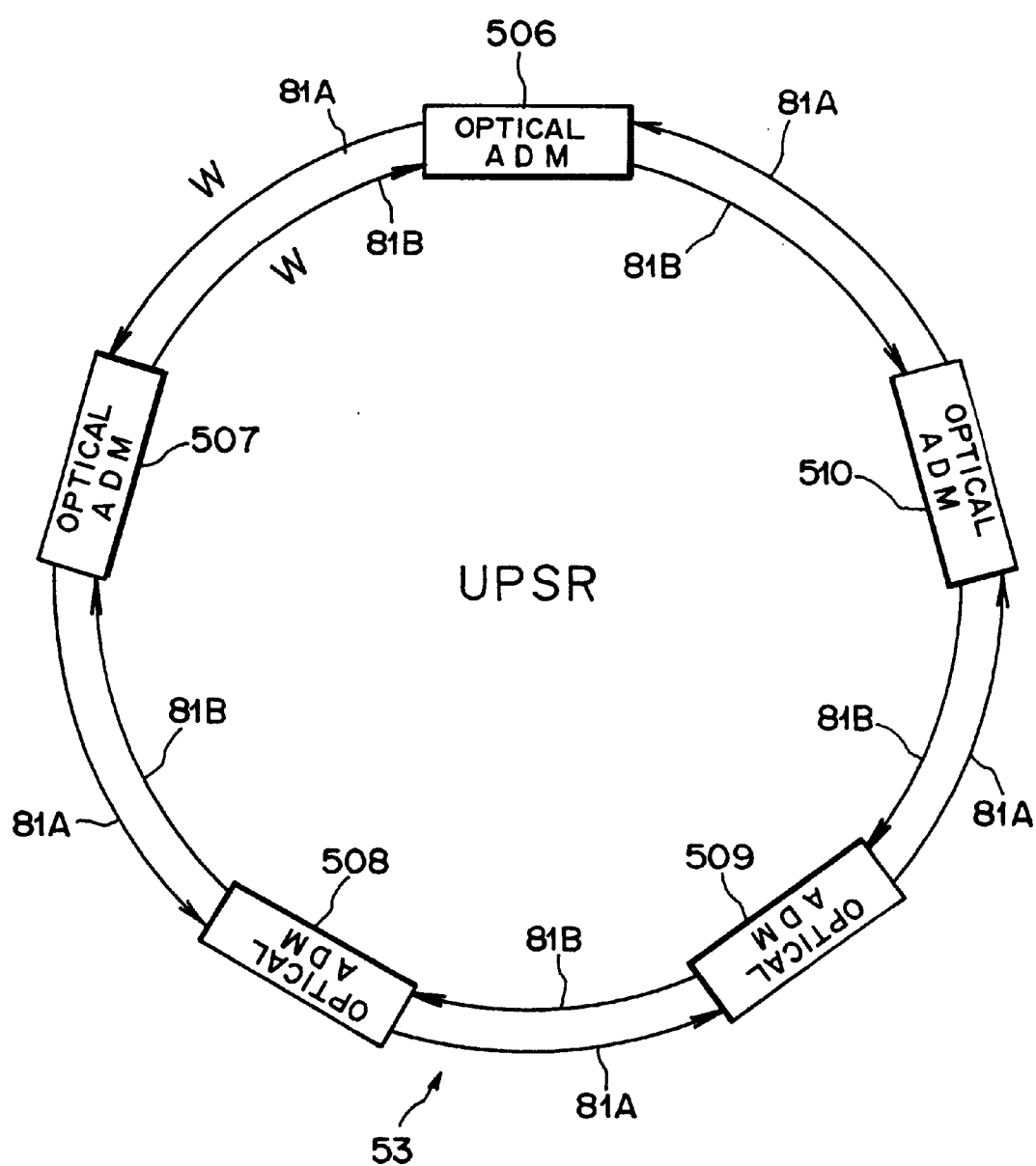
FIG. 22 is a block diagram showing a constitution of a UPSR network of the typical wavelength-division multiplexing communication system.

Referring to FIG. 22, there is shown an example of a UPSR network. The UPSR network 53 shown includes optical ADM devices 506 to 510 and optical fibers 81A and 81B allocated to clockwise and counterclockwise directions one for each. The 4 fiber BLSR network 52 described above with reference to FIG. 21 is constructed by including four optical fibers 81A, 81A', 81B and 81B'. The UPSR network 53 described herein, however, can be constructed by including two optical fibers 81A and 81B.

Specifically, the UPSR network 53 usually performs communications by using half of overall transmission capacity of the transmission system (optical ADM devices 506 to 510 and optical fibers 81A and 81B). For example, if overall transmission capacity of the transmission system is 10 Gb/s, communications are performed by using transmission capacity of 5 Gb/s for each of clockwise and counterclockwise directions.

The remaining half of the transmission capacity which is not usually used is for emergency purposes. Accordingly, by making full use of overall transmission capacity of the system, communication disability can be prevented. In this case, however, since the foregoing remaining half of the transmission capacity is exclusively used for a failed area, throughput may be reduced.

In the plurality of optical ADM devices 501 to 510 constituting the networks 52 and 53 shown in FIGS. 21 and 22, specified optical transmission processing (optical ADM processing) is performed for inputted uni-directional optical signals.

In other words, each of the optical ADM devices 501 to 510 performs branching (Drop) of an optical signal having a wavelength necessary for its own device or insertion (Add) of the branched wavelength optical signal.

For the foregoing Add/Drop processing, means using an acousto-optical tunable filter (AOTF) is available. Specifically, this AOTF performs, by controlling the frequency of an inputted RF signal, branching/insertion of a wavelength corresponding to this frequency. By inputting a RF frequency corresponding to the wavelength of an optical signal to be branched to the AOTF, an optional wavelength can be branched.

A wavelength-division multiplexing communication system employing a bi-directional wavelength-division multiplexing system transmits, unlike the uni-directional wavelength-division multiplexing system for transmitting optical signals by using the optical fibers individually allocated to two directions as described above, optical signals in two ways by one optical fiber.

Figure 23:
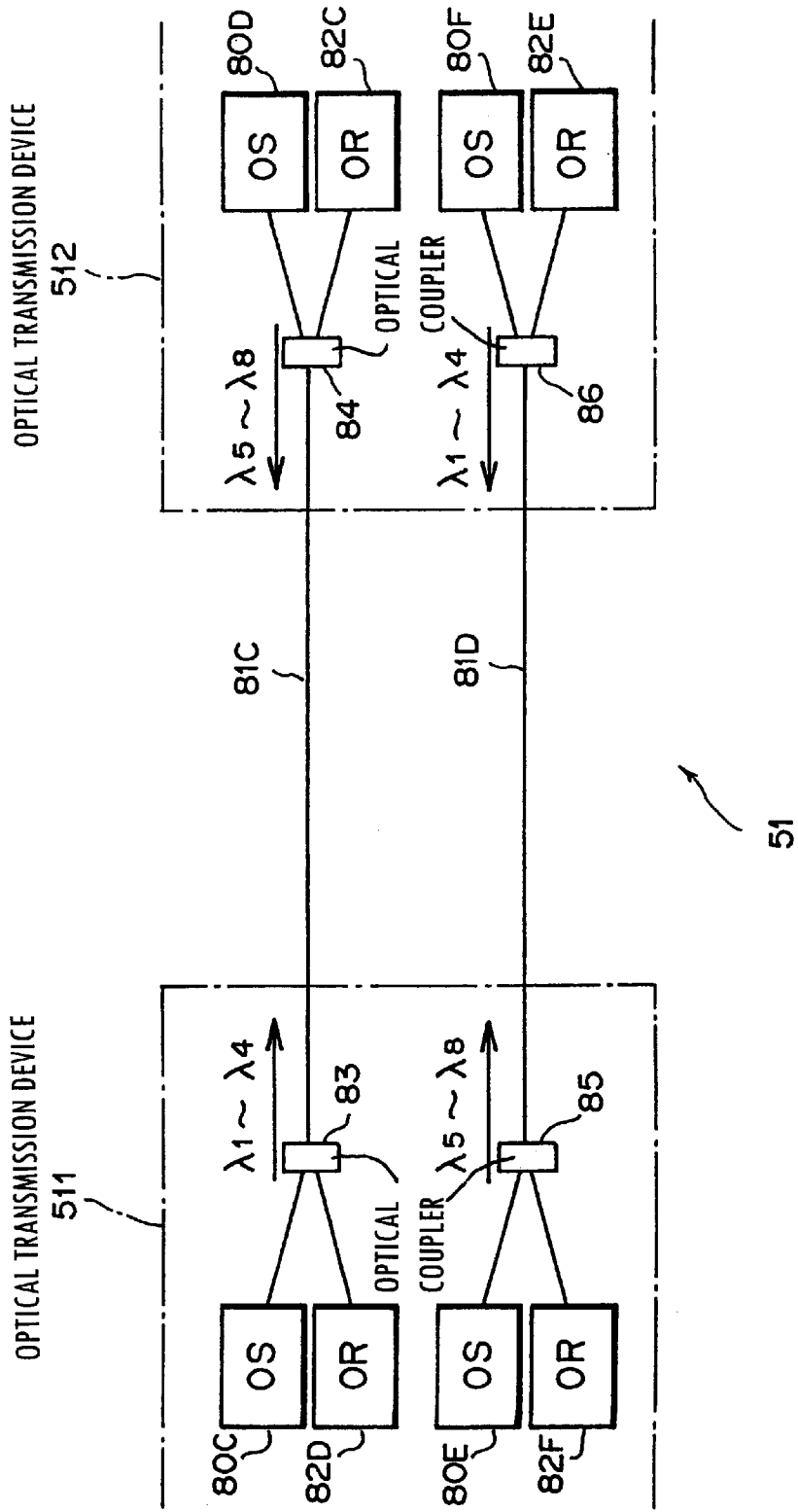
FIG. 23 is a block diagram showing a constitution of a wavelength-division multiplexing communication system employing a bi-directional wavelength-division multiplexing system.

Referring to FIG. 23, there is shown an example of a wavelength-division multiplexing communication system (network) which employs such a bi-directional wavelength-division multiplexing system. Optical signals having wavelengths $\lambda_1$–$\lambda_4$ and optical signals having wavelengths $\lambda_5$–$\lambda_8$ are transmitted through optical fibers 81C and 81D between optical transmission devices 511 and 512.

Specifically, in the wavelength-division multiplexing communication system 51 shown in FIG. 23, in the case of the optical fiber 81C, the optical signals ($\lambda_1$–$\lambda_4$) outputted from the OS 80C of the optical transmission device 511 are transmitted through a WDM optical coupler 83 and the optical fiber 81C. These optical signals are then received through a WDM optical coupler 84 by the OR 82C of the opposing optical transmission device 512.

On the other hand, optical signals ($\lambda_5$–$\lambda_8$) outputted from the OS 80D of the optical transmission device 512 are transmitted through the WDM optical coupler 84 and the optical fiber 81C. These optical signals are then received through the WDM optical coupler 83 by the OR 82D of the optical transmission device 511.

In the case of the optical fiber 81D, optical signals ($\lambda_1$–$\lambda_4$) outputted from the OS 80F of the optical transmission device 512 are transmitted through a WDM optical coupler 86 and the optical fiber 81D. These optical signals are then received through a WDM optical coupler 85 by the OR 82F of the optical transmission device 511.

Optical signals ($\lambda_5$–$\lambda_8$) outputted from the OS 80E of the optical transmission device 511 are transmitted through the WDM optical coupler 85 and the optical fiber 81D. These optical signals are then received through the WDM optical coupler 86 by the OR 82E of the optical transmission device 512.

Thus, in the wavelength-division multiplexing communication system 51 shown in FIG. 23, two-way optical signals can be transmitted by using the identical optical fibers 81C and 81D.

Figure 24:
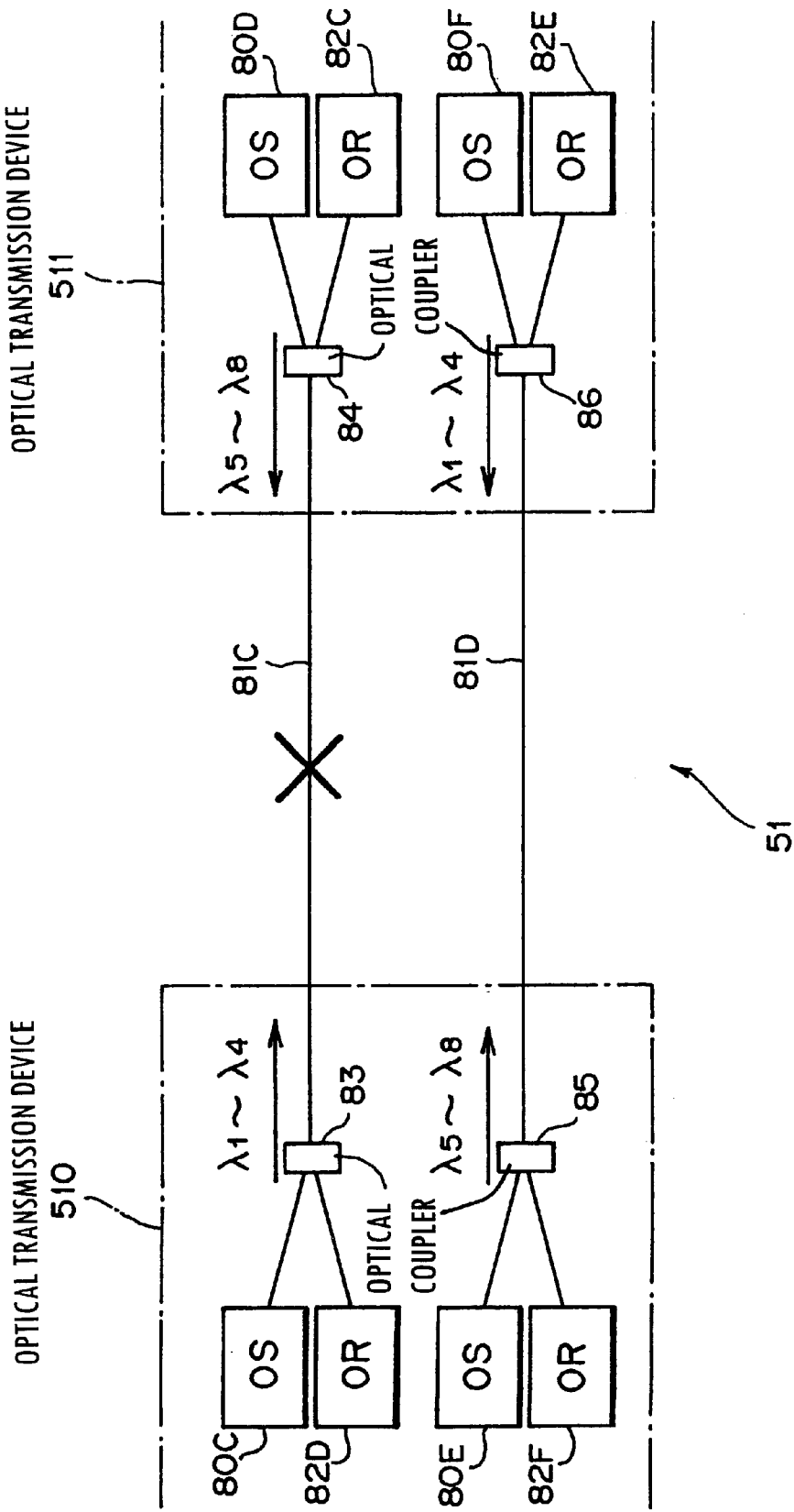
FIG. 24 is a view illustrating an emergency operation performed in the wavelength-division multiplexing communication system shown in FIG. 23.

Even if communications are cut off by the occurrence of a failure in one of the two optical fibers 81C and 81D, for example in the optical fiber 81C as shown in FIG. 24, the other optical fiber 81D normally functions. Accordingly, the communications can be continued without any interruption. In this case, however, transmission capacity of optical signals is half of the capacity at a normal time.

As described above, in the wavelength-division multiplexing communication system 51 employing the bi-directional wavelength-division multiplexing system which allows optical signals to be transmitted in two ways, communications can be continued even if a failure occurs. Accordingly, compared with the wavelength-division multiplexing communication system 50 employing the uni-directional wavelength-division multiplexing system, the wavelength-division multiplexing communication system 51 is advantageous in that communications may be performed without switching to the optical fiber 81A' or 81B' for emergency or limiting transmission capacity.

However, assuming that the foregoing unidirectional optical ADM devices 501 to 505 are used in the bi-directional wavelength-division multiplexing communication system 51, in the uni-directional optical ADM devices 501 to 505, optical signal processing including branching/insertion of an optical signal of each wavelength or alternative transmission of an optical signal through the protection side optical fiber 81A' or 81B' used for emergency can only be performed for optical signals of one of two directions.

In other words, the uni-directional ADM devices 501 to 505 are constructed to perform specified optical ADM processing (i.e., branching/insertion, distribution compensation performed together with branching/insertion or amplifying) only for optical signals transmitted in a single direction. Consequently, in the uni-directional optical ADM devices 501 to 505 employing the optical fibers 81C and 81D used for two-way transmission, even if the foregoing processing can be performed for, among optical signals transmitted in two ways, the optical signals transmitted in one direction (forward direction), processing for the optical signals transmitted in a reverse direction is backward and thus the foregoing processing cannot be performed.

Furthermore, assuming that the uni-directional optical ADM devices 501 to 505 are constructed by using the foregoing AOTF, since a port for branching/insertion processing is predetermined in the AOTF, branching/insertion cannot be performed for optical signals transmitted from the reverse direction.

The present invention was made to solve the above problems, and a detailed description of the embodiments will be made hereunder.

(a) First Embodiment of the Invention

The first embodiment of the present invention will now be described with reference to the accompanying drawings.

Figure 1:
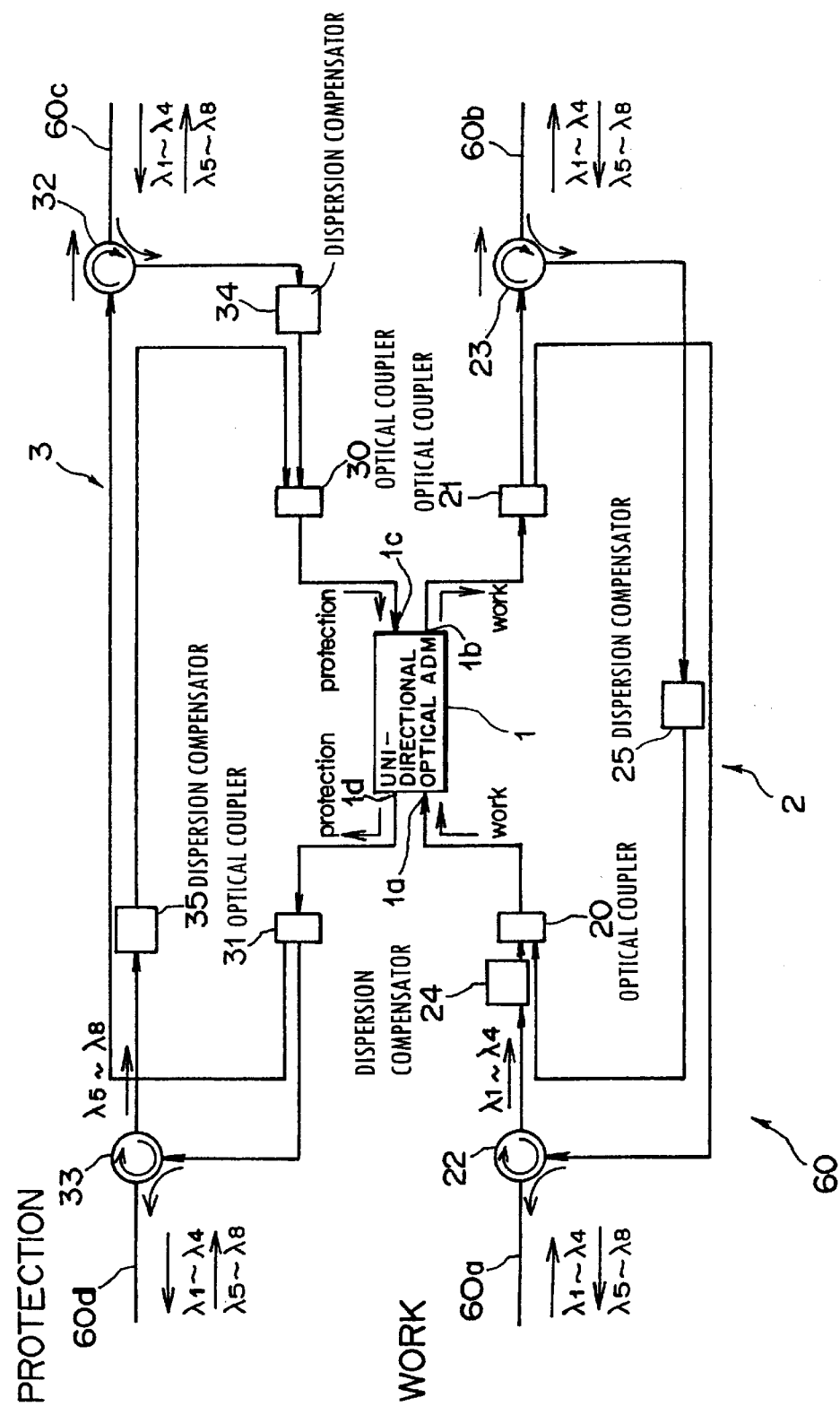
FIG. 1 is a block diagram showing a constitution of an optical transmission device used for bi-directional optical communications according to a first embodiment of the present invention.

Referring to FIG. 1 which is a block diagram, there is shown a constitution of an optical transmission device used for bi-directional optical communications according to the first embodiment of the present invention. A bi-directional optical communication optical transmission device 60 shown in FIG. 1 is positioned between optical fibers (bi-directional communication optical transmission lines) 60a and 60b for performing bi-directional optical communications by transmitting optical signals having wavelengths different between clockwise and counterclockwise directions. The optical transmission device 60 performs specified optical transmission processing for the optical signals transmitted through these optical fibers 60a and 60b. The optical transmission device 60 comprises an optical ADM device 1 and a first direction changing unit 2.

The optical ADM device (uni-directional optical ADM, uni-directional optical signal processing unit) 1 performs specified optical signal processing for optical signals transmitted in a single direction. As shown in FIG. 1, the optical ADM device 1 includes two input ports, i.e., a normal time input port 1a for inputting optical signals at a normal time and an emergency input port 1c for inputting optical signals in an emergency. The optical ADM device 1 also includes two output ports, i.e., a normal time output port 1b for outputting optical signals at a normal time and an emergency output port id for outputting optical signals in an emergency. The optical ADM device 1 will be described in detail later.

The first direction changing unit (uni-direction/bi-direction changing unit) 2 performs specified direction changing for optical signals transmitted at a normal time. Specifically, the first direction changing unit 2 unifies the flows of first optical signals (optical signals transmitted in a clockwise direction) and second optical signals (optical signals transmitted in a counterclockwise direction) in a single direction and inputs the flow-unified optical signals to the optical ADM device 1. The first direction changing unit 2 divides the flow of optical signals from the optical ADM device 1 into first and second optical signals.

According to the first embodiment, it is assumed that wavelengths of optical signals transmitted in a clockwise direction (first optical signals) are represented by $\lambda_1$–$\lambda_4$, wavelengths of optical signals transmitted ir a counterclockwise direction (second optical signals) are represented by $\lambda_5$–$\lambda_8$ and optical communications are performed by using optical signals of totally eight wavelengths.

The first optical signals ($\lambda_1$–$\lambda_4$) inputted through the optical fiber 60a and the second optical signals ($\lambda_5$–$\lambda_8$) inputted through the optical fiber 60b are inputted to the normal time input port 1a of the optical ADM device 1. Among optical signals outputted from. the normal time output port 1b of the optical ADM device 1, the first optical signals are outputted to the optical fiber 60b and the second optical signals are outputted to the optical fiber 60a.

Accordingly, the fist direction changing unit 2 includes, for example, optical couplers 20 and 21, optical circulators 22 and 23 and distribution compensators 24 and 25.

The optical coupler (optical wavelength multiplexing unit; 1×2 WDM optical coupler) 20 multiplexes the first and second optical signals and outputs the multiplexed optical signals to the normal time input port 1a of the optical ADM device 1. The optical coupler (optical wavelength demultiplexing unit; 1×2 WDM optical coupler) 21 demultiplexes processed optical signals from the normal time output port 1b of the optical ADM device 1 into first and second optical signals. These optical couplers 20 and 21 are respectively constructed as wavelength-division multiplexing/demultiplexing type optical couplers.

Since the first and second optical signals are multiplexed by the optical coupler 20, bi-directional optical signals can be inputted by using one input port (normal time input port 1a) provided in the optical ADM device 1. Also, since the optical signals are divided into first and second optical signals by the optical coupler 21, bi-directional optical signals can be outputted only by providing one output port (normal time output port 1b) in the output side of the optical ADM device 1.

The optical circulator (first optical signal branching unit) 22 branches the first optical signals from the optical fiber 60a to the optical coupler 20 through the later-described distribution compensator 24. The optical circulator 22 also branches the second optical signals obtained by demultiplexing performed in the optical coupler 21 to the optical fiber 60a. The optical circulator (second optical signal branching unit) 23 branches the second optical signals from the optical fiber 60b to the optical coupler 20 through the later-described distribution compensator 25. The optical circulator 23 also branches the second optical signals obtained by demultiplexing performed in the optical coupler 21 to the optical fiber 60b.

The distribution compensator (first distribution compensator) 24 compensates for the distribution of the first optical signals before the flows of the first and second optical signals are unified in a single direction. The distribution compensator (second distribution compensator) 25 compensates for the distribution of the second optical signals before the flows of the first and second optical signals are unified in a single direction. In other words, these distribution compensators 24 and 25 are constructed as individual distribution compensating units for individually compensating for the distributions of the first and second optical signals.

For the foregoing distribution compensators 24 and 25, distribution compensation fibers (DCF) may be used. Alternatively, fiber Bragg gratings may be used. The distribution compensators 24 and 25 are provided, because if the optical fibers 60a and 60b are single mode fibers (SMF), transmitted optical signals are affected by the distribution of these transmission lines (SMF).

Accordingly, if the optical fibers 60a and 60b are constructed as distribution shift fibers (DSF), it is not necessary to provide these distribution compensators 24 and 25. If an optical signal transmission speed is 2.5 Gb/s or lower, since long-distance transmission can be performed without compensating for distribution, it is not necessary to provide the distribution compensators 24 and 25 in this case, as well.

With the first direction changing unit 2 constructed in the foregoing manner, the first optical signals inputted through the optical fiber 60a and the second optical signals inputted through the optical fiber 60b can be flow-unified in a single direction and then inputted to the optical ADM device 1. The outputs from the optical ADM device 1 can be divided into first and second optical signals between two directions.

Thus, in the optical transmission device 60 used for bi-directional optical transmissions, since bi-directional optical signals are unified in a single direction, the existing optical ADM device 1 can be directly used.

In FIG. 1, a reference numeral 3 denotes a second direction changing unit. This second direction changing unit (emergency uni-direction/bi-direction changing unit) 3 is positioned between protection optical fibers (emergency bi-directional communication optical transmission lines) 60c and 60d, which are used for performing, in an emergency when bi-directional communications by the optical fibers 60a and 60b are made impossible, the bi-directional communications instead of the optical fibers 60a and 60b. The second direction changing unit 3 performs specified direction changing for optical signals transmitted through the protection optical fibers 60c and 60d in an emergency.

Specifically, the second direction changing unit 3 unifies the flows of first and second optical signals ($\lambda_1$–$\lambda_4$ and $\lambda_5$–$\lambda_8$) in a single direction, the first optical signals being inputted through the optical fiber 60c and the second optical signals being inputted through the optical fiber 60d in an emergency, and inputs the flow-unified optical signals to the optical ADM device 1. The second direction changing unit 3 divides the flow of optical signals from the optical ADM device 1 into first and second optical signals between two directions.

In other words, the first optical signals inputted through the optical fiber 60c and the second optical signals inputted through the optical fiber 60d in the emergency are outputted to the emergency input port 1c of the optical ADM device 1. Among optical signals outputted from the emergency output port 1d of the optical ADM device 1, the first optical signals are outputted to the optical fiber 60d and the second optical signals are outputted to the optical fiber 60c.

Accordingly, the second direction changing unit 3 includes, for example, optical couplers 30 and 31, optical circulators 32 and 33 and distribution compensators 34 and 35.

The optical coupler (emergency optical wavelength multiplexing unit) 30 multiplexes the first and second optical signals, the first optical signals being inputted through the optical fiber 60c and the second optical signals being inputted through the optical fiber 60d in the emergency, and then outputs the multiplexed optical signals to the emergency input port 1c of the optical ADM device 1. The optical coupler (emergency optical wavelength demultiplexing unit) 31 demultiplexes optical signals from the emergency output port 1d of the optical ADM device 1 into first and second optical signals. The optical couplers 30 and 31 are respectively constructed as wavelength-division multiplexing/demultiplexing type optical couplers.

The optical circulator (first emergency optical signal branching unit) 32 branches the first optical signals from the optical fiber 60c to the optical coupler 30 through the later-described distribution compensator 34 and the second optical signals obtained by demultiplexing performed in the optical coupler 31 to the optical fiber 60c. The optical circulator (second emergency optical signal branching unit) 33 branches the second optical signals from the optical fiber 60d to the optical coupler 30 through the later-described distribution compensator 35 and the first optical signals obtained by demultiplexing performed in the optical coupler 31 to the optical fiber 60d.

The distribution compensator 34 compensates for the distribution of the first optical signals before the flows of the first and second optical signals are unified in a signal direction. The distribution compensator 35 compensates for the distribution of the second optical signals before the flows of the first and second optical signals are unified in a single direction. In other words, as in the case of the foregoing distribution compensators 24 and 25, these distribution compensators are constructed as individual distribution compensating units for individually compensating for the distributions of the first and second optical signals.

With the second direction changing unit 3 constructed in the foregoing manner, the first optical signals inputted through the optical fiber 60c and the second optical signals inputted through the optical fiber 60d in the emergency can be flow-unified in a single direction and then inputted to the optical ADM device 1. The outputs from the optical ADM device 1 can be divided into first and second optical signals between two directions. In other words, the second direction changing unit 3 can perform the same direction changing as that performed by the first direction changing unit 2.

Figure 2:
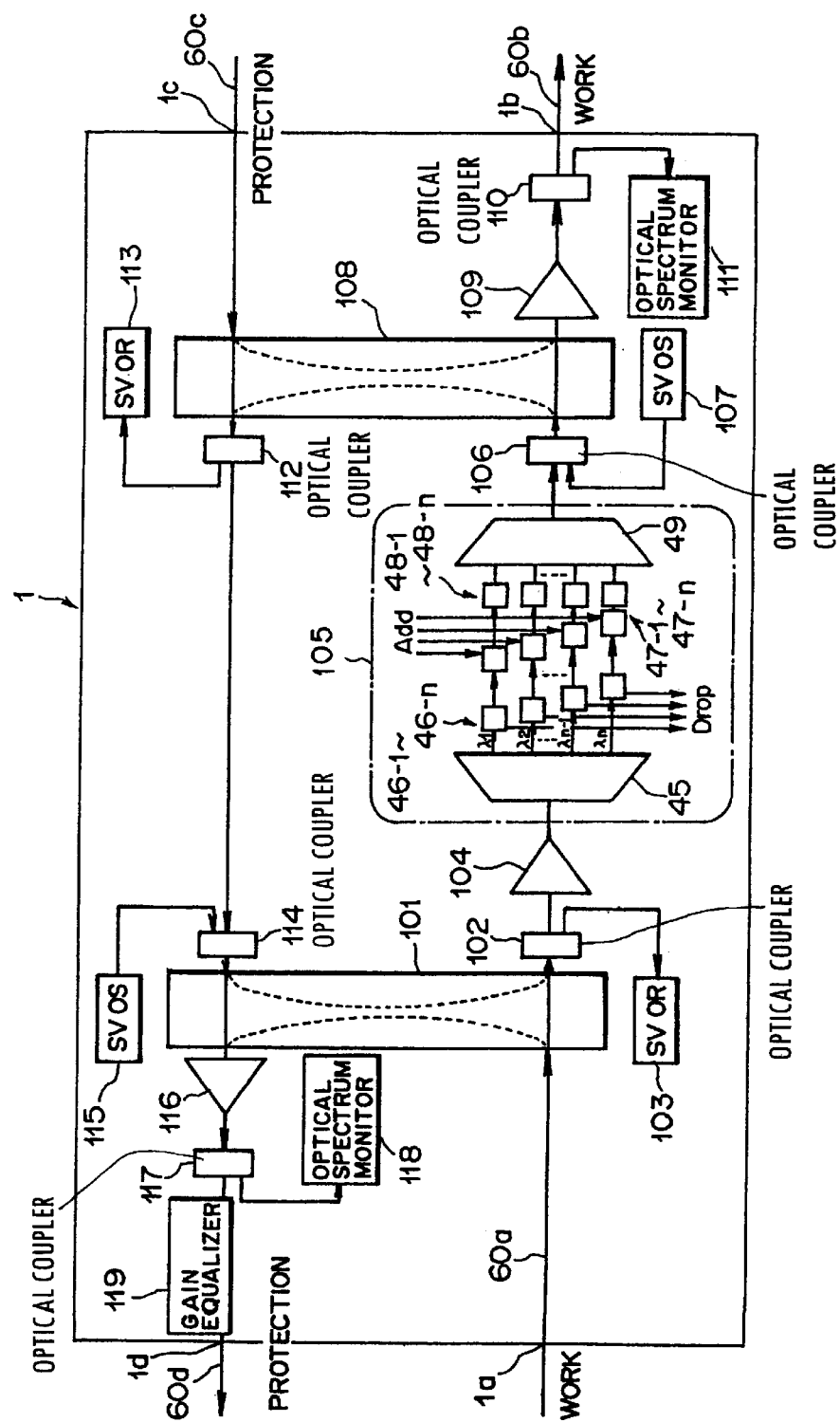
FIG. 2 is a block diagram showing a constitution of a uni-directional optical signal processing unit of the first embodiment of the present invention.

The optical ADM device 1 shown in FIG. 1 includes, as shown in FIG. 2, an optical switch 101, an optical coupler 102, a monitoring signal receiving unit (SVOR; Supervisor Optical Receiver) 103, an optical amplifier 104, a linear ADM unit 105, an optical coupler 106, a monitoring signal sending unit (SVOS; Supervisor Optical Sender) 107, an optical switch 108, an optical amplifier 109, an optical coupler 110 and an optical spectrum monitor 111. These elements are all provided on the normal time optical fibers 60a and 60b.

The optical switch (uni-directional returning optical switch; 2×2 switch) 101 can return the first and second optical signals inputted from the first direction changing unit 2 in an emergency to the emergency optical fiber 60d. The optical switch 101 enables optical signals inputted thereto at a normal time to pass through.

Accordingly, the second direction changing unit 3 demultiplexes the first optical signals returned by the optical switch 101 by the optical coupler 31 and outputs the demultiplexed optical signals to the optical fiber 60d. The second direction changing unit 3 demultiplexes the second optical signals returned by the optical switch 101 by the optical coupler 31 and outputs the demultiplexed optical signals to the optical fiber 60c.

The optical coupler (2×1 optical coupler) 102 partially demultiplexes optical signals transmitted by the optical switch 101 to the monitoring signal receiving unit (SVOR) 103.

The monitoring signal receiving unit (SVOR) 103 reads SV signals (supervisor; monitoring signal) from the optical signals partially demultiplexed by the optical coupler 102. Based on information regarding transmitted optical signals such as optical signal speeds, wavelengths or returning commands set in the SV signals, optical signal branching/insertion performed in the later-described linear ADM unit 105 or switching (returning) of the optical switches 101 and 108 is controlled.

The optical amplifier 104 amplifies the optical signals [first optical signals ($\lambda_1$–$\lambda_4$) and second optical signals ($\lambda_5$–$\lambda_8$)] which have been flow-unified in a single direction by the first direction changing unit 2 and inputted. Herein, the optical amplifier 104 amplifies optical signals transmitted by the optical coupler 102.

The linear ADM unit (add/drop processing unit) 105 performs optical signal branching/insertion (add/drop processing) by wavelength units for the first and second optical signals flow-unified in a single direction by the first direction changing unit 2. The linear ADM unit 105 includes an optical wavelength demultiplexer 45, branching optical switches 46-1 to 46-n, insertion optical switches 47-1 to 47-n, optical attenuators 48-1 to 4B-n and an optical wavelength multiplexer 49.

The optical demultiplexer 45 demultiplexes inputted optical signals by wavelength units. For example, if optical signals are demultiplexed into n waves (n is a natural number), optical signals of respective wavelengths are outputted from the output ports, amounting to n in number, of the optical demultiplexer 45.

The branching optical switches (1×2 optical switches) 46-1 to 46-n are provided corresponding to the output port number n in the optical demultiplexer 45. These branching optical switches 46-1 to 46-n respectively branch (drop) the optical signals of respective wavelengths demultiplexed by the optical demultiplexer 45 by wavelength units.

The insertion optical switches (2×1 optical switches) 47-1 to 47-n respectively insert (add; multiplex) optical signals of wavelengths equal to those of the optical signals branched by the branching optical switches 46-1 to 46-n.

The optical attenuators 48-1 to 48-n respectively adjust the attenuation degrees of optical signals by wavelength units. The optical attenuators 48-1 to 48-n function as optical signal level adjusting units for keeping constant the signal levels of the optical signals of respective wavelengths. Accordingly, the optical attenuators 48-1 to 48-n can eliminate wavelength power variance, if such power variance exists among wavelengths of the branched/inserted optical signals.

The optical wavelength multiplexer 49 multiplexes optical signals of respective wavelengths inputted by the insertion optical switches 47-1 to 47-n.

Thus, in the linear ADM unit 105, optical switches, i.e., the branching optical switches 46-1 to 46-n and the insertion optical switches 47-1 to 47-n, are disposed between two multiplexers (optical demultiplexer 45 and optical multiplexer 49) and add/drop (insertion/branching) processing is performed for optional wavelengths.

The monitoring signal sending unit (SVOS) 107 produces information (SV signals) indicating the states of optical signals transmitted through the optical fibers 60a and 60b. Information is superimposed on another by a wavelength (e.g., $\lambda_9$) different from the wavelengths ($\lambda_1$–$\lambda_8$) of the optical signals which are transmitted for optical communications currently performed by the optical ADM device 1.

The optical coupler (2×1 optical coupler) superimposes the SV signals from the SVOS 107 on the optical signals from the linear ADM unit 105. As in the case of the foregoing optical switch 101, the optical switch (uni-direction returning optical switch; 2×2 switch) 108 returns, if a failure occurs, optical signals to the optical fiber 60d as an emergency optical transmission line and enables optical signals to pass through at a normal time.

The optical amplifier 109 amplifies optical signals transmitted by the optical switch 108. The optical coupler (1×2 optical coupler) 110 partially branches the optical signals amplified by the optical amplifier 109.

The optical spectrum monitor (spectrum monitoring unit) 111 monitors the spectral states of optical signals (processed optical signals) flow-unified in a single direction by the first direction changing unit 2 and add/drop processed by the linear ADM unit 105. If any spectral abnormality such as wavelength deviation or signal power variance occurs during monitoring, the optical attenuators 48-1 to 48-$n$ of the linear ADM unit 105 are adjusted and the spectral state is corrected to be normal.

On the other hand, the emergency optical fibers 60c and 60d include thereon, for example, an optical switch 108, an optical coupler 112, a monitoring signal receiving unit (SVOR) 113, an optical coupler 114, a monitoring signal sending unit (SVOS) 115, an optical switch 101, an optical amplifier 116, an optical coupler 117, an optical spectrum monitor 118 and a gain equalizer 119. The elements denoted by the same reference numerals as those used for the foregoing elements indicate the same constituting units and, thus detailed description thereof will be omitted.

The optical coupler 112 partially demultiplexes optical signals transmitted by the optical switch 108. The monitoring signal receiving unit (SVOR) 113 partially receives the optical signals demultiplexed by the optical coupler 112 and reads SV signals. The monitoring signal receiving unit 113 determines whether to process optical signals inputted in an emergency by the optical linear ADM unit 105 or return the optical signals by the optical switch 108.

The monitoring signal sending unit (SVOS) 115 produces information (SV Signals) indicating the states of optical signals transmitted through the optical fibers 60c and 60d. As in the case of the SVOS 107, the SVOS 115 superimposes the information on optical signals having wavelengths different from those of the optical signals used for optical communications performed by the optical ADM device 1. The optical coupler 114 superimposes the SV signals from the SVOS 115 on optical signals from the optical coupler 112.

The optical amplifier 116 amplifies optical signals transmitted by the optical switch 101. The optical coupler 117 partially branches the optical signals amplified by the optical amplifier 116. The optical spectrum monitor (spectrum monitoring unit) 111 monitors the spectral states of optical signals transmitted through the optical fibers 60c and 60d in an emergency.

The gain equalizer 119 adjusts the gains of optical signals by wavelength units. The gain equalizer 119 functions as an emergency optical signal level adjusting unit for keeping constant the signal levels of the optical signals of respective wavelengths returned by the optical switches 101 and 108 in an emergency. This gain equalizer 119 may be provided in the optical amplifier 116. In this case, it may not be necessary to provide the same in a last output stage like that shown in FIG. 2.

Processing of each of the units 101 to 119 is controlled by a not-shown control unit. Accordingly, the optical spectrum monitors 111 and 118 can be easily constructed without complicating circuitry thereof. The first and second optical signals (totally eight waves) can be observed.

The numbers of optical amplifiers 104, 109 and 116 provided in the foregoing optical ADM device 1 may be changed as occasion demands. In other words, these optical amplifiers may not be inserted if optical signal power is strong enough. If optical signal power is insufficient, additional optical amplifiers may be provided.

Figure 3:
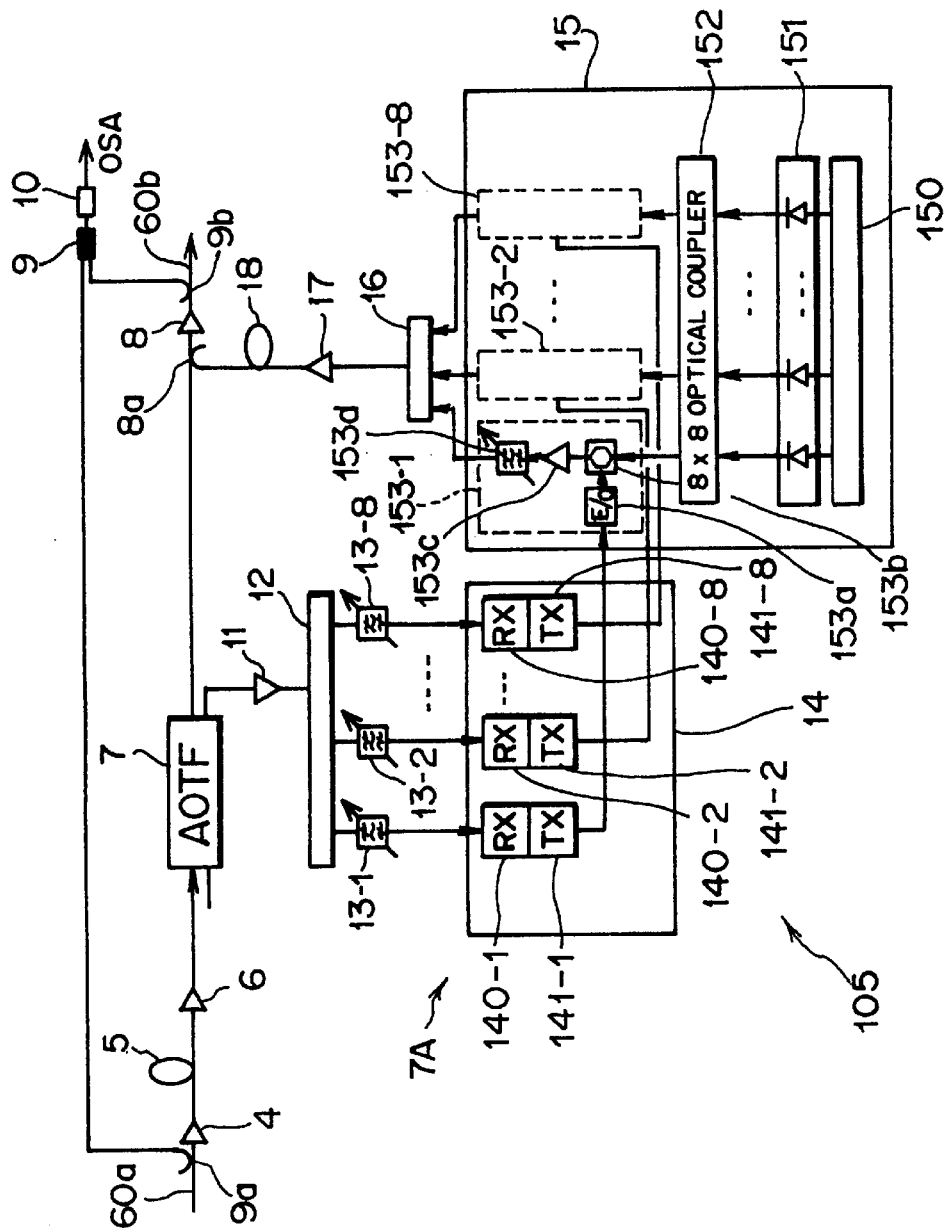
FIG. 3 is a block diagram showing another example of a linear ADM unit of the first embodiment of the present invention.

In the foregoing linear ADM unit 195, as shown in FIG. 2, the optical switches (branching optical switches 41-1 to 41-$n$ and insertion optical switches 42-1 to 42-$n$) are disposed between the optical wavelength demultiplexer 40 and the optical wavelength multiplexer 44 and then branching/insertion is performed for optical signals. However, for example as shown in FIG. 3, optical signal branching/insertion can be performed by using the acousto-optical tunable filter (AOTF) 7.

In this case, specifically, the linear ADM unit 105 branches/inserts wavelengths of corresponding optical signals by controlling the frequencies of inputted radio frequency (RF) signals.

Figure 4:
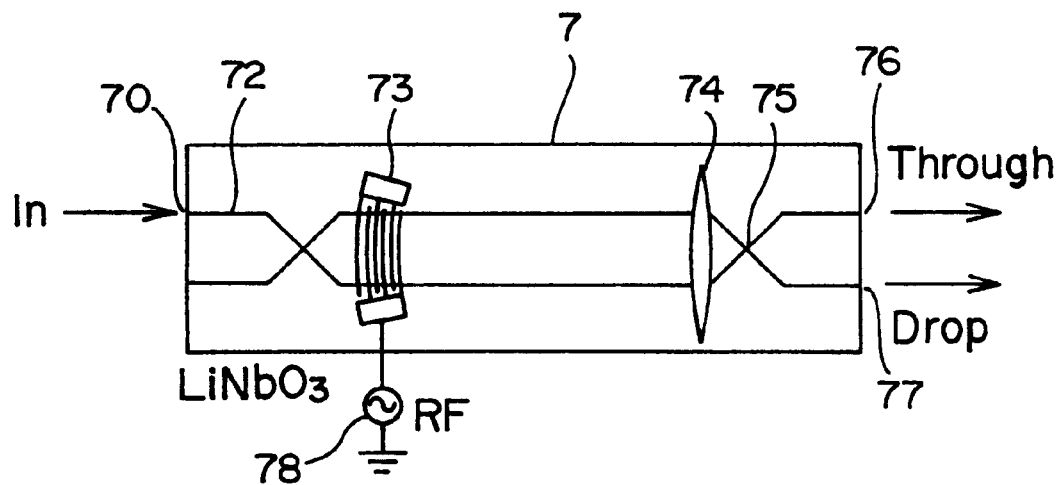
FIG. 4 is a block diagram showing a constitution of an acousto-optical tunable filter shown in FIG. 3.

The AOTF 7 branches optical signals of desired wavelengths by impressing frequency signals equivalent to the wavelengths of the optical signals to be branched. For example, as shown in FIG. 4, the AOTF 7 includes an optical input port 70, an optical waveguide 72, a comb-shaped electrode (IDT) 73, a SAW clad unit 74, a polarization beam spit unit (PBS) 75, optical output ports 76 and 77 on a substrate made of lithium niobate ($LiNbO_3$). By interference between a surface acoustic wave and the optical waveguide overlapping each other, optical signals of partial wavelengths can be taken out.

In other words, upon having received optical signals inputted from an input port (IN) 70, the AOTF 7 transmits the optical signals through the optical waveguide 72. For example, if the wavelengths of optical signals to be branched are $\lambda_1$ and $\lambda_4$, RF frequencies $f_1$ and $f_4$ corresponding to these wavelengths are inputted from a RF signal oscillator 78 and surface acoustic waves (SAW) are produced from the surface acoustic wave and the optical waveguide 72 overlapping each other. Then, these SAW are propagated through the SAW clad unit 74 and the polarized waves of the optical signals are converted.

The optical signals whose polarized waves have been converted are then separated (polarized wave separation) by the PBS 75. The optical signals of the wavelengths ($\lambda_1$ and $\lambda_4$) whose converted polarized waves have been separated are outputted from the optical output port 77 (drop) as selected lights.

The optical signals of wavelengths which have not been selected are outputted from the optical output port 76 (through) as non-selected lights. In other words, by changing RF frequencies, the optical signals of corresponding wavelengths can be branched/inserted.

Specifically, the linear ADM unit 105 shown in FIG. 3 includes, in addition to the foregoing AOTF 7, an optical coupler 9a, an optical amplifier 4, a distribution compensator 5, an optical amplifier 6, an optical amplifier 8 and optical couplers 8a and 9b on the optical fibers 60a and 60b. The linear ADM unit 105 also includes a processing unit 7A for performing specified processing for the optical signals of wavelengths branched by the AOTF 7. In other words, in the linear ADM unit 105, the optical signals branched by the AOTF 7 are produced by the processing unit 7A and inserted into the optical fibers 60a and 60b.

The processing unit 7A includes an optical amplifier 11, a 1×8 optical coupler 12, variable band-pass filters 13-1 to 13-8, an electric ADM (E-ADM) 14, an optical signal generation unit (LDbank) 15, a 1×8 optical coupler 16, an optical amplifier 17 and a distribution compensator 18.

In the linear ADM unit 105, inputted optical signals are amplified by an optical amplifier (pre-amp) 4. The distribution of the optical signals is compensated for by a distribution compensator (DCF) 5. Then, these optical signals are amplified by an optical amplifier (pre-amp) 6.

The optical signals branched by the AOTF 7 are amplified by the optical amplifier 11. The optical signals of the wavelengths $\lambda_1$–$\lambda_8$ are equally branched into eight parts by the 1×8 optical coupler 12. Then, these optical signals are separated by the variable band-pass filters 13-1 to 13-8. In other words, wavelengths to be passed can be optionally set.

Thereafter, the optical signals obtained by branching by wavelength units are received by receiving units (RX) 140-1 to 140-8 provided in the E-ADM 14 and converted into electric signals. Then, these electric signals are transmitted to the later-described LDbank 15 by sending units (TX) 141-1 to 141-8.

Then, in the LDbank 15, the optical signals branched by the AOTF 7 are remodulated by performing specified optical signal processing. This LDbank 15 includes a light source driving circuit 150, a light source unit (LD unit) 151, an 8×8 optical coupler 152 and remodulating units (remodulators) 153-1 to 153-8.

In the LDbank 15, when the light source unit 151 is driven by the light source driving circuit 150, optical signals of wavelengths $\lambda_1$–$\lambda_8$ to be inserted are produced by the light source unit 151. Then, in the 8×8 optical coupler 152, the optical signals having different wavelengths $\lambda_1$–$\lambda_8$ are multiplexed and then equally divided into eight parts.

Thereafter, in the remodulating units 153-1 to 153-8, the optical signals are respectively remodulated based on the electric signals separated by wavelength units which have been supplied from the E-ADM 14. Each remodulation is performed by an electric/optical conversion unit (E/O) 153a, a modulator 153b, an amplifier 153c and a variable bandpass filter 153d.

Specifically, in the electric/optical conversion unit (E/O) 153a, the electric signals from the E-ADM 14 are converted into optical signals. In the modulator 153b, the optical signals from the 8×8 optical coupler 152 are remodulated by using data regarding the optical signals obtained by converting the electric signals. Then, these optical signals are amplified by the amplifier 153c. Then, in the variable band-pass filter 153d, optical signals to be inserted into the optical fiber 60b are optionally selected from the optical signals of the wavelengths $\lambda_1$–$\lambda_8$.

Thereafter, the optionally selected optical signals of the respective wavelengths are multiplexed by the 1×8 optical coupler 16 and amplified by the optical amplifier (post-amp) 17. Then, the distribution of these optical signals is compensated for by the distribution compensator 18 and inserted into the optical fiber 60b by the optical coupler 8a. The inserted optical signals are amplified by the optical amplifier (post-amp) 8 and then transmitted to the optical fiber 60.

Furthermore, the linear ADM unit 105 includes an optical spectrum monitor 10 for monitoring the spectral states of optical signals transmitted through the optical fibers 60a and 60b. The optical signals monitored by the optical spectrum monitor 10 are obtained by partially branching optical signals with the optical couplers 9a and 9b on the optical fibers 60a and 60b.

As apparent from the foregoing, when the AOTF 7 is used for the linear ADM unit 105, branching/insertion can be effectively performed, as well.

For branching/inserting optical signals, instead of the AOTF 7, for example an arrayed waveguide grating (AWG) or a fiber Bragg grating may be used.

The next section describes, by referring to FIGS. 5 to 8, the operation of the optical transmission device 60 used for bi-directional optical communications according to the first embodiment of the present invention which is constructed in the foregoing manner. In the drawings, thick-line portions indicate the flows of optical signals.

(a1) Normal-time Operation

Figure 5:
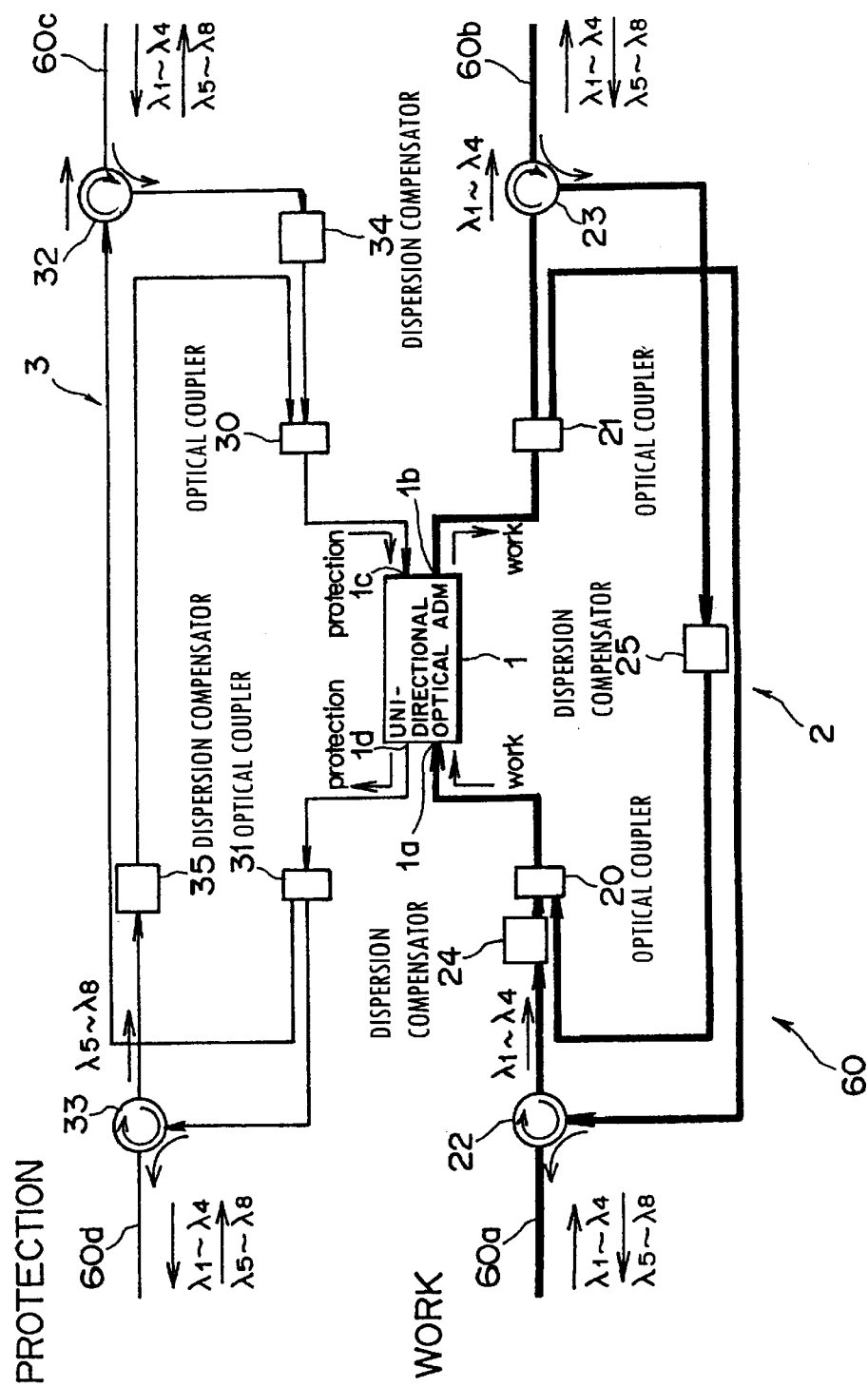
FIG. 5 is a view illustrating a normal-time operation of the optical transmission device used for bi-directional optical communications according to the first embodiment of the present invention.

First, at a normal time, as shown in FIG. 5, after having received the first optical signals ($\lambda_1$–$\lambda_4$) inputted through the optical fiber 60a, the bi-direction communication optical transmission device 60 branches the first optical signals to the distribution compensator 24 side by the optical circulator 22. The distribution compensator 24 compensates for the distribution of the first optical signals and then transmits the distribution-compensated optical signals to the optical coupler 20.

On the other hand, after having received the second optical signals ($\lambda_5$–$\lambda_8$) inputted through the optical fiber 60b, the bi-directional communication optical transmission device 60 branches the second optical signals to the distribution compensator 25 side by the optical circulator 23. The distribution compensator 25 compensates for the distribution of the second optical signals and then transmits the distribution-compensated optical signals to the optical coupler 20.

Then, the optical coupler 20 multiplexes the first optical signals from the distribution compensator 24 and the second optical signals from the distribution compensator 25 and unifies the flows of these optical signals in a single direction. These optical signals are then inputted through the normal-time input port 1a of the optical ADM device 1. The optical ADM device 1 then performs specified optical signal processing for these two kinds of optical signals. The optical signal processing performed by the optical ADM device 1 will be described later.

Thereafter, after the processed optical signals have been outputted from the normal-time output port 1b of the optical ADM device 1, the flows of these optical signals are divided between two directions by the optical coupler 21. In other words, the first optical signals are demultiplexed to the optical circulator 23 side and the second optical signals are demultiplexed to the optical circulator 22 side. Then, the optical circulator 23 outputs the first optical signals to the optical fiber 60b. The optical circulator 22 outputs the second optical signals to the optical fiber 60a.

At this time, in the optical ADM device 1, as shown in FIG. 2, at a normal time, the first and second optical signals transmitted in two ways and inputted from the normal-time input port 1a are passed through the optical switch 101. Then, the optical coupler 102 partially transmits the optical signals to the SVOR 103. In the SVOR 103, optical signals of wavelengths to be branched are selected.

Then, in the optical ADM device 1, the optical amplifier 104 amplifies the optical signals. In the linear ADM unit 105, the optical signals of the wavelengths selected by the SVOR 103 are branched, and then branched wavelength optical signals are inserted. Subsequently, in the optical coupler 106, the SV signals from the SVOS 107 are superimposed on the branched/inserted optical signals. The optical signals are then passed through the optical switch 108 and amplified by the optical amplifier 109.

Then, the optical coupler 110 partially branches the optical signals to the optical spectrum monitor 111 and transmits the same to a next optical ADM device (not shown). The optical spectrum monitor 111 monitors wavelength deviation or the sates of optical signal branching/insertion.

Figure 6:
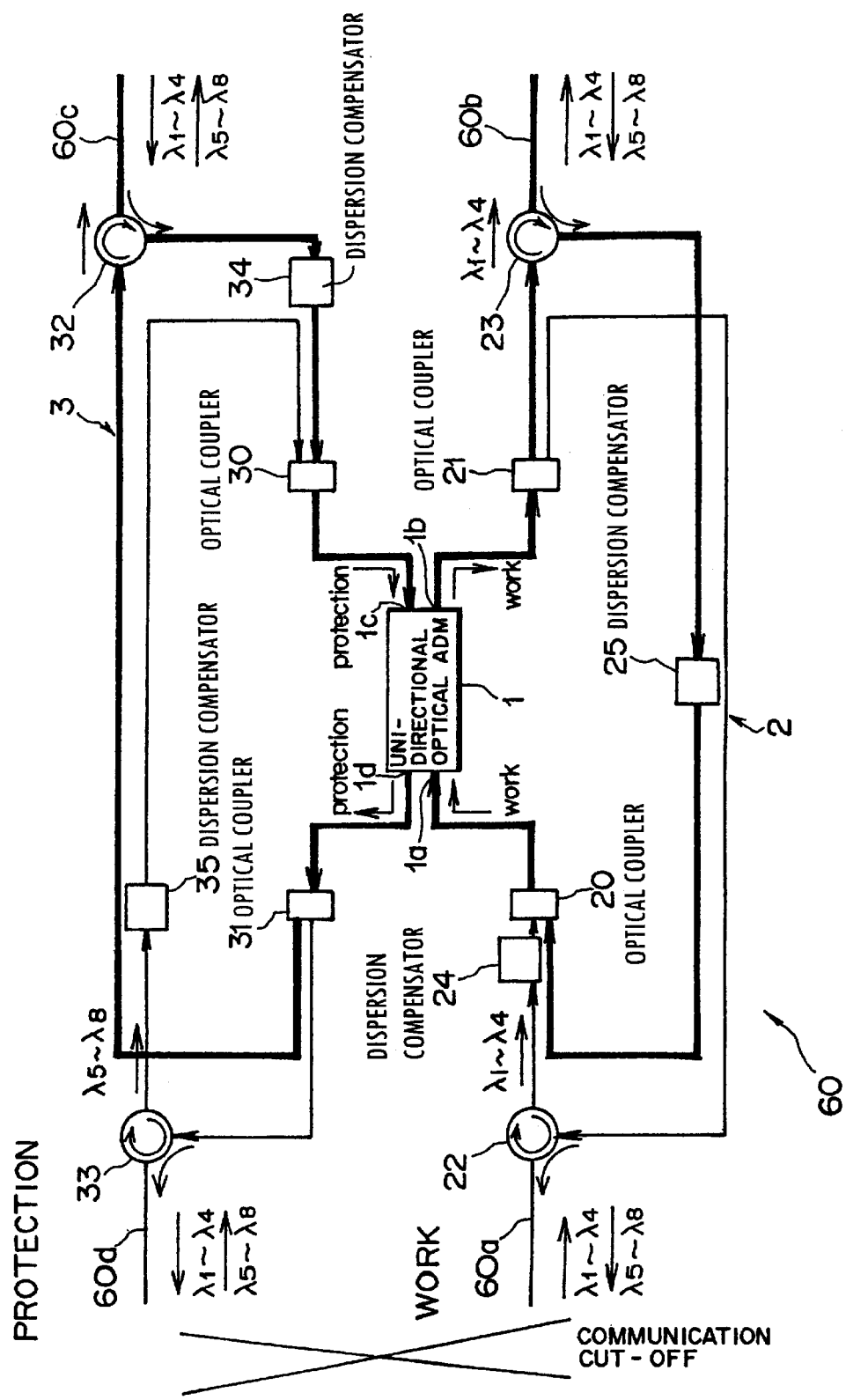
FIG. 6 is a view illustrating an emergency operation of the optical transmission device used for bi-directional optical communications according to the first embodiment of the present invention.

(a2) If a Failure Occurs in the Vicinity of the Input Side of Normal-time Transmission Line This section describes, by referring to FIG. 6, the operation of the bi-directional communication optical transmission device 60 when communications are cut off because of the occurrence of a failure between the bi-directional communication optical transmission device 60 shown in FIG. 1 and an adjacent bi-directional communication optical transmission device (not shown; denoted by a reference numeral 60A) connected to the optical fibers 60a and 60d thereof.

In this case, no first optical signals are inputted through the optical fiber 60a. Instead, the first optical signals are inputted through the optical fiber 60c. In other words, the first optical signals are returned by the bi-directional communication optical transmission device 60A connected to the optical fibers 60a and 60d in which communications have been cut off. Then, these returned optical signals are inputted from the emergency optical fiber 60c of the bi-directional communication optical transmission device 60 through another bi-directional communication optical transmission device (not shown) on a network ring.

After the first optical signals have been inputted through the optical fiber 60c, the optical circulator 32 branches these first optical signals, and the distribution compensator 34 compensates for the distribution of the optical signals. Then, the optical coupler 30 inputs the optical signals to the emergency input port 1c of the optical ADM device 1.

Then, in the optical ADM device 1, the first optical signals are passed through the optical switch 108. In the SVOR 113, the optical signals are partially branched by the optical coupler 112 and the SV signals are read from the received optical signals. Then, whether branching/insertion is to be performed or not for these first optical signals is detected.

As a result, if no branching/insertion is to be performed, the optical switch 108 returns the first optical signals to the optical fiber 60b side. The optical amplifier 109 amplifies the returned optical signals. Then, the optical coupler 110 outputs the amplified optical signals from the normal-time output port 1b.

If branching/insertion is to be performed, for example if all the optical signals of respective wavelengths are to be branched, the optical coupler 114 superimposes the SV signals on the first optical signals. Then, the optical switch 101 returns the optical signals to the optical fiber 60b side. As in the case of a normal time, the optical signals are then subjected to processing each performed by the optical coupler 102, the SVOR 103 and the amplifier 104. Then, in the linear ADM unit 105, all the optical signals are branched and received.

For partially performing branching/insertion for the optical signals of respective wavelengths, in the linear ADM unit 105, the first optical signals are subjected to branching/insertion as in the case of a normal time. Then, the optical coupler 106 superimposes the SV signals on the first optical signals. The optical signals are then passed through the optical switch 108 and subjected to processing each performed by the optical amplifier 109, the optical coupler 110 and the optical spectrum monitor 111. Then, the optical signals are outputted from the normal-time output port 1b.

Thereafter, as shown in FIG. 6, the first optical signals outputted from the normal-time output port 1b are passed through the optical coupler 21 and the optical circulator 23 and then outputted from optical fiber 60b.

On the other hand, the second optical signals are inputted from the optical fiber 60b. Then, the optical circulator 23 branches the second optical signals. The distribution compensator 25 compensates for the distribution of the optical signals. Then, the optical coupler 20 inputs the distribution compensated optical signals from the normal-time input port 1a of the optical ADM device 1.

Then, in the optical ADM device 1, the second optical signals are passed through the optical switch 101. In the SVOR 103, the optical coupler 102 partially branches the optical signals and the SV signals are read from the received optical signals. Then, whether branching/insertion is to be performed or not for the second optical signals is detected.

As a result, if no branching/insertion is to be performed, the optical switch 101 returns the second optical signals to the optical fiber 60d side. The optical amplifier 116 amplifies the optical signals. Then, the optical coupler 117 outputs the optical signals from the emergency output port 1d.

If branching/insertion is to be performed, for example if all the optical signals of respective wavelengths are to be branched, as in the case of a normal time, the optical signals are subjected to processing each performed by the optical coupler 102, the SVOR 103 and the amplifier 104. Then, in the linear ADM unit 105, all the optical signals are branched and received.

For partially performing branching/insertion for the optical signals of respective wavelengths, in the linear ADM unit 105, the second optical signals are branched/inserted as in the case of a normal time. The optical coupler 106 superimposes the SV signals on the optical signals. Then, the optical signals are returned to the optical fiber 60d side by the optical switch 108 and passed through the optical couplers 112 and 114, the optical switch 101, the optical amplifier 116, the optical coupler 117 and the optical spectrum monitor 118. Then, the gain equalizer 119 adjusts the gains of the optical signals, and the gain-adjusted optical signals are outputted from the emergency output port 1d.

Thereafter, as shown in FIG. 6, the second optical signals are passed through the optical coupler 31 and the optical circulator 32 and then outputted from the optical fiber 60c.

In other words, if communications are cut off between the bi-directional communication optical transmission devices 60 and 60A, the optical communications are performed by using the normal-time optical fiber 60b and the emergency optical fiber 60c.

Figure 7:
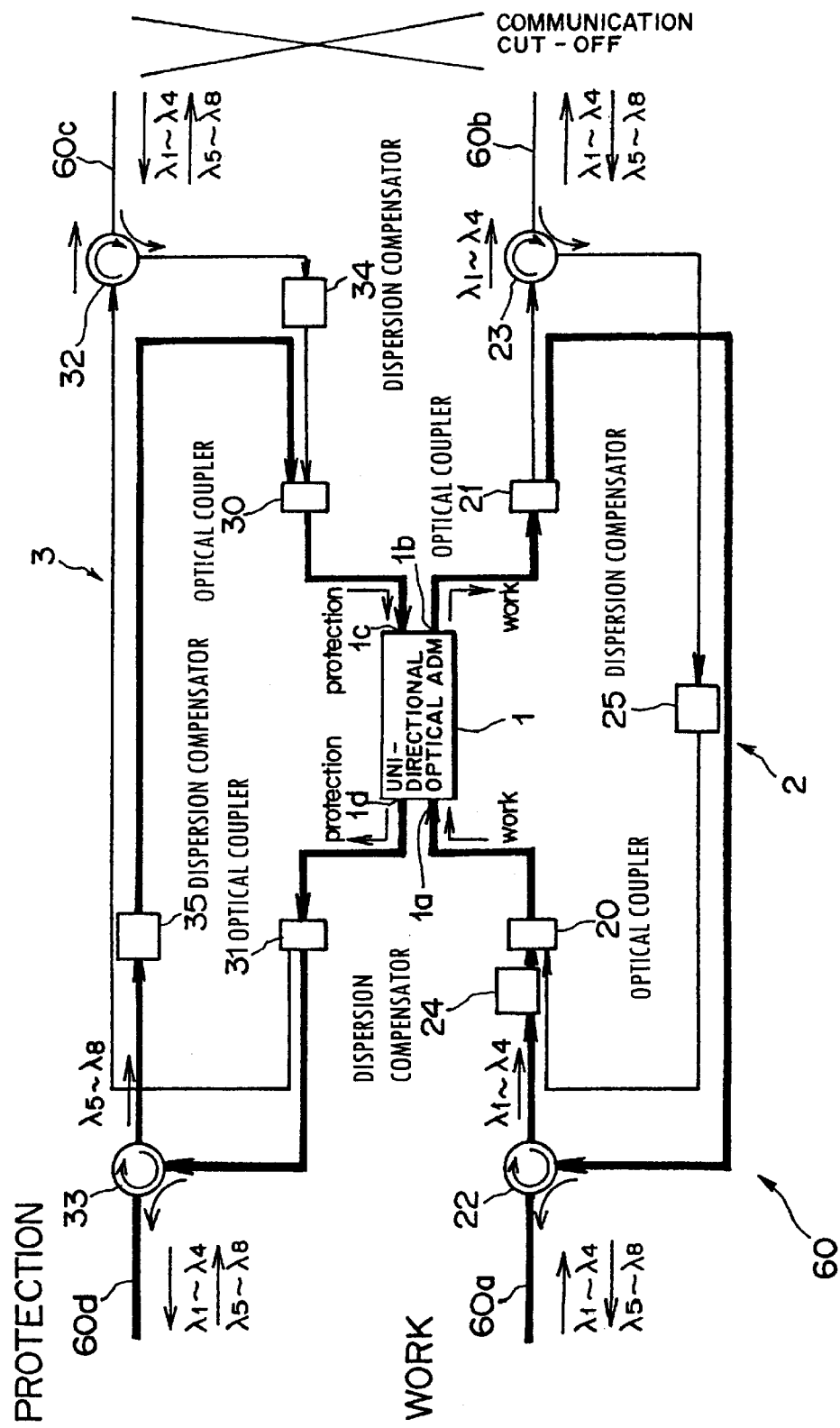
FIG. 7 is a view illustrating an emergency operation of the optical transmission device used for bi-directional optical communications according to the first embodiment of the present invention.

(a3) If Failure Occurs in the Vicinity of the Output Side of Normal-time Transmission Line This section describes, by referring to FIG. 7, the operation of the bi-directional communication optical transmission device 60 when communications are cut off because of the occurrence of a failure between the bi-directional communication optical transmission device 60 shown in FIG. 1 and an adjacent bi-directional communication optical transmission device (not shown; denoted by a reference numeral 60B) connected to the optical fibers 60b and 60c thereof.

In this case, the first optical signals are inputted from the optical fiber 60a. The optical circulator 22 then branches the first optical signals. The distribution compensator 24 compensates for the distribution of the optical signals. Then, the optical coupler 20 inputs the distribution compensated optical signals from the normal-time input port 1a of the optical ADM device 1.

Then, in the optical ADM device 1, the first optical signals are passed through the optical switch 101. In the SVOR 103, the optical coupler 102 partially branches the optical signals, and the SV signals are read from the received optical signals. Then, whether branching/insertion is to be performed or not for these first optical signals is detected.

As a result, if no branching/insertion is to be performed for the first optical signals, the optical switch 101 returns the optical signals to the optical fiber 60d side. The optical amplifier 116 amplifies the optical signals. Then, the optical coupler 117 outputs the amplified optical signals from the emergency output port 1d.

If branching/insertion is to be performed, for example if all the optical signals of respective wavelengths are to be branched, as in the case of a normal time, the optical signals are subjected processing each performed by the optical coupler 102, the SVOR 103 and the amplifier 104. Then, in the linear ADM unit 105, all the optical signals are branched and received.

For partially performing branching/insertion for the optical signals of respective wavelengths, in the linear ADM unit 105, the first optical signals are branched/inserted as in the case of a normal time. The optical coupler 106 superimposes the SV signals on the optical signals. The optical switch 108 returns the optical signals to the optical fiber 60d side. Then, the optical signals are passed through the optical couplers 112 and 114, the optical switch 101, the optical amplifier 116, the optical coupler 117 and the optical spectrum monitor 118. The gain equalizer 119 adjusts the gains of the optical signals. The gain-adjusted optical signals are then outputted from the emergency output port 1d.

On the other hand, the second optical signals are inputted from the optical fiber 60d rather than from the optical fiber 60b. Specifically, the second optical signals are returned by the bi-directional communication optical transmission device 60B connected to the optical fibers 60b and 60c in which communications have been cut off. Then, the returned second optical signals are inputted from the emergency optical fiber 60d of the bi-directional communication optical transmission device 60 by another bi-direction communication optical transmission device (not shown) on the network ring.

After having received the second optical signals inputted from the optical fiber 60d, the optical circulator 33 branches the second optical signals. The distribution compensator 35 compensates for the distribution of the optical signals. Then, the optical coupler 30 inputs the distribution compensated optical signals to the emergency input port 1c of the optical ADM device 1.

Then, in the optical ADM device 1, the second optical signals are passed through the optical switch 108. In the SVOR 113, the optical coupler 112 partially branches the optical signals, and the SV signals are read from the received optical signals. Then, whether branching/insertion is to be performed or not for the second optical signals is detected.

As a result, if no branching/insertion is to be performed, the optical switch 108 returns the second optical signals to the optical fiber 60b side. The optical signals are passed through the optical amplifier 109 and the optical coupler 110 and then outputted from the normal-time output port 1b.

If branching/insertion is to be performed, for example if all the optical signals of respective wavelengths are to be branched, the optical coupler 114 superimposes the SV signals on the optical signals. The optical switch 101 returns the optical signals to the optical fiber 60b side. Then, as in the case of a normal time, the optical signals are subjected to processing each performed by the units 102 to 104. In the linear ADM unit 105, all the optical signals are then branched and received.

For partially performing branching/insertion for the optical signals of respective wavelengths, as in the case of a normal time, in the linear ADM unit 105, branching/insertion is performed. The optical coupler 106 superimposes the SV signals on the optical signals. The optical signals are then passed through the optical switch 108 and subjected to processing each performed by the optical amplifier 109, the optical coupler 110 and the optical spectrum monitor 111. Then, the optical signals are outputted from the normal-time output port 1b.

Thereafter, the outputted second optical signals are passed through the optical coupler 21 and the optical circulator 22 and outputted from the optical fiber 60a.

In other words, if communications are cut off between the bi-directional communication optical transmission devices 60 and 60B, the optical communications are performed by using the normal-time optical fiber 60a and the emergency optical fiber 60d.

(a4) If a Failure Occurs in Areas not in the Vicinity

Figure 8:
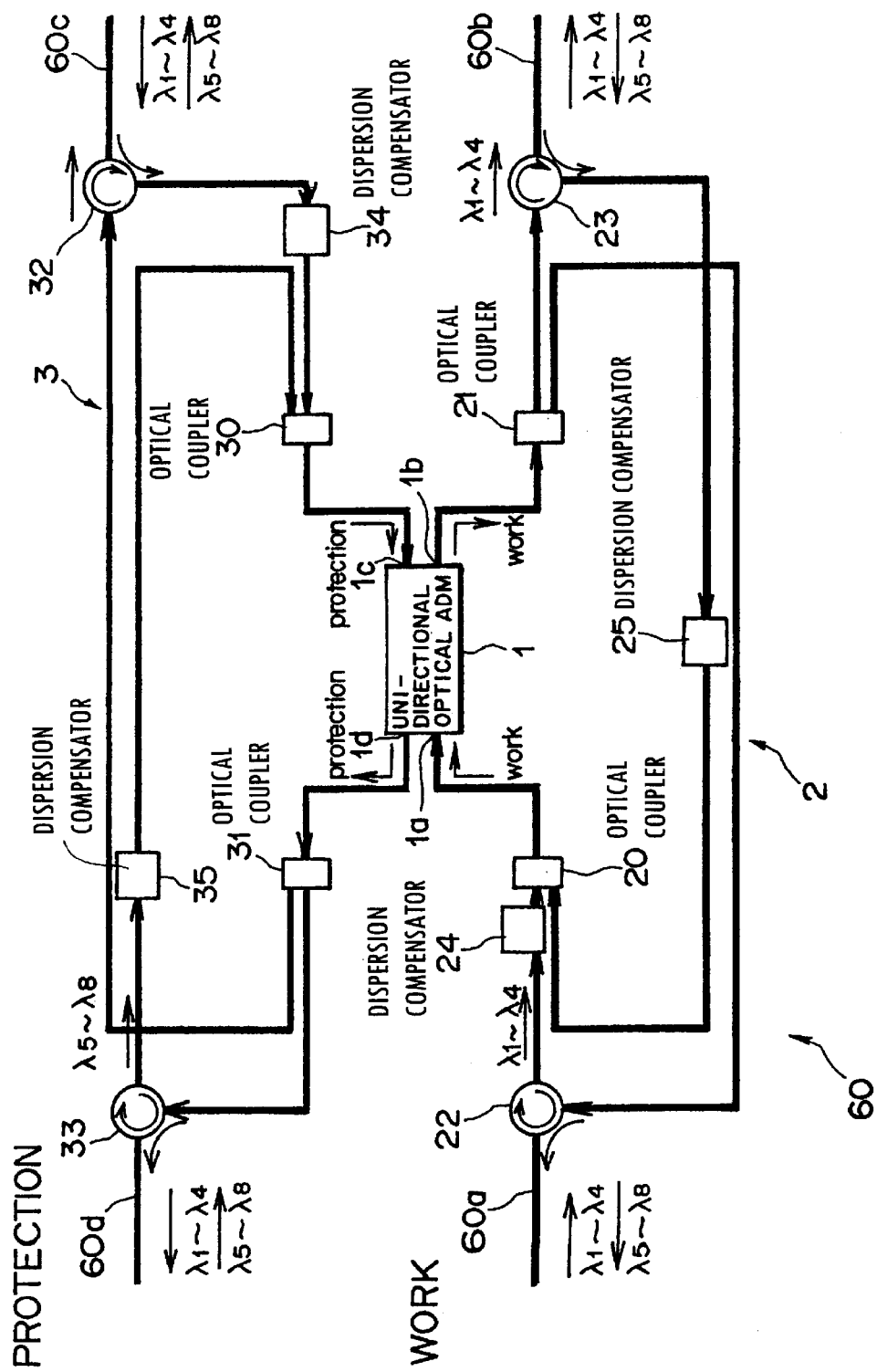
FIG. 8 is a view illustrating an emergency operation of the optical transmission device used for bi-directional optical communications according to the first embodiment of the present invention.

This section describes, by referring to FIG. 8, the operation of the bi-directional communication optical transmission device 60 when a failure occurs not between the foregoing bi-directional communication optical transmission devices 60 and 60A or between the foregoing bi-directional communication optical transmission devices 60 and 60B but in other areas.

If communications are cut off in certain areas, transmitted optical signals are returned and transmitted from the communication cut-off position (see FIGS. 6 and 7). Accordingly, if the bi-directional communication optical transmission device 60 is positioned therein, optical signals are transmitted by using all the normal-time and emergency optical fibers 60a to 60d.

More particularly, the first and second optical signals are transmitted from two ways (bi-directional communication optical transmission devices 60A and 60B sides) and to two ways.

First, the fist optical signals transmitted from the bi-directional communication optical transmission device 60A are inputted from the optical fiber 60a. Then, the optical circulator 22 branches the optical signals. The distribution compensator 24 compensates for the distribution of the optical signals. Then, the optical signals are passed through the optical coupler 20 and inputted from the normal-time input port 1a of the optical ADM device 1.

Then, in the optical ADM device 1, the first optical signals are passed through the optical switch 101 and subjected to specified optical transmission processing including branching/insertion each performed by the units 102 to 111. The processed optical signals are then outputted from the normal-time output port 1b. Then, the outputted first optical signals are passed through the optical coupler 21 and optical circulator 23 and outputted from the optical fiber 60b.

On the other hand, the first optical signals transmitted from the bi-directional communication optical transmission device 60B are inputted from the optical fiber 60c. Then, the optical circulator 32 branches the optical signals. The distribution compensator 34 compensates for the distribution of the optical signals. Then, the optical signals are passed through the optical coupler 30 and inputted from the emergency input port 1c of the optical ADM device 1.

Then, in the optical ADM device 1, the first optical signals are passed through the optical switch 108 and subjected to processing each performed by the units 112 to 115. The optical signals are then passed through the optical switch 101 and subjected to processing each performed by the units 116 to 119. The optical signals are then outputted from the emergency output port 1d. Then, the outputted optical signals are passed through the optical coupler 31 and the optical circulator 33 and outputted from the optical fiber 60d.

In this case, the branching/insertion for the first optical signals are performed while the optical signals are transmitted from the bi-directional communication optical transmission device 60A through the normal-time optical fibers 60a and 60b. Accordingly, when the optical signals are transmitted from the bi-directional communication optical transmission device 60B, these optical signals are simply passed. In other words, in the optical fibers 60c and 60d, the SV signals are read/written and the optical signals are simply amplified and sent out.

Next, the second optical signals transmitted from the bi-directional communication optical transmission device 60B are inputted from the optical fiber 60b. Then, the optical circulator 23 branches the optical signals. The distribution compensator 25 compensates for the distribution of the optical signals. The optical signals are then passed through the optical coupler 20 and inputted from the normal-time input port 1a of the optical ADM device 1.

Then, in the optical ADM device 1, the second optical signals are passed through the optical switch 101 and subjected to specified optical transmission processing including branching/insertion each performed by the units 102 to 111. The processed optical signals are then outputted from the normal-time output port 1b. Then, the outputted second optical signals are passed through the optical coupler 21 and the optical circulator 22 and outputted from the optical fiber 60a.

On the other hand, the second optical signals transmitted from the bi-directional communication optical transmission device 60A are inputted through the optical fiber 60d. Then, the optical circulator 33 branches the optical signals. The distribution compensator 35 compensates for the distribution of the optical signals. Then, the optical signals are passed through the optical coupler 30 and inputted from the emergency input port 1c of the optical ADM device 1.

Then, in the optical ADM device 1, the second optical signals are passed through the optical switch 108 and subjected to processing each performed by the units 112 to 115. The optical signals are then passed through the optical switch 101 and subjected to processing each performed by the units 116 to 119. Then, the optical signals are outputted from the emergency output port 1d. Then, the outputted second optical signals are passed through the optical coupler 31 and the optical circulator 32 and outputted from the optical fiber 60c.

In this case, the branching/insertion for the second optical signals is performed while the optical signals are transmitted from the bi-directional communication optical transmission device 60B through the normal-time optical fibers 60a and 60b. Accordingly, when the optical signals are transmitted from the bi-directional communication optical transmission device 60A, the optical signals are simply passed. In other words, also in this case, in the optical fibers 60c and 60d, the SV signals are read/written and the optical signals are simply amplified and sent out.

With the bi-directional communication optical transmission device 60 of the first embodiment of the present invention, since the bi-directional flows of optical signals can be unified in a single direction by changing the network configuration, branching/insertion and emergency returning can be performed for the optical signals by using the existing optical ADM device. Accordingly, an optical ADM device for bi-directional optical communications can be provided at low costs.

Since the distributions of the first and second optical signals are individually compensated for, distances among the nodes can be freely set without needing to keep constant the distances. Accordingly, the degree of flexibility for constructing a system (network) can be increased.

Since branching/insertion is performed by wavelength units for the optical signals flow-unified in a single direction by the optical ADM device 1, signals carrying information can be directly processed. Accordingly, the processing speed of the optical transmission device 60 can be increased.

With the bi-directional communication optical transmission device 60, since branching/insertion can be performed for optical signals by using the AOTF 7, the degree of flexibility for constructing a system can be increased.

Since the spectral states of the flow-unified and processed optical signals are monitored, the states of the transmitted optical signals can always be identified. Accordingly, power variance or the like among the transmitted optical signals can be surely corrected.

Since specified optical transmission processing can be performed in an emergency as in the case of a normal time, throughput can always be maintained constant. Accordingly, the transmission performance of the optical transmission device 60 can be improved.

With the bi-directional communication optical transmission device 60, since the transmission direction of the inputted first or second optical signals is switched by the optical switches 101 and 108, transmission directions between a normal time and an emergency can be made different easily. Accordingly, the processing speed of the optical transmission device 60 can be increased.

Furthermore, since the signal levels of optical signals returned in an emergency are kept constant, wavelength variance among optical signals can be surely eliminated. Accordingly, highly accurate optical signals can be transmitted.

(b) First Modified Example of the First Embodiment

According to the foregoing bi-directional communication optical transmission device 60 of the first embodiment, in the first direction changing unit 2, optical signals (first and second optical signals) transmitted in two ways are branched by using the optical circulators 22 and 23. However, instead of the optical circulators 22 and 23, optical couplers may be used for the same purpose. For example, in the case of a bi-directional communication optical transmission device 61 shown in FIG. 9, in a first direction changing unit 2A, optical signals are branched by using optical couplers 26 and 27. These optical couplers 26 and 27 are respectively constructed as wavelength-division multiplexing/demultiplexing type couplers.

Specifically, the optical coupler 26 branches the first optical signals from the optical fiber 60a through the distribution compensator 24 to the optical coupler 20 and the second optical signals demultiplexed by the optical coupler 21 to the optical fiber 60a. The optical coupler 27 branches the second optical signals from the optical fiber 60b through the distribution compensator 25 to the optical coupler 20 and the second optical signals demultiplexed by the optical coupler 21 to the optical fiber 60b.

In this case, also in an emergency side second direction changing unit 3A, optical couplers 36 and 37 may be used instead of the optical circulators 32 and 33 provided in the foregoing second direction changing unit 3 (see FIG. 1).

Accordingly, in an emergency, the optical couplers 36 and 37 function nearly in the same way as the optical circulators 32 and 33. These optical couplers 36 and 37 are also constructed as wavelength-division multiplexing/demultiplexing type optical couplers.

With the bi-directional communication optical transmission device 61, since the optical couplers 26, 27, 36 and 37 are provided, compared with the device using high-priced optical circulators 22, 23, 32 and 33, costs can be reduced for the entire circuitry. Accordingly, costs for constructing an optical transmission device can be reduced.

(c) Second Modified Example of the First Embodiment

Figure 10:
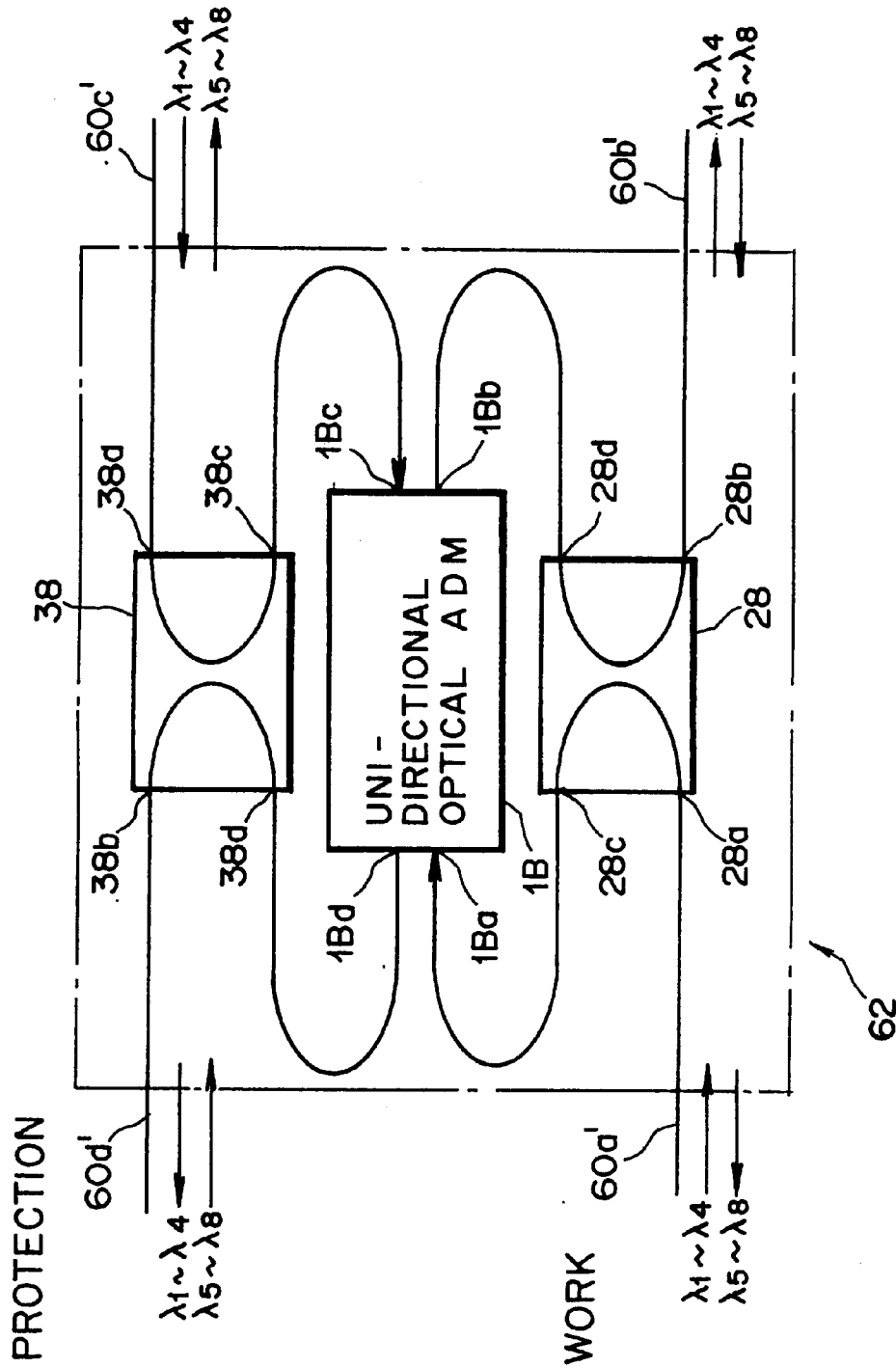
FIG. 10 is a block diagram showing a second modified example of the optical transmission device used for bi-directional optical communications according to the first embodiment of the present invention.

Referring to FIG. 10 which is a block diagram, there is shown a second modified example of the bi-directional communication optical transmission device of the first embodiment.

In the foregoing bi-directional communication optical transmission devices 60 and 61, the bi-directional flows of the optical signals are unified in a single direct-on by using the 1×2 WDM optical couplers 20 and 21 (optical couplers 30 and 31 in an emergency). However, in the second modified example, as shown in FIG. 10, a bi-directional communication optical transmission device 62 is constructed by using a 2×2 WDM optical coupler 28 (2×2 WDM optical coupler 38 in an emergency).

Specifically, the bi-directional communication optical transmission device 62 shown in FIG. 10 is positioned between normal-time optical fibers 60a' and 60b' and between emergency optical fibers 60c' and 60d', and performs specified optical transmission processing for optical signals transmitted through these optical fibers 60a' to 60d'. The bi-directional communication optical transmission device 62 comprises optical couplers 28 and 38 and an optical ADM device 1B.

The optical coupler 28 is constructed as a wavelength-division multiplexing/demultiplexing type optical coupler, which includes a first I/O port 28a connected to the optical fiber 60a', a second I/O port 28b connected to the optical fiber 60b', a third I/O port 28c connected to the normal-time input port 1Ba of the optical ADM device 1B and a fourth I/O port 28d connected to the normal-time output port 1Bb of the optical ADM device 1B.

Specifically, the optical coupler 28 optical-multiplexes the wavelengths of first optical signals inputted to the first I/O port 28a with the wavelengths of second optical signals inputted to the second I/O port 28b and outputs the multiplexed optical signals to the third I/O port 28c. The optical coupler 28 outputs, among processed optical signals inputted to the fourth I/O port 28d, the first optical signals to the second I/O port 28b and the second optical signals to the first I/O port 28a.

In other words, the optical coupler 28 passes the first optical signals (optical signals of wavelengths $\lambda_1$–$\lambda_4$) and crosses the second optical signals (optical signals of wavelengths $\lambda_5$–$\lambda_8$). Accordingly, the flows of the optical signals transmitted in two ways can be unified in a single direction or divided between two directions.

The optical coupler 38 is constructed as a wavelength-division multiplexing/demultiplexing type optical coupler, which includes a first emergency I/O port 38a connected to the optical fiber 60c', a second emergency I/O port 38b connected to the optical fiber 60d', a third emergency I/O port 38c connected to the emergency input port 1Bc of the optical ADM device 1B and a fourth emergency I/O port 38d connected to the emergency output port 1Bd of the optical ADM device 1B.

Specifically, the optical coupler 38 optical-multiplexes the wavelengths of first optical signals inputted to the first emergency I/O port 38a with the wavelengths of second optical signals inputted to the second emergency I/O port 38b and outputs the multiplexed optical signals to the third emergency I/O port 38c. The optical coupler 38 outputs, among optical signals inputted to the fourth emergency I/O port 38d, the first optical signals to the second emergency I/O port 38b and the second optical signals to the first emergency I/O port 38a.

In other words, as in the case of the optical coupler 28, the optical coupler 38 can unify the flows of the optical signals transmitted in two ways in a single direction or divide the flows thereof between two directions.

Figure 11:
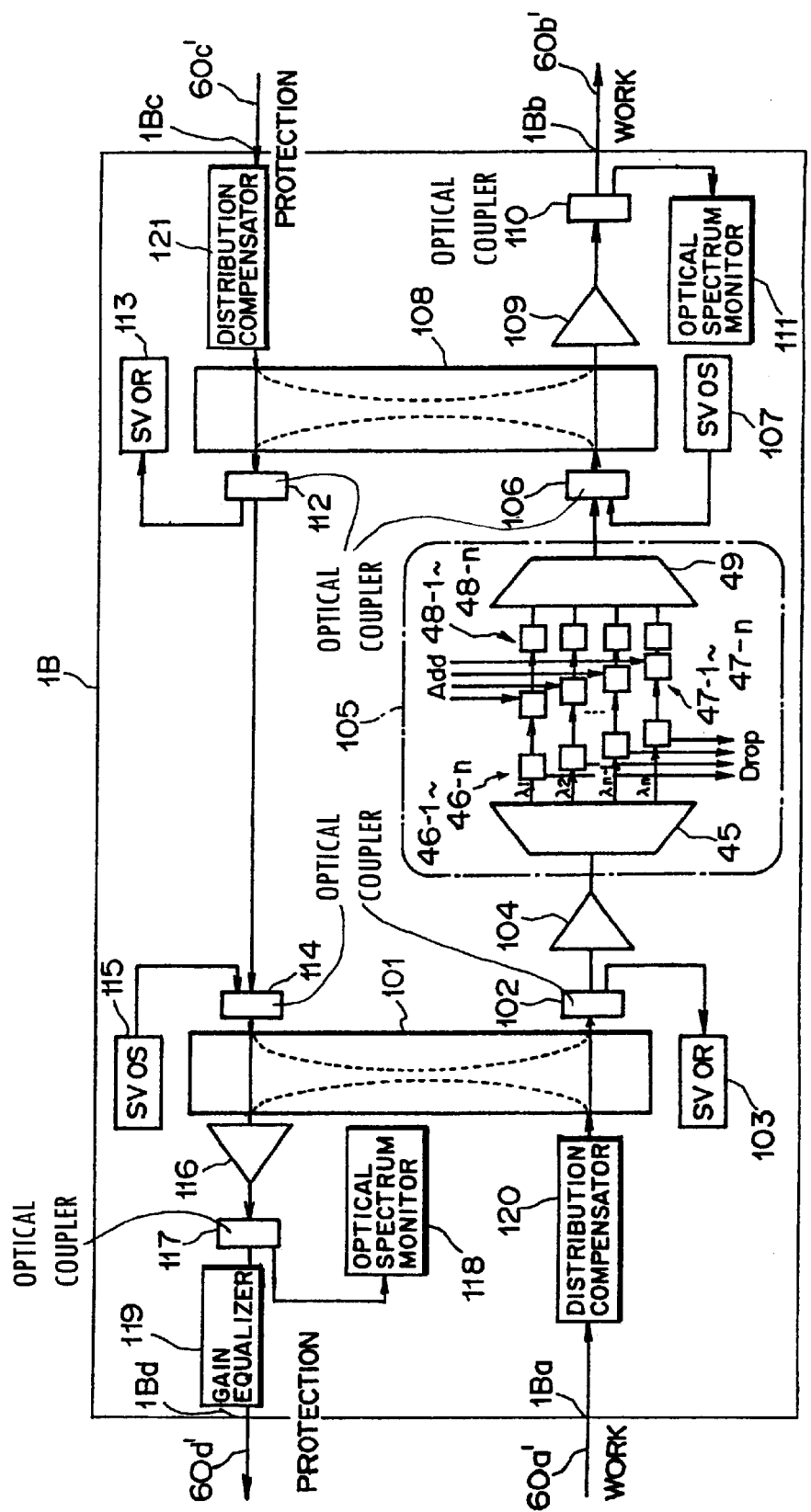
FIG. 11 is a block diagram showing a constitution of a uni-directional optical signal processing unit of the optical transmission device used for bi-directional optical communications shown in FIG. 10.

The optical ADM device 1B shown in FIG. 10 is, for example, constructed in a manner like that shown in FIG. 11. The optical ADM device 1B shown in FIG. 11 has nearly the same constitution as that of the optical ADM device 1 described above with reference to FIG. 2. The optical ADM device 1B is different from the optical ADM device 1 shown in FIG. 2 in that it includes a distribution compensator (distribution compensation fiber; DCF) 120 for compensating the distribution of optical signals inputted through the optical fiber 60a' and a distribution compensator 121 for compensating for the distribution of optical signals inputted through the optical fiber 60c'.

The distribution compensators 120 and 121 function as batch distribution compensating units for compensating for the distributions of first and second optical signals flow-unified in a single direction altogether.

In other words, since the optical signals transmitted in two ways are first unified in a single direction by the optical couplers 28 and 38 and then inputted to the optical ADM device 1B, it is necessary to compensate for the distribution of the optical signals after the optical signals have been inputted to the optical ADM device 1B.

Therefore, in the bi-directional communication optical transmission device 62, different from the foregoing bi-directional communication optical transmission devices 60 and 61 (see FIGS. 1 and 9) in which the distributions of the first and second optical signals are compensated for before the first and second optical signals are inputted to the optical ADM device 1, since the optical signals transmitted in two ways are first unified by the optical couplers 28 and 38 and then the distributions thereof are compensated for altogether, transmission distances between the first and second optical signals transmitted in two ways must be maintained nearly constant.

In other words, since the distributions of the first and second optical signals must be identical or the distributions thereof must be set to a specified permissible value or lower, in the case of the bi-directional communication optical transmission device 62 shown in FIG. 10. a network is constructed by keeping nearly constant distances among the nodes (among the optical ADM devices).

If an optical signal transmission speed is 2.5 Gb/s or lower, since the optical signals can be transmitted for relatively long distances, the distribution compensators 120 and 121 may no be necessary depending on transmission distances. Herein, for the distribution compensators 120 and 121, the distribution compensation fibers are used. However, fiber Bragg gratings may be used.

Figure 12:
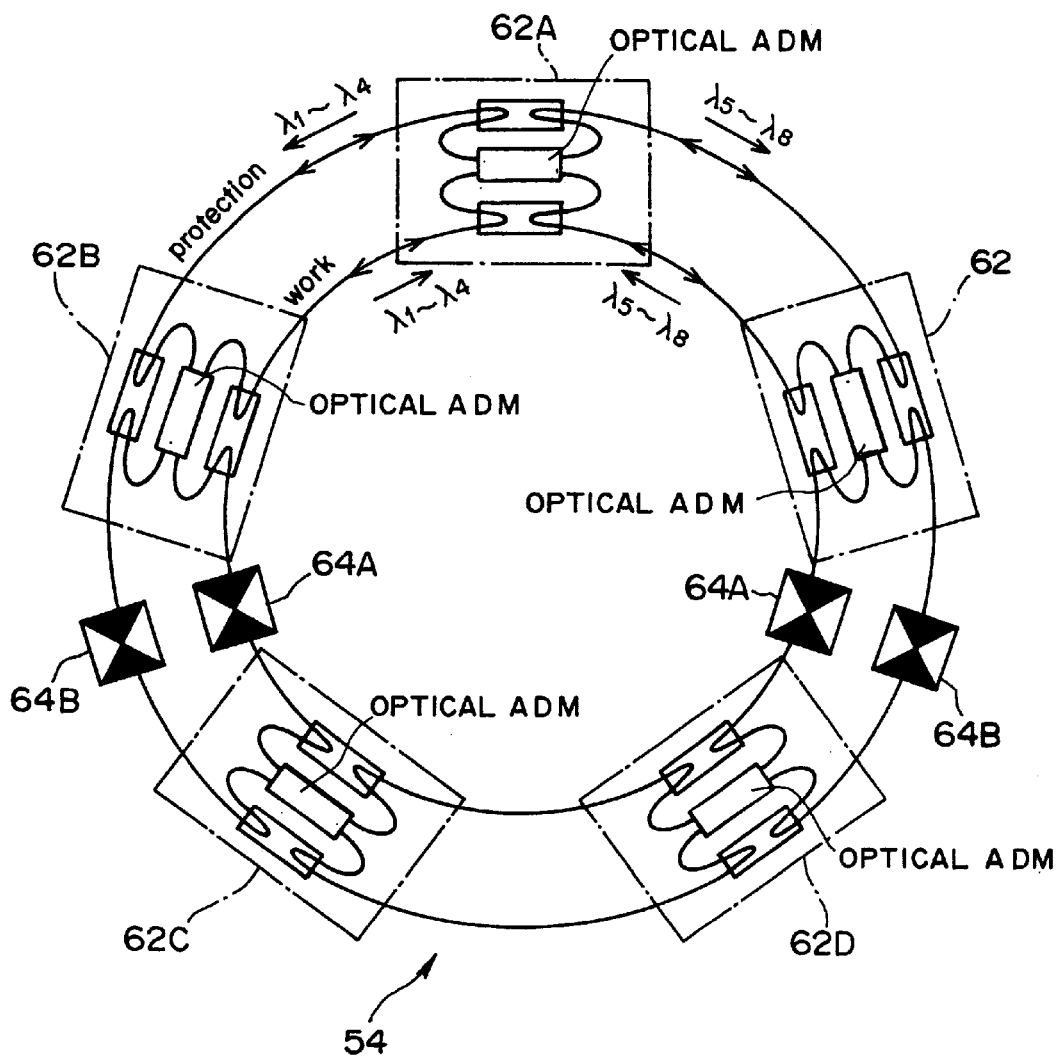
FIG. 12 is a view showing a network constructed by the optical transmission-device used for bi-directional optical communications shown in FIG. 10.

Referring to FIG. 12, there is shown a specific constitutional example of a network employing the bi-directional communication optical transmission device 62. In FIG. 12, a 2 fiber BLSR network 54 is composed of the bi-directional communication optical transmission devices 62 and 62A to 62D. In the drawing, numerical references 64A and 64B respectively denotes bi-directional optical amplifiers which amplify optical signals transmitted in two ways.

Figure 13:
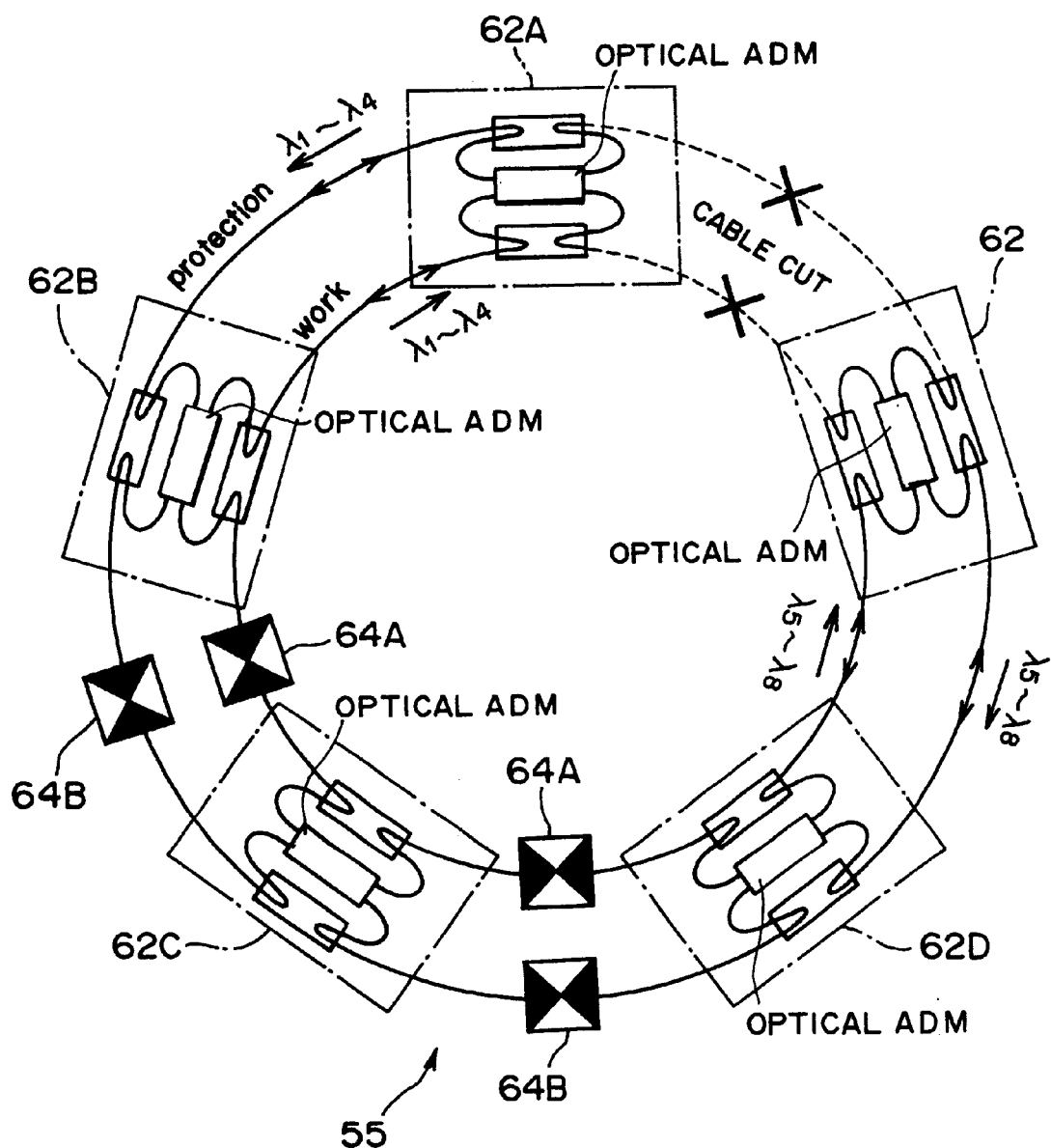
FIG. 13 is a view showing an emergency operation performed in the network constructed by the optical transmission device used for bi-directional optical communications shown in FIG. 10.

A simple 2 fiber BLSR network 54 like that shown in FIG. 12 can be constructed by only adding, for example, the optical coupler 28 to each of optical ADM devices 501 to 505 (see FIG. 21) constituting the foregoing 4 fiber BLSR network 52. Accordingly, for example, as shown in FIG. 13, even if communications are completely cut off between the optical ADM devices 62 and 62A, communications can be performed without any interference as in the case of a normal time.

In other words, as in the case of a UPSR network (see FIG. 22) including two uni-directional optical fibers 81A and 81B, communications having secure transmission capacity can be performed without reducing throughput.

The next section describes the operation of the bi-directional communication optical transmission device 62 of the second modified example of the first embodiment of the present invention.

(c1) Normal-time Operation

First, in the bi-directional communication optical transmission device 62, at a normal time, the first optical signals ($\lambda_1$–$\lambda_4$) having been inputted through the optical fiber 60a' are inputted from the first I/O port 28a of the optical coupler 28. On the other hand, the second optical signals ($\lambda_5$–$\lambda_8$) having been inputted through the optical fiber 60b' are inputted from the second I/O port 28b of the optical coupler 28.

Then, the optical coupler 28 optical-multiplexes the wavelengths of the inputted first and second optical signals and unifies the flows thereof in a single direction. In other words, the first optical signals are passed through while the second optical signals are crossed. The optical signals flow-unified in a single direction are outputted from the third I/O port 28c and then inputted from the normal-time input port 1Ba of the optical ADM device 1B. In the optical ADM device 1B, specified optical transmission processing is performed for these two kinds of optical signals. The operation of the optical ADM device 1B will be described later.

Thereafter, the processed optical signals are outputted from the normal-time output port 1Bb of the optical ADM device 1B. Then, the optical signals are inputted from the fourth I/O port 28d of the optical coupler 28. The optical coupler 28 divides the flow of the optical signals between two directions. In other words, the first optical signals are passed through while the second optical signals are crossed. Then, the first optical signals are outputted from the second I/O port 28b to the optical fiber 60b'. The second optical signals are outputted from the first I/O port 28a to the optical fiber 60a'.

Then, in the foregoing optical ADM 1B, as shown in FIG. 11, at a normal time, the first and second optical signals transmitted in two ways are inputted from the normal-time input port 1Ba. The distribution compensator 120 compensated for the distributions of the first and second optical signals. The distribution compensated optical signals are then passed through the optical switch 101. The optical coupler 102 partially transmits the optical signals to the SVOR 103. Then, the SVOR 103 selects the optical signals of wavelengths to be branched.

Then, in the optical ADM device 1B, the optical amplifier 104 amplifies the optical signals. In the linear ADM unit 105, the optical signals of wavelengths to be branched selected by the SVOR 103 are branched, and then the branched wavelength optical signals are inserted. Subsequently, the optical coupler 106 superimposed the SV signals from the SVOS 107 on the branched/inserted optical signals. Then, the optical signals are passed through the optical switch 108. The optical amplifier 109 then amplifies the optical signals.

Then, the optical coupler 110 partially branches the optical signals to the optical spectrum monitor 111 and transmits the same to the next optical ADM device (not shown). The optical spectrum monitor 111 monitors wavelength deviation or signal branching/insertion states.

In other words, distribution compensation performed by the distribution compensator 120 is added to processing each performed in the optical ADM devices 1, 1A and 1B of the foregoing embodiments.

(c2) If a Failure Occurs in the Vicinity of the Input Side of the Normal-time Transmission lines This section describes the operation of the bi-directional communication optical transmission device 62, for example as shown in FIG. 13, when communications are cut off because of the occurrence of a failure between the bi-directional communication optical transmission device 62 shown in FIG. 10 and an adjacent bi-directional communication optical transmission device (reference numeral 62A; see FIG. 12) connected to the optical fibers 60a' and 60d' thereof.

In this case, the first optical signals are inputted from the optical fiber 60c' rather than from the optical fiber 60a'. In other words, the first optical signals are returned by the bi-directional communication optical transmission device 62A connected to the optical fibers 60a' and 60d' in which communications have been cut off. Then, the first optical signals are passed through the other bi-directional communication optical transmission devices 62B to 62D on the network ring and inputted from the emergency optical fiber 60c' of the bi-directional communication optical transmission device 62.

The first optical signals having been inputted from the optical fiber 60c' are inputted from the first emergency I/O port 38a of the optical coupler 38 and passed through. The optical signals are then outputted from the third emergency I/O port 38c and inputted to the optical ADM device 1B through its emergency input port 1Bc.

Then, in the optical ADM device 1B, as shown in FIG. 11, the distribution compensator 121 compensates for the distribution of the first optical signals. The optical signals are then passed through the optical switch 108. Then, in the SVOR 113, the SV signals are read from the received optical signals partially branched by the optical coupler 112. Then, whether branching/insertion is to be performed for these first optical signals is detected.

As a result, if no branching/insertion is to be performed, the optical switch 108 returns the first optical signals to the optical fiber 60b' side. The optical amplifier 109 amplifies the optical signals. The amplified optical signals are passed through the optical coupler 110 and then outputted from the normal-time output port 1Bb.

If branching/insertion is to be performed, for example if the optical signals of all the wavelengths are to be branched, the optical coupler 114 superimposes the SV signals on the first optical signals. The optical signals are returned to the optical fiber 60b' side by the optical switch 101. Then, as in the case of a normal time, the optical signals are subjected to processing each performed by the optical coupler 102, the SVOR 103 and the amplifier 104. Then, in the linear ADM unit 105, all the optical signals are branched and received.

For partially branching/inserting the optical signals of respective wavelengths, in the linear ADM unit 105, the first optical signals are subjected to branching/insertion as in the case of a normal time. The optical coupler 106 superimposes the SV signals on the optical signals. The optical signals are passed through the optical switch 108 and then subjected to processing each performed by the optical amplifier 109, the optical coupler 110 and the optical spectrum monitor 111. Then, the processed optical signals are outputted from the normal-time output port 1Bb.

Thereafter, the first optical signals having been outputted from the normal-time output port 1Bb are passed through the optical coupler 28 and outputted from the optical fiber 60b'.

On the other hand, the second optical signals having been inputted through the optical fiber 60*b*' are inputted from the second I/O port 28*b* of the optical coupler 28 and crossed. Then, the optical signals are outputted from the third I/O port 28*c* and inputted to the optical ADM device 1B through its normal-time input port 1B*a*.

Then, in the optical ADM device 1B, the distribution compensator 120 compensates for the distribution of the second optical signals. The optical signals are passed through the optical switch 101 and, in the SVOR 103, the SV signals are read from the received optical signals partially branched by the optical coupler 102. Then, whether branching/insertion is to be performed for these second optical signals is detected.

As a result, if no branching/insertion is to be performed, the second optical signals are returned to the optical fiber 60*d*' side by the optical switch 101. The optical amplifier 116 amplifies the optical signals. The amplifies optical signals are passed through the optical coupler 117 and then outputted from the emergency output port 1B*d*.

If branching/insertion is to be performed, for example if the optical signal of all the wavelengths are to be branched, as in the case of a normal time, the optical signals are subjected to processing each performed by the optical coupler 102, the SVOR 103 and the amplifier 104. Then, in the linear ADM unit 105, all the signals are branched and received.

For partially branching/inserting the optical signals of respective wavelengths, in the linear ADM unit 1–5, branching/insertion is performed for the second optical signals as in the case of a normal time. The optical coupler 106 superimposes the SV signals on the optical signals. Then, the optical signals are returned to the optical fiber 60*d*' side by the optical switch 108 and passed through the optical couplers 112 and 114, the optical switch 101, the optical amplifier 116. the optical coupler 117 and the optical spectrum monitor 118. Then, the gain equalizer 119 adjusts the gains of the optical signals. The gain adjusted optical signals are then outputted from the emergency output port 1B*d*.

Thereafter, the outputted second optical signals are crossed by the optical coupler 38 and outputted from the optical fiber 60*c*'.

In other words, if communications are cut off between the bi-directional communication optical transmission devices 62 and 62A, the optical communications are performed by using the normal-time optical fiber 60*b*' and the emergency optical fiber 60*c*'.

(c3) If a Failure Occurs in the Vicinity of the Output Side of the Normal-time Transmission Lines This section describes the operation of the bi-directional communication optical transmission device 62 when communications are cut off because of the occurrence of a failure between the bi-directional communication optical transmission device 62 shown in FIG. 10 and an adjacent bi-directional communication optical transmission device (reference numeral 62D; see FIG. 12) connected to the optical fibers 60*b*' and 60*c*' thereof.

In this case, the first optical signals are inputted from the optical fiber 60*a*'. These optical signals are then inputted from the first I/O port 28*a* of the optical coupler 28, passed through and outputted from the third I/O port 28*c*. Then, the optical signals are inputted to the optical ADM device 1B through its normal-time input port 1B*a*.

Then, in the optical ADM device 1B, the distribution compensator 120 compensates for the distribution of these first optical signals. The optical signals are then passed through the optical switch 101 and, in the SVOR 103, the SV signals are read from the received optical signals partially branched by the optical coupler 102. Then, whether branching/insertion is to be performed or not for the first optical signals is detected.

As a result, if no branching/insertion is to be performed, the first optical signals are returned to the optical fiber 60*d*' side by the optical switch 101. The optical amplifier 116 amplifies these optical signals. The amplified optical signals are then passed through the optical coupler 117 and outputted from the emergency output port 1B*d*.

If branching/insertion is to be performed, for example if the optical signals of all the wavelengths are to be branched, as in the case of a normal time, the optical signals are subjected to processing each performed by the optical coupler 102, the SVOR 103 and the amplifier 104. Then, in the linear ADM unit 105, all the optical signals are branched and received.

For partially branching/inserting the optical signals of respective wavelengths, as in the case of a normal time, in -he linear ADM unit 105, branching/insertion is performed for the first optical signals. The optical coupler 106 superimposed the SV signals on these optical signals. The optical signals are then returned to the optical fiber 60*d*' side by the optical switch 108 and passed through the optical couplers 112 and 114, the optical switch 101, the optical amplifier 116, the optical coupler 117 and the optical spectrum monitor 118. The gain equalizer 119 then adjusts the gains of the optical signals. The gain adjusted optical signals are then outputted from the emergency output port 1B*d*.

On the other hand, the second optical signals are inputted from the optical fiber 60*d*' rather than from the optical fiber 60*b*'. In other words, the second optical signals are returned by the bi-directional communication optical transmission device 62D connected to the optical fibers 60*b*' and 60*c*' in which communications have been cut off. The returned second optical signals are then passed through the other bi-directional communication optical transmission devices 62C, 62B and 62A on the network ring and inputted from the emergency optical fiber 60*d*' of the bi-directional communication optical transmission device 62.

The second optical signals having been inputted through the optical fiber 60*d*' are inputted from the fourth emergency I/O port 38*b* of the optical coupler 38 and crossed. Then, the optical signals are outputted from the third emergency I/O port 38*c* and inputted to the optical ADM device 1B through its emergency input port 1B*c*.

Then, in the optical ADM device 1B, the distribution compensator 121 compensates for the distribution of these second optical signals. The optical signals are then passed through the optical switch 108 and, in the SVOR 113, the SV signals are read from the received optical signals partially branched by the optical coupler 112. Then, whether branching/insertion is to be performed or not for these second optical signals is detected.

As a result, if no branching/insertion is to be performed, the second optical signals are returned to the optical fiber 60*b*' side by the optical switch 108. Then, the returned optical signals are passed through the optical amplifier 109 and the optical coupler 110 and outputted from the normal-time output port 1B*b*.

If branching/insertion is to be performed, for example if the optical signals of all the wavelengths are to be branched, the optical coupler 114 superimposes the SV signals on the optical signals. The optical signals are then returned to the optical fiber 60b' side by the optical switch 101 and subjected to processing each performed by the units 102 to 104 as in the case of a normal time. Then, in the linear ADM unit 105, all the optical signals are branched and received.

For partially branching/inserting the optical signals of respective wavelengths, as in the case of a normal time, in the linear ADM unit 105, branching/insertion is performed for the optical signals. The optical coupler 106 superimposes the SV signals on the optical signals. Then, the optical signals are passed through the optical switch 108 and subjected to processing each performed by the optical amplifier 109, the optical coupler 110 and the optical spectrum monitor 111. The processed optical signals are then outputted from the normal-time output port 1Bb.

Thereafter, these outputted second optical signals are crossed by the optical coupler 28 and outputted from the optical fiber 60a'.

In other words, if communications are cut off between the bi-directional communication optical transmission devices 62 and 62B, the optical communications are performed by using the normal-time optical fiber 60a' and the emergency optical fiber 60d'.

(c4) If a Failure Occurs in Areas not in the Vicinity

This section describes the operation of the bi-directional communication optical transmission device 62 when a failure occurs in areas other than between the bi-directional communication optical transmission devices 62 and 62A or between the bi-directional communication optical transmission devices 62 and 62D.

In this case, as in the case of a normal time, optical signals are transmitted by using all the normal-time and emergency optical fibers 60a' to 60d'.

Specifically, the first optical signals transmitted from the bi-directional communication optical transmission device 62A are inputted from the optical fiber 60a'. Then, these optical signals are passed through the optical coupler 28 and inputted to the optical ADM device 1B through its normal-time input port 1Ba.

Then, in the optical ADM device 1B, the distribution compensator 120 compensates for the distribution of the first optical signals. The distribution compensated optical signals are passed through the optical switch 101 and subjected to specified optical transmission processing including branching/insertion each performed by the units 102 to 111. The processed optical signals are outputted from the normal-time output port 1Bb. Then, these outputted optical signals are passed through the optical coupler 28 and outputted from the optical fiber 60b'.

On the other hand, the first optical signals transmitted from the bi-directional communication optical transmission device 62D are inputted from the optical fiber 60c'. These optical signals are then passed through the optical coupler 38 and inputted to the optical ADM device 1B through its emergency input port 1Bc.

Then, in the optical ADM device 1B, the distribution compensator 121 compensates for the distribution of these first optical signals. The distribution compensated optical signals are passed through the optical switch 108 and subjected to processing each performed by the units 112 to 115. Then, the optical signals are passed through the optical switch 101 and subjected to processing each performed by the units 116 to 119. The processed optical signals are then outputted from the emergency output port 1Bd. Then, the outputted first optical signals are passed through the optical coupler 38 and outputted from the optical fiber 60d'.

Since the branching/insertion is performed while the first optical signals are being transmitted through the normal-time optical fibers 60a' and 60b' from the bi-directional communication optical transmission device 62A, the first optical signals transmitted from the bi-directional optical transmission device 62D are simply passed. In other words, in the optical fibers 60c' and 60d', distribution compensation is performed, the SV signals are read/written and then the optical signals are amplified and sent out.

The second optical signals transmitted from the bi-directional communication optical transmission device 62D are inputted from the optical fiber 60b'. The second optical signals are then crossed by the optical coupler 28 and inputted to the optical ADM device 1B through its normal-time input port 1Ba.

Then, in the optical ADM device 1B, the distribution compensator 120 compensates for the distribution of these second optical signals. The distribution compensated optical signals are then passed through the optical switch 101 and subjected to specified optical transmission processing each performed by the units 102 to 111. The processed optical signals are then outputted from the normal-time output port 1Bb. Then, these outputted second optical signals are crossed by the optical coupler 28 and outputted from the optical fiber 60a'.

On the other hand, the second optical signals transmitted from the bi-directional communication optical transmission device 62A are inputted through the optical fiber 60d'. These second optical signals are then crossed by the optical coupler 38 and inputted to the optical ADM device 1B through its emergency input port 1Bc.

Then, in the optical ADM device 1B, the distribution compensator 121 compensated for the distribution of the second optical signals. The distribution compensated optical signals are then passed through the optical switch 108 and subjected to processing each performed by the units 112 to 115. These optical signals are also passed through the optical switch 101 and subjected to processing each performed by the units 116 to 119. The processed optical signals are then outputted from the emergency output port 1Bd. Then, these outputted second optical signals are passed through the optical coupler 38 and outputted from the optical fiber 60c'.

Since the branching/insertion is performed while the second optical signals are being transmitted through the normal-time optical fibers 60a' and 60b' from the bi-directional communication optical transmission device 62A, the second optical signals transmitted from the bi-directional communication optical transmission device 62D are simply passed. In other words, in the optical fibers 60c' and 60d', distribution compensation is performed, the SV signals are read/written and then the optical signals are amplified and sent out.

Therefore, with the bi-directional communication optical transmission device 62, since the flows of optical signals transmitted in two ways are unified in a single direction or divided between two directions by using the 2×2 optical couplers 28 and 38, the circuitry can be simplified. Accordingly, the entire optical communication system can be reduced in size.

In addition, since the distributions of the first and second optical signals are batch-compensated for, the circuitry can be simplified.

(d) Second Embodiment

Figure 14:
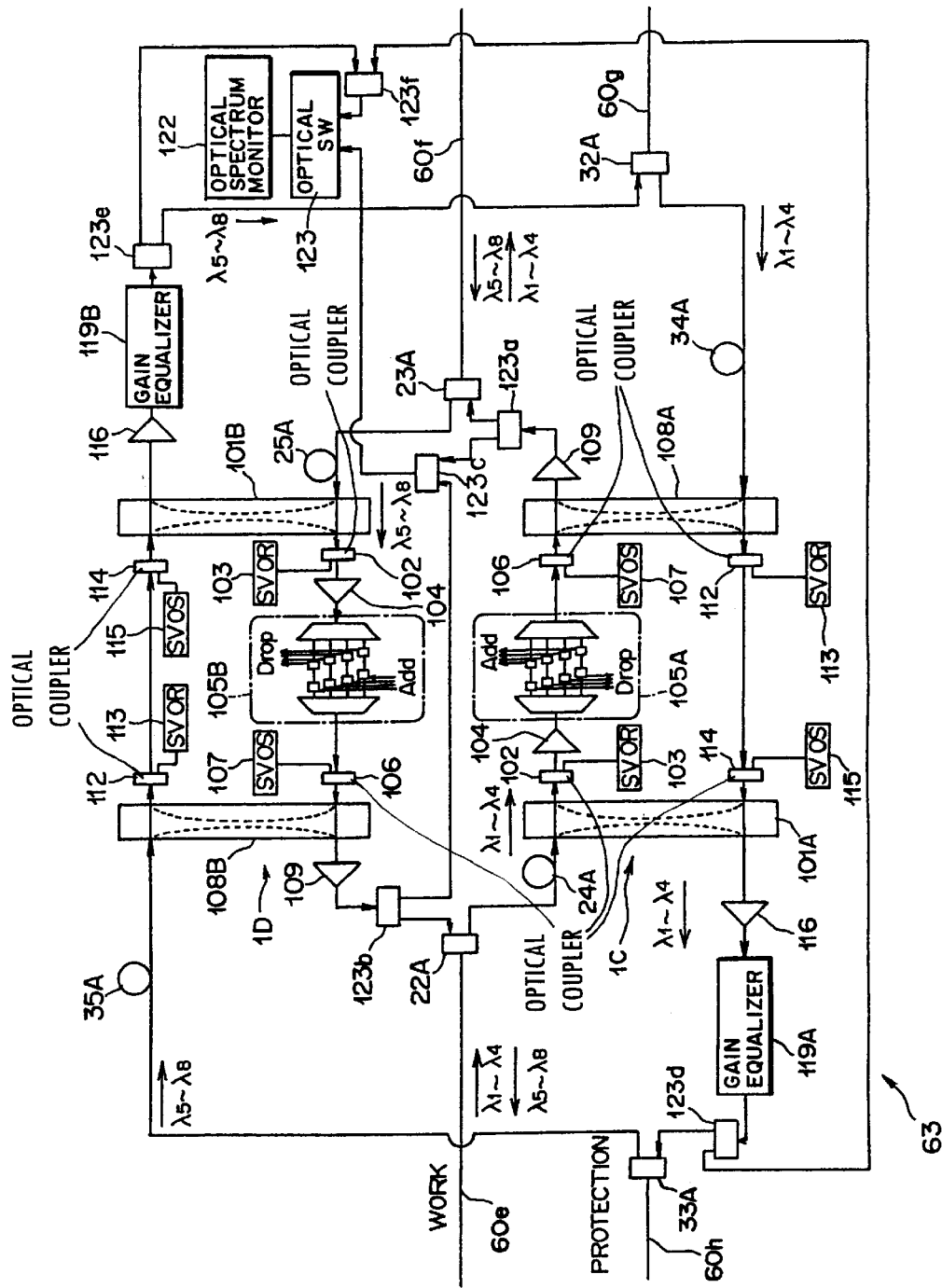
FIG. 14 is a block diagram showing a constitution of an optical transmission device used for bi-directional optical communications according to a second embodiment of the present invention.

Referring to FIG. 14 which is a block diagram, there is shown a constitution of a bi-directional communication optical transmission device 63. The bi-directional communication optical transmission device (optical ADM device) 63 shown in FIG. 14 is positioned between optical fibers (bi-directional communication optical transmission lines) 60e and 60f for performing bi-directional optical communications by transmitting optical signals of wavelengths different between clockwise and counterclockwise directions, and performs specified optical transmission processing for the optical signals transmitted through the optical fibers 60e and 60f. The bi-directional communication optical transmission device 63 comprises first and second optical ADM units 1C and 1D, optical couplers 22A and 23A and optical spectrum monitor 122.

The first optical ADM unit (first optical signal processing unit) 1C performs specified optical signal processing for clockwise optical signals (first optical signals; $\lambda_1$–$\lambda_4$). The second optical ADM unit (second optical signal processing unit) 1D performs specified optical signal processing for counterclockwise optical signals (second optical signals; $\lambda_5$–$\lambda_3$)

Figure 9:
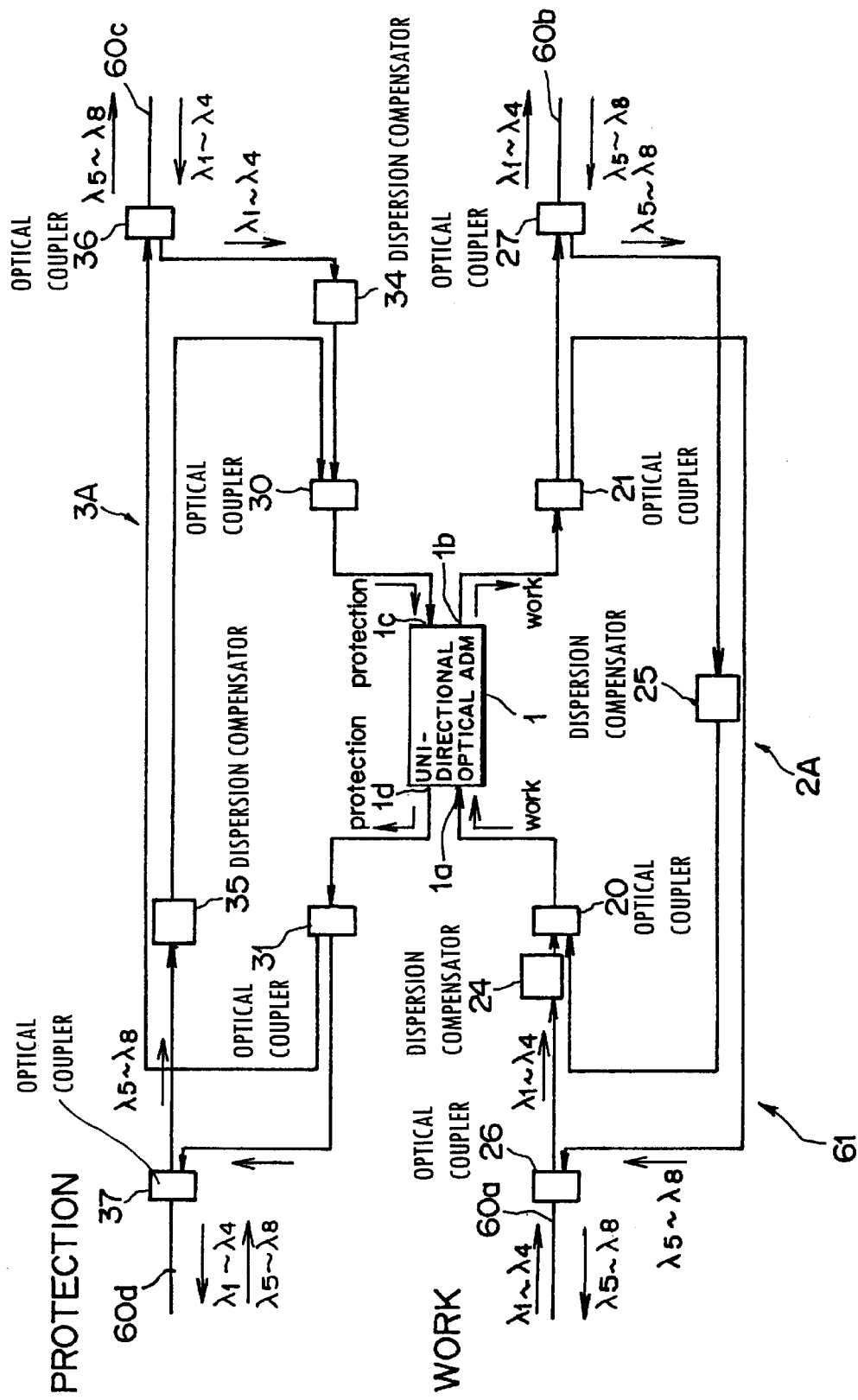
FIG. 9 is a block diagram showing a first modified example of the optical transmission device used for bi-directional optical communications according to the first embodiment of the present invention.

In the foregoing first embodiment, specified optical transmission processing is performed for optical signals transmitted in two ways by using the existing optical ADM devices 1, 1A and 1B (see FIGS. 1, 9 and 10). However, in the second embodiment, the optical ADM device itself is constructed for performing bi-directional optical communications. The optical ADM units 1C and 1D will be described later.

The optical coupler (first branching unit) 22A branches first optical signals inputted through the optical fiber 60e to the first optical ADM unit 1C and second optical signals supplied from the second optical ADM unit 1D to the optical fiber 60e. The optical coupler (second branching unit) 23A branches second optical signals inputted through the optical fiber 60f to the second optical ADM unit 1D and first optical signals supplied from the first optical ADM unit 1C to the optical fiber 60f.

In other words, the optical couplers 22A and 23A divide optical signals into the first and second optical signals transmitted in two ways through the optical fibers 60e and 60f at a normal time, and specified optical transmission processing can be performed individually for these optical signals.

Now, the first optical ADM unit 1C will be described in detail. Specifically, as shown in FIG. 14, the first optical ADM unit 1C includes a distribution compensator 24A, an optical switch 101A, an optical coupler 102, a monitoring signal receiving unit (SVOR) 103, an optical amplifier 104, a linear ADM unit 105A, an optical coupler 106, a monitoring signal sending unit (SVOS) 107, an optical switch 108A and an optical amplifier 109. The units having the same reference numerals as those of the foregoing denote -he same units and thus detailed description thereof will be omitted.

The distribution compensator (third distribution compensator) 24A compensates for the distribution of the first optical signals inputted through the optical fiber 60e. The optical switch (first returning optical switch) 101A returns, when bi-directional communications through the optical fiber 60f are made impossible, the first optical signals inputted through the optical fiber 60e to emergency optical fibers 60g and 60h. At a normal time, the optical switch 101A allows the first optical signals to pass through.

The linear ADM unit (acid/drop processing unit) 105A performs optical signal branching/insertion (add/drop processing) by wavelength units for inputted optical signals. This linear ADM unit 105A is constructed in the same way as the foregoing linear ADM unit 105 (see FIG. 2). Accordingly, the linear ADM unit 105A includes an optical wavelength demultiplexer 45, branching optical switches 46-1 to 46-n, insertion optical switches 47-1 to 47-n, optical attenuators 48-1 to 48-n and an optical wavelength multiplexer 49 (reference numerals are omitted in FIG. 14) and functions in the say way as the linear ADM unit 105.

As in the case of the linear ADM unit 105, branching/insertion in the linear ADM unit 105A may be performed by using an acousto-optical tunable filter (AOTF; see reference numeral 7 in FIG. 3), an arrayed waveguide grating (AWG) or a fiber Bragg grating.

As in the case of the foregoing optical switch 101A, the optical switch (first returning optical switch) 108A returns, when bi-directional communications through the optical fiber 60f are made impossible, the first optical signals inputted through the optical fiber 60e to the later-described emergency optical fibers 60g and 60h. At a normal time, the optical switch 108A allows the first optical signals to pass through.

The bi-directional communication optical transmission device 63 is also positioned between the optical fibers (emergency bi-directional communication optical transmission lines) 60g and 60h used for performing, in an emergency when bi-directional communications through the optical fibers 60e and 60f are made impossible, the bi-directional communications instead these optical fibers 60e and 60f. The bi-directional communication optical transmission device 63 performs specified optical signal processing.

Also in this case, by using the first and second optical ADM units 1C and 1D, optical signals transmitted in two ways through the optical fibers 60g and 60h in an emergency are divided by optical couplers 32A and 33A.

Accordingly, as shown in FIG. 14, the first optical ADM unit 1C includes a distribution compensator 34A, an optical switch 108A, an optical coupler 112, a monitoring signal receiving unit (SVOR) 113, an optical coupler 114, a monitoring signal sending unit (SVOS) 115, an optical switch 101A, an optical amplifier 116 and a gain equalizer 119A. The units having the same reference numerals as those of the foregoing units denote the same units and thus detailed description thereof will be omitted.

The distribution compensator (fifth distribution compensator) 34A compensates for the distribution of first optical signals returned by another optical transmission device and inputted through the optical fiber 60g in an emergency.

In other words, in the first optical ADM unit 1C, the distribution of the first optical signals inputted at a normal time and the distribution of the first optical signals inputted in an emergency can be individually compensated for by the distribution compensators 24A and 34A.

The gain equalizer 119A keeps constant the signal levels of the first optical signals returned to the optical fiber 60h by the optical switches 101A and 108A in the emergency. The gains of the first optical signals are adjusted by wavelength units. In other words, this gain equalizer 119A functions as an emergency optical signal level adjusting unit.

The second optical ADM unit 1D shown in FIG. 14 includes, for example, a distribution compensator 25A, an optical switch 101B, an optical coupler 102, a monitoring signal receiving unit (SVOR) 103, an optical amplifier 104, a linear ADM unit 105B, an optical coupler 106, a monitoring signal sending unit (SVOS) 107, an optical switch 108B and an optical amplifier 109. The units having the same reference numerals as those of the foregoing units denote the same units and thus detailed description thereof will be omitted.

The distribution compensator (fourth distribution compensator) 25A compensated for the distribution of second optical signals inputted through the optical fiber 60f. The optical switch (second returning optical switch) 101B returns, when bi-directional communications through the optical fiber 60e are made impossible, the second optical signals inputted through the optical fiber 60f to the emergency optical fiber 60g. At a normal time, the optical switch 101B allows the second optical signals to pass through.

The linear ADM unit (add/drop processing unit) 105B performs branching/insertion (add/drop processing) by wavelength units for inputted optical signals. This linear ADM unit 105B is also constructed in the same way as the linear ADM unit 105 (see FIG. 2). Accordingly, the linear ADM unit 105B includes an optical wavelength demultiplexer 45, branching optical switches 46-1 to 46-n, insertion optical switches 47-1 to 47-n, optical attenuators 48-1 to 48-n and an optical wavelength multiplexer 49 (reference numerals are omitted in FIG. 14) and functions in the same way as the linear ADM unit 105.

As in the cases of the linear ADM units 105 and 105A, branching/insertion in this linear ADM unit 105B may be performed by using an AOTF, AWG or fiber Bragg grating.

As in the case of the foregoing optical switch 101A, the optical switch (second returning optical switch) 108B returns, when bi-directional communications through the optical fiber 60e are made impossible, the second optical signals inputted through the optical fiber 60f to the emergency optical fiber 60g. At a normal time, the optical switch 108A allows the second optical signals to pass through.

The second optical ADM unit 1D is also positioned, as in the case of the foregoing first optical ADM unit 1C, between the optical fibers 60g and 60h used for performing, in an emergency when bi-directional communications through the optical fibers 60e and 60f are made impossible, the bi-directional communications instead of the optical fibers 60e and 60f. Accordingly, as shown in FIG. 14, the second optical ADM unit 1D includes a distribution compensator 35A, an optical switch 108B, an optical coupler 112, a monitoring signal receiving unit (SVOR) 113, an optical coupler 114, a monitoring signal sending unit (SVOS) 115, an optical switch 101B, an optical amplifier 116 and a gain equalizer 119B. The units having the same reference numerals as those of the foregoing units denote the same units and thus detailed description thereof will be omitted.

The distribution compensator (sixth distribution compensator) 35A compensates for the distribution of second optical signals returned by another optical transmission device and inputted through the optical fiber 60h in an emergency.

In other words, in the second optical ADM unit 1D, the distribution of the second optical signals inputted at a normal time and the distribution of the second optical signals inputted in an emergency can be individually compensated for by the distribution compensators 25A and 35A.

The gain equalizer 119B keeps constant the signal levels of the second optical signals returned to the optical fiber 60g by the optical switch 108B in the emergency. The gains of the second optical signals are adjusted by wavelength units. In other words, as in the case of the foregoing gain equalizer 119A provided in the first optical ADM unit 1C, this gain equalizer 119B also functions as an emergency optical signal level adjusting unit.

The optical coupler (third branching unit) 32A shown in FIG. 14 branches the first optical signals returned by another optical transmission device and inputted through the optical fiber 60g in the emergency to the first optical ADM unit 1C and the second optical signals supplied from the second optical ADM unit 1D in the emergency to the optical fiber 60g. The optical coupler (fourth branching unit) 33A branches the second optical signals returned by another optical transmission device and inputted through the optical fiber 60h in the emergency to the second optical ADM unit 1D and the first optical signals supplied from the first optical ADM unit 1C in the emergency to the optical fiber 60h.

In other words, these optical couplers 32A and 33A divide the first and second optical signals transmitted in two ways through the optical fibers 60g and 60h in the emergency. Specified optical transmission processing can be performed individually for these optical signals.

The optical spectrum monitor (spectrum monitoring unit) 122 shown in FIG. 14 monitors the respective spectral states of the first optical signals processed in the first optical ADM unit 1C at a normal time, the second optical signals processed in the second optical ADM unit 1D at a normal time, the first optical signals processed in the first optical ADM unit 1C in an emergency and the second optical signals processed in the second optical ADM unit 1D in an emergency.

Specifically, for all the optical signals (optical signals of totally four kinds) processed by the bi-directional communication optical transmission device 63, this optical spectrum monitor 122 monitors (checks) the states of the optical signals based on the spectra of eight waves so as to determine whether there are missing optical signals or not, whether wavelength deviation exists or not, or whether optical signal branching/insertion is being correctly performed or not.

Accordingly, in order to detect optically transmitted optical signals, optical couplers 123a to 123f are provided on the transmission lines of the bi-directional communication optical transmission device 63.

The optical coupler 123a branches the first optical signals processed in the first optical ADM unit 1C at a normal time. This optical coupler 123a is positioned in a position just before the optical coupler 23A multiplexes these first optical signals with the second optical signals. The optical coupler 123b branches the second optical signals processed in the second optical ADM unit 1D at a normal time. This optical coupler 123b is positioned in a position just before the optical coupler 22A multiplexes these second optical couplers with the first optical signals.

The optical signals branched by the optical couplers 123a and 123b are then multiplexed by the optical coupler 123c and transmitted to the optical spectrum monitor 122.

The optical coupler 123d branches the first optical signals processed in the first optical ADM unit 1C in an emergency. This optical coupler 123d is positioned in a position just before the optical coupler 33A multiplexes these first optical signals with the second optical signals. The optical coupler 123e branches the second optical signals processed in the second optical ADM unit 1D in an emergency. This optical coupler 123e is positioned just before the optical coupler 32A multiplexes these second optical signals with the first optical signals.

The optical signals branched by the optical couplers 123d and 123e are then multiplexed by the optical coupler 123f and transmitted to the optical spectrum monitor 122.

The optical spectrum monitor 122 also alternately monitors the spectral states of the optical signals transmitted by the optical coupler 123c at a normal time and the spectral states of the optical signals transmitted by the optical coupler 123f in an emergency at specified cycles. The division of this monitoring is performed by an optical spectrum monitor switch (optical SW, 2×1 switch) 123.

In other words, since the optical spectrum monitor switch 123 can alternately switch any inputted optical signals, optical signals in a plurality of areas can be monitored only by providing one optical spectrum monitor 122.

Specifically, by the optical spectrum monitor switch 123, only the optical signals from the optical coupler 123c are monitored at a normal time. In an emergency, by switching the optical spectrum monitor switch 123, the optical signals from the optical coupler 123c and the optical signals from the optical coupler 123f are alternately monitored.

In this case, the optical spectrum monitor 122 monitors the optical signals, for example each second. A switching speed of the optical spectrum monitor switch 123 can be sufficiently dealt with the existing 2×1 optical coupler. Accordingly, with the bi-directional communication optical transmission device 63, since four signals can be simultaneously monitored by one optical spectrum monitor 122, costs can be reduced for the entire device.

The next section describes, by referring to FIGS. 15 to 18, the operation of the foregoing bi-directional communication optical transmission device 63 of the second embodiment of the present invention.

(d1) Operation at a Normal Time

Figure 15:
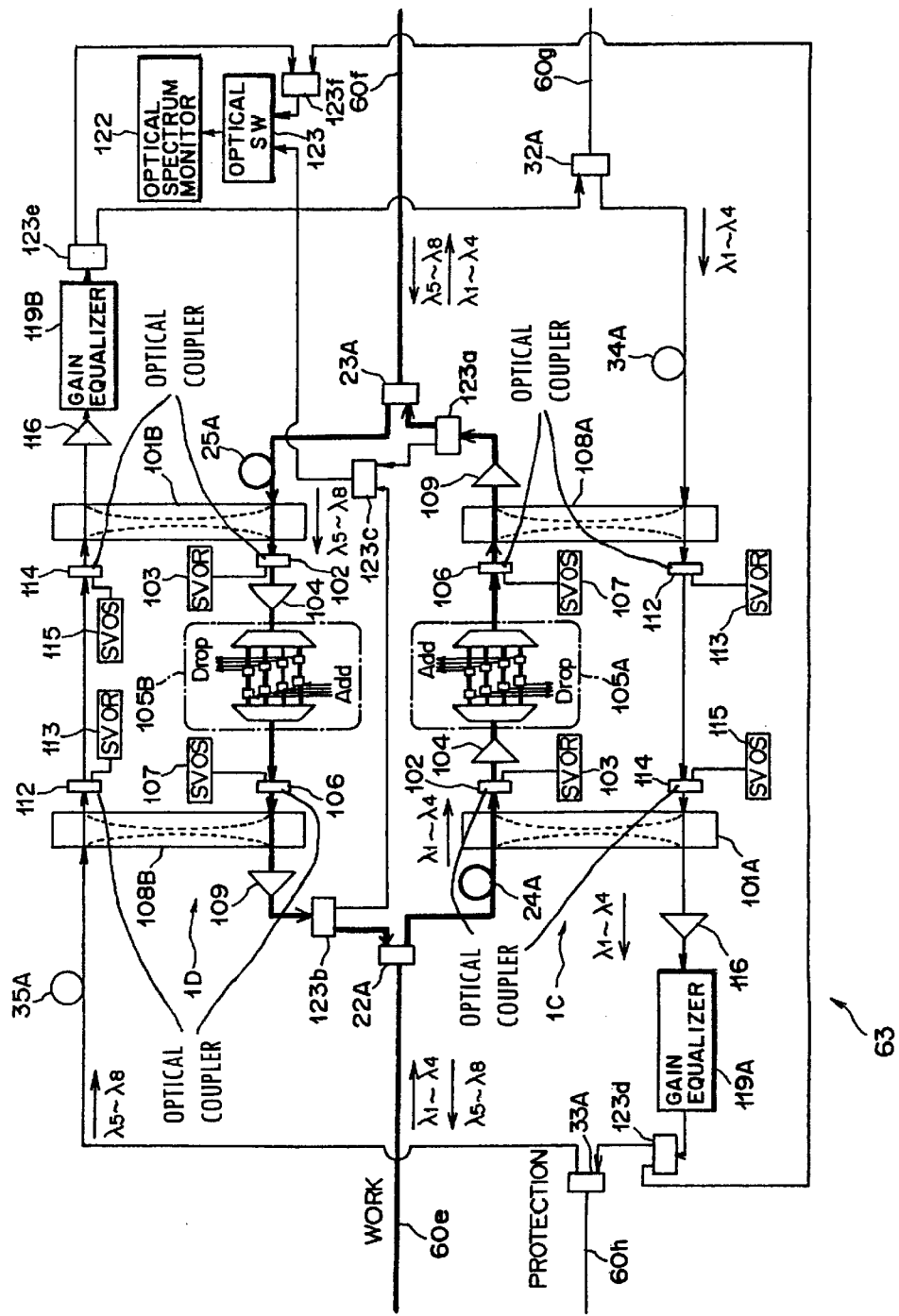
FIG. 15 is a view illustrating a normal-time operation of the optical transmission device used for bi-directional optical communications according to the second embodiment of the present invention.

First, at a normal time, in the bi-directional communication optical transmission device 63, as shown in FIG. 15, the first optical signals ($\lambda_1$–$\lambda_4$) are inputted through the optical fiber 60e. The optical coupler 22A branches these first optical signals to the first optical ADM device 1C side. Then, the distribution compensator 24A compensated for the distribution of the optical signals. The distribution compensated optical signals are subjected to processing including branching/insertion each performed by the switching units 101A to and 108(a). In this case, the optical signals are passed through the optical switches 101A and 108A.

Then, the optical coupler 23A branches the first optical signals subjected to optical transmission processing in the first optical ADM device 1C to the optical fiber 60f side.

On the other hand, the second optical signals ($\lambda_1$–$\lambda_8$) inputted through the optical fiber 60f are branched to the second optical ADM device 1D side by the optical coupler 23A. The distribution compensator 25A then compensates for the distribution of these optical signals. The distribution compensated optical signals are subjected to processing including branching/insertion each performed by the switching units 101B to and 108(a). In this case, the optical signals are passed through the optical switches 101B and 108B.

Then, the optical coupler 22A branches these second optical signals subjected to optical transmission processing in the second optical ADM device 1D to the optical fiber 60e side.

The optical spectrum monitor 122 then partially branches the optical signals respectively subjected to optical transmission processing in the first and second optical ADM devices 1C and 1D by the optical couplers 123a and 123b, multiplexes these optical signals by the optical coupler 123c and then monitors the states of the multiplexed optical signals.

Figure 16:
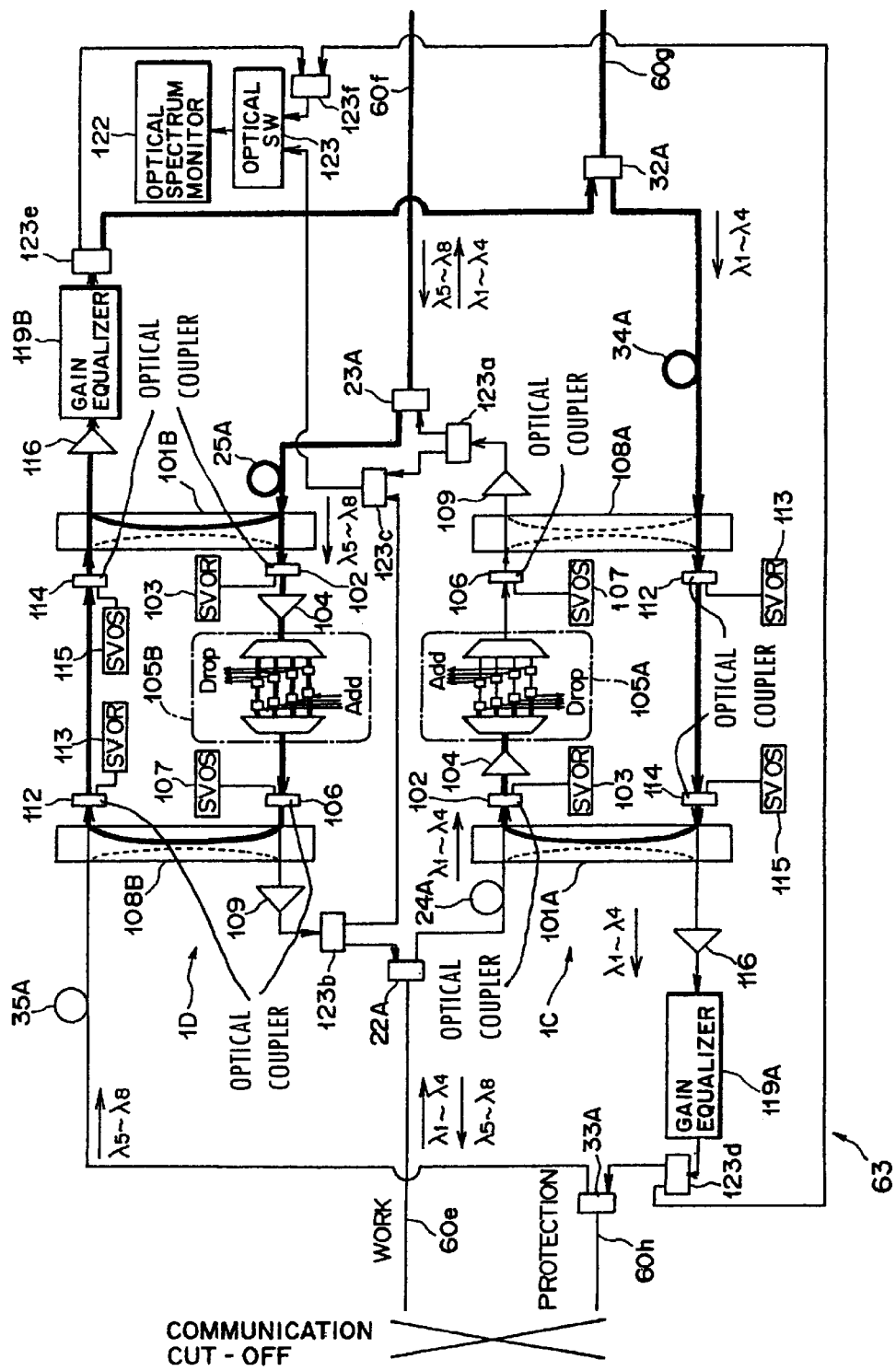
FIG. 16 is a view illustrating an emergency operation of the optical transmission device used for bi-directional optical communications according to the second embodiment of the present invention.

(d2) If a Failure Occurs in the Vicinity of the Input Side of the Normal-time Transmission Lines This section describes, by referring to FIG. 16, the operation of the bi-directional communication optical transmission device 63 when communications are cut off because of the occurrence of a failure between the bi-directional communication optical transmission device 63 shown in FIG. 14 and an adjacent bi-directional communication optical transmission device (not shown; 63A) connected to the optical fibers 60e and 60h thereof.

In this case, the first optical signals are inputted from the optical fiber 60g rather than from the optical fiber 60e. In other words, the first optical signals are returned by the bi-directional communication optical transmission device 63A connected to the optical fibers 60e and 60h in which communications have been cut off. The returned optical signals are passed through another bi-directional communication optical transmission device (not shown) on the network ring and then inputted from the emergency optical fiber 60g of the bi-directional communication optical transmission device 63.

Then, the optical coupler 32A branches these first optical signals inputted from the optical fiber 60g. The distribution compensator 34A compensates for the distribution of the optical signals. The distribution compensated optical signals are passed through the optical switch 108A. Then, in the SVOR 113, the SV signals are read from the received optical signals partially branched by the optical coupler 112, and whether branching/insertion is to be performed or not for these first optical signals is detected.

As a result, if no branching/insertion is to be performed, these first optical signals are returned to the optical fiber 60f side by the optical switch 108A. The optical amplifier 109 amplifies these optical signals. The amplified optical signals are passed through the optical coupler 23A and outputted from the optical fiber 60f.

If branching/insertion is to be performed only for the optical signals of some specified wavelengths, the first optical signals are returned to the optical fiber 60f side by the optical switch 101A. Then, as in the case of a normal time, these returned optical signals are subjected to processing each performed by the units 102 to 104. Then, in the linear ADM unit 105A, the optical signals are subjected to branching/insertion as in the case of a normal time. The optical coupler 106 superimposes the SV signals on the optical signals. The optical signals are then passed through the optical switch 108A. Then. the optical signals are passed through the optical amplifier 109 and the optical coupler 23A and then outputted from the optical fiber 60f.

If the optical signals of all the wavelengths are to be branched, the optical coupler 114 superimposes the SV signals on the first optical signals. These optical signals are returned to the optical fiber 60f by the optical switch 101A. As in the case of a normal time, the returned optical signals are subjected to processing each performed by the units 102 to 104. Then, in the linear ADM unit 105A, all the optical signals are branched and then received. A thick line in FIG. 16 indicates the flow of all these received optical signals.

On the other hand, the second optical signals are inputted from the optical fiber 60f. Then, the optical coupler 23A branches these optical signals to the second optical ADM unit 1D side. The distribution compensator 25A compensates for the optical signals. The distribution compensated optical signals are passed through the optical switch 101B. Then, in the SVOR 103, the SV signals are read from the received optical signals partially branched by the optical coupler 102. Then, whether branching/insertion is to be performed or not for these optical second optical signals is detected.

As a result, if no branching/insertion is to be performed, these second optical signals are returned to the optical fiber 60g side by the optical switch 101B. The optical amplifier 116 amplifies these returned optical signals. The amplified optical signals are passed through the gain equalizer 119B and the optical coupler 32A and then outputted from the optical fiber 60g.

If branching/insertion is to be performed only for the optical signals of some specified wavelengths, the second optical signals are passed through the optical switch 101B. Then, as in the case of a normal time, in the linear ADM unit 105B, these second optical signals are subjected to branching/insertion. The optical coupler 106 superimposes the SV signals on these optical signals. The optical signals are then returned to the optical fiber 60g side by the optical switch 108B. The optical signals are passed through the optical couplers 112 and 114, the optical switch 101B, the optical amplifier 116, the gain equalizer 119B and the optical coupler 32A and then outputted from the optical fiber 60g.

If the optical signals of all the wavelengths are to be branched, as in the case of a normal time, the optical signals are subjected to processing each performed by the optical coupler 102, the SVOR 103 and the amplifier 104. Then, in the linear ADM unit 105B, all the optical signals are branched and received.

In other words, if communications are cut off between the bi-directional communication optical transmission devices 63 and 63A, the optical communications are performed by using the normal-time optical fiber 60f and the emergency optical fiber 60g.

Figure 17:
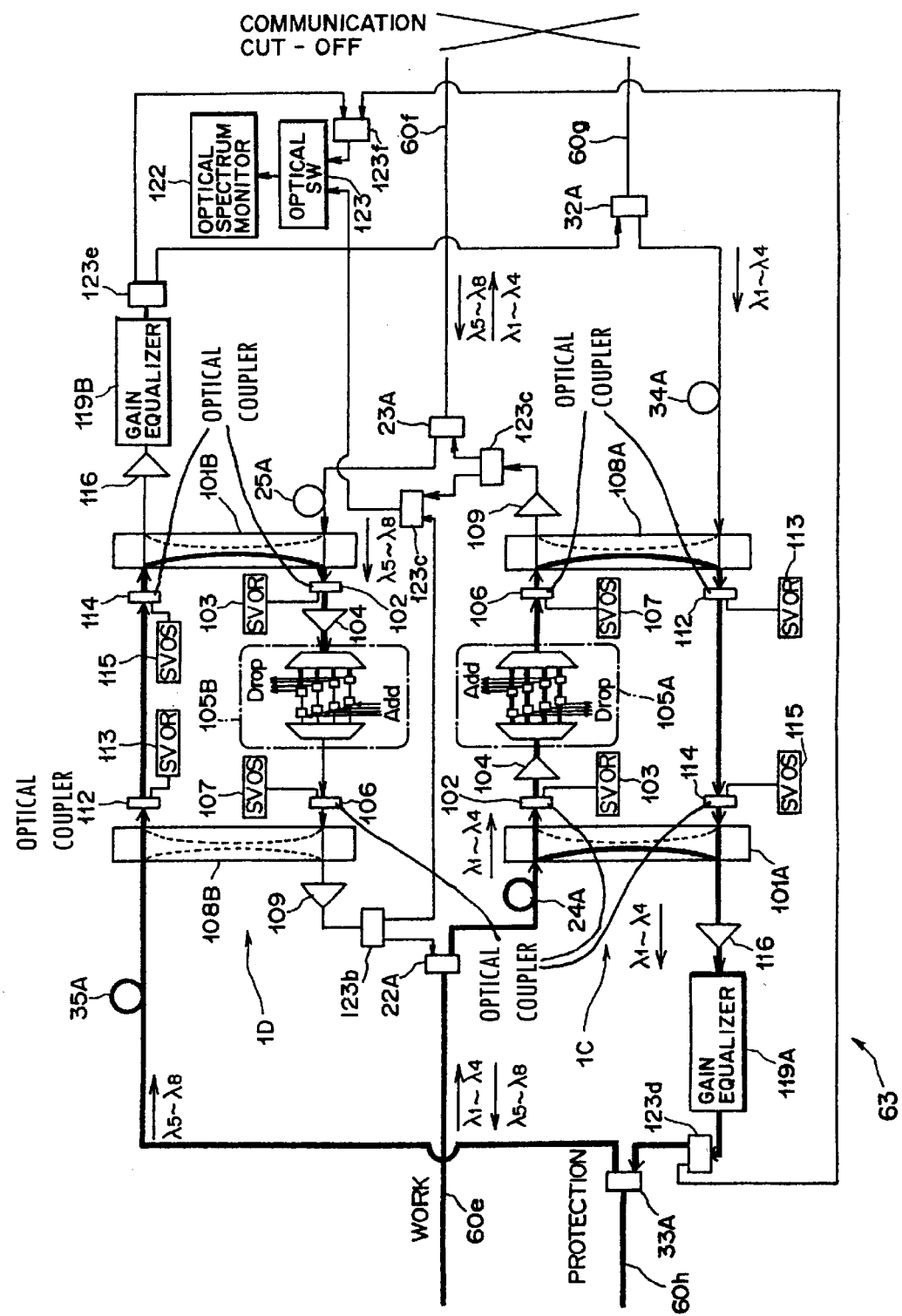
FIG. 17 is a view illustrating an emergency operation of the optical transmission device used for bi-directional optical communications according to the second embodiment of the present invention.

(d3) If a Failure Occurs in the Vicinity of the Output Side of the Normal-time Transmission Lines This section describes, by referring to FIG. 17, the operation of the bi-directional communication optical transmission device 63 when communications are cut off because of the occurrence of a failure between the bi-directional communication optical transmission device 63 shown in FIG. 14 and an adjacent bi-directional communication optical transmission device (not shown; 63B) connected to the optical fibers 60g and 60f thereof.

In this case, the first optical signals are inputted from the optical fiber 60e. The optical coupler 22A branches the inputted optical signals to the first optical ADM unit 1C side. The distribution compensator 24A compensates for the distribution of these optical signals. The distribution compensated optical signals are passed through the optical switch 101A. Then, in the SVOR 103, the SV signals are read from the received optical signals partially branched by the optical coupler 102, and whether branching/insertion is to be performed or not for these first optical signals is detected.

As a result, if no branching/insertion is to be performed, the first optical signals are returned to the optical fiber 60h side by the optical switch 101A. The returned optical signals are then passed through the optical amplifier 116, the gain equalizer 119A and the optical coupler 33A and then outputted from the optical fiber 60h.

If branching/insertion is to be performed only for the optical signals of some specified wavelengths, the optical signals are passed through the optical switch 101A. Then, in the linear ADM unit 105A, as in the case of a normal time, these optical signals are subjected to branching/insertion. The optical coupler 106 superimposes the SV signals on the optical signals. Then, the optical signals are returned to the optical fiber 60h side by the optical switch 108A. Then, the returned optical signals are passed through the optical couplers 112 and 114, the optical switch 101A, the optical amplifier 116, the gain equalizer 119 and the optical coupler 33A and then outputted from the optical fiber 60h.

If the optical signals of all the wavelengths are to be branched, as in the case of a normal time, the optical signals are subjected to processing each performed by the optical coupler 102, the SVOR 103 and the amplifier 104. Then, in the linear ADM unit 105A, all the optical signals are branched and received.

On the other hand, the second optical signals are inputted from the optical fiber 60h rather than from the optical fiber 60f. In other words, the second optical signals are returned by the bi-directional communication optical transmission device 63B connected to the optical fibers 60f and 60g in which communications have been cut off. The returned optical signals are then passed through another bi-directional communication optical transmission device (not shown) on the network ring and inputted from the emergency optical fiber 60h of the bi-directional communication optical transmission device 63.

The second optical signals inputted from the optical fiber 60h are branched to the second optical ADM unit 1D side by the optical coupler 33A. The distribution compensator 35A then compensates for the distribution of these optical signals. The distribution compensated optical signals are passed through the optical switch 10EB. Then, in the SVOR 103, the SV signals are read from the received optical signals partially branched by the optical coupler 112, and whether branching/insertion is to be performed or not for these second optical signals is detected.

As a result, if no branching/insertion is to be performed, these second optical signals are returned to the optical fiber 60e side by the optical switch 108B. The returned optical signals are passed through the optical amplifier 109 and the optical coupler 22A and then outputted from the optical fiber 60e.

If branching/insertion is to be performed only for the optical signals of some specified wavelengths, the optical signals are passed through the optical switch 101B and subjected to processing each performed by the units 112 to 114. Then, these optical signals are returned by the optical switch 101B. Then, in the linear ADM unit 105B, as in the case of a normal time, these optical signals are subjected to branching/insertion. The optical coupler 106 superimposes the SV signals on the optical signals. The optical signals are passed through the optical switch 108B. The optical signals are also passed through the optical amplifier 109 and the optical coupler 22A and then outputted from the optical fiber 60e.

If the optical signals of all the wavelengths are to be branched, the optical coupler 114 superimposes the SV signals on the optical signals. These optical signals are returned to the optical fiber 60e side by the optical switch 101B. Then, as in the case of a normal time, the optical signals are subjected to processing each performed by the units 102 to 104. Then, in the linear ADM unit 105B, all the optical signals are branched and received. A thick line in FIG. 17 indicates the flow of all these received optical signals.

In other words, if communications are cut off between the bi-directional communication optical transmission devices E3 and 63B, the optical communications are performed by using the normal-time optical fiber 60e and the emergency optical fiber 60h.

(d4) If a Failure Occurs in Areas not in the Vicinity

Figure 18:
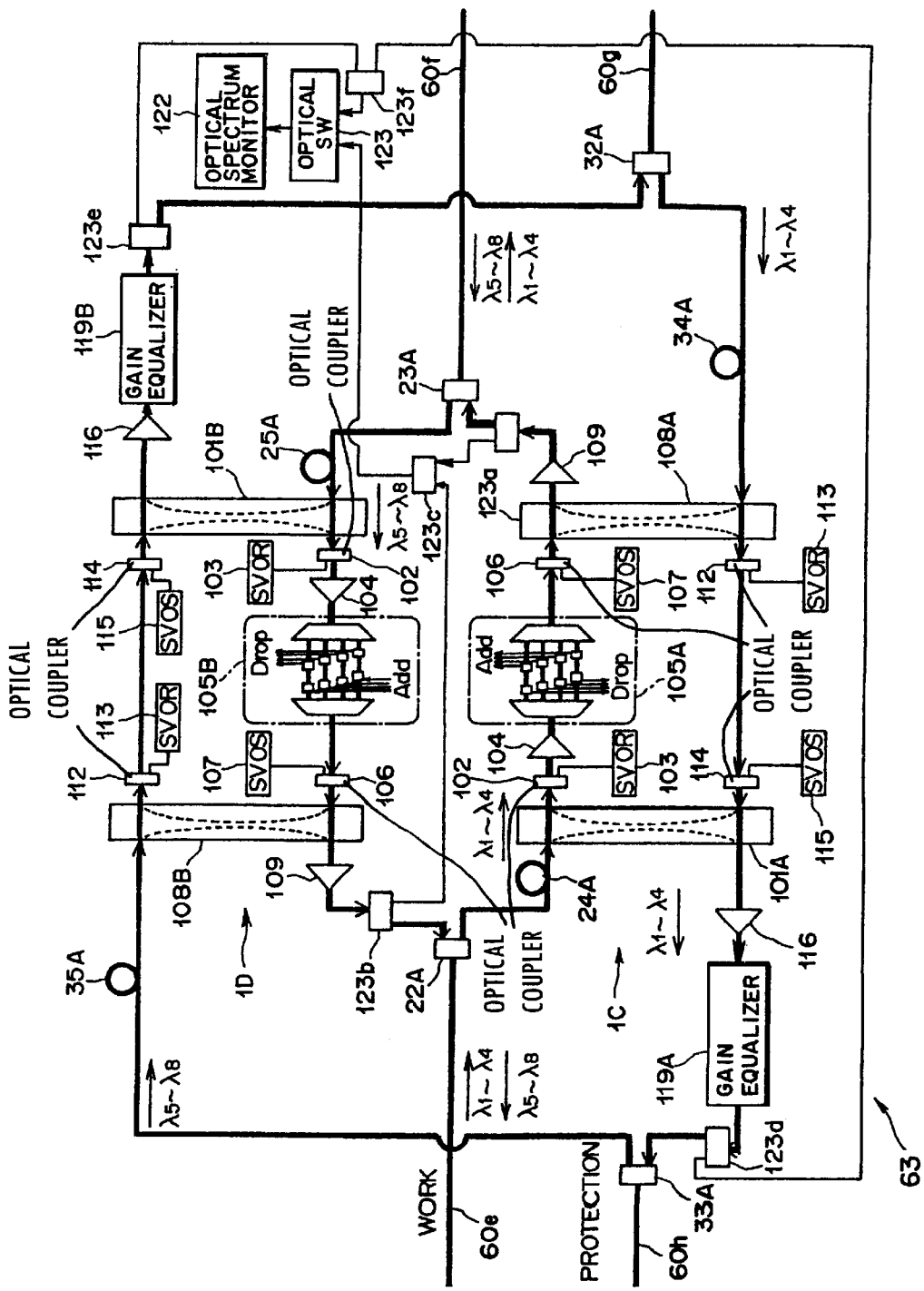
FIG. 18 is a view illustrating an emergency operation of the optical transmission device used for bi-directional optical communications according to the second embodiment of the present invention.
Figure 19:
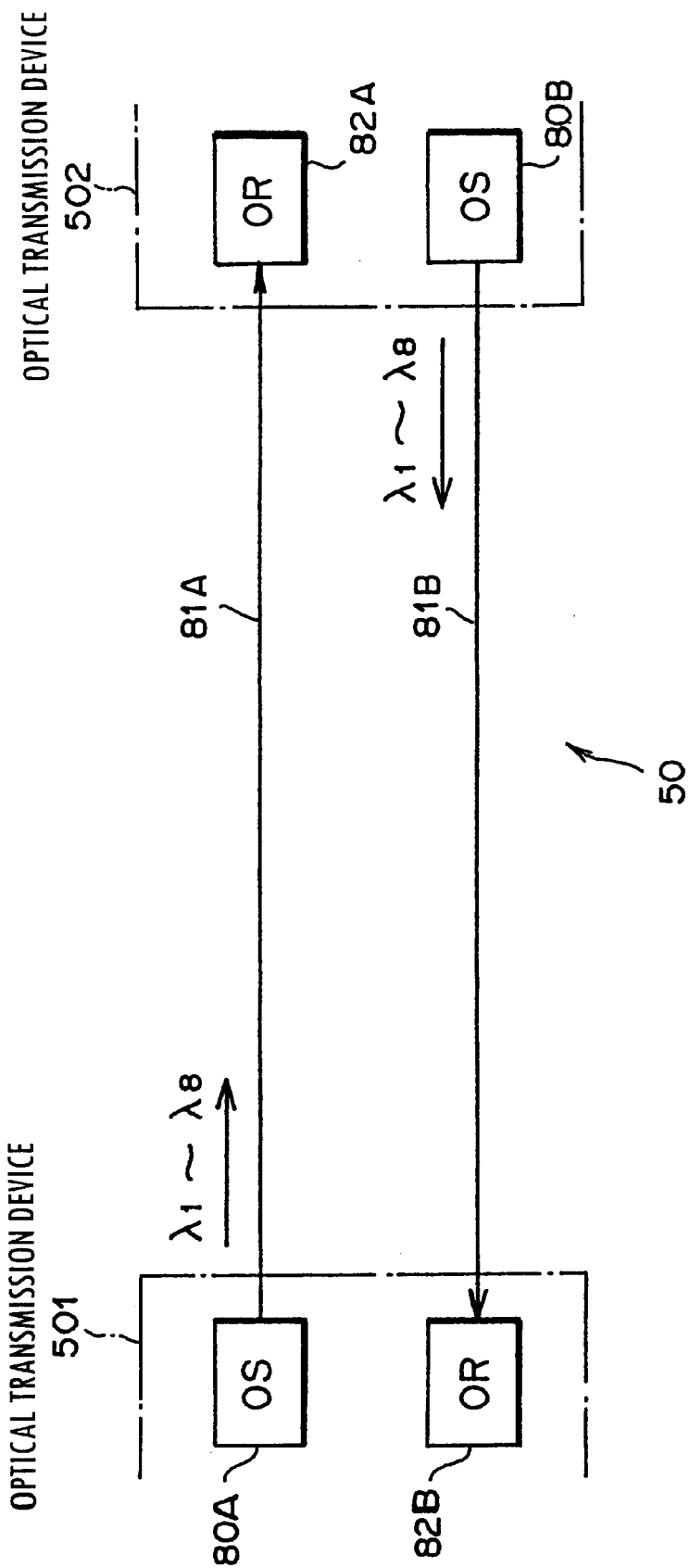
FIG. 19 is a block diagram showing a wavelength-division multiplexing communication system employing a uni-directional wavelength-division multiplexing system.

This section describes, by referring to FIG. 18, the operation of the bi-directional communication optical transmission device 63 when a failure occurs in areas other than between the foregoing bi-directional communication optical transmission devices 63 and 63A or the bi-directional communication optical transmission devices 63 and 63B.

If communications are cut off in certain areas, the transmitted optical signals are returned from the position in which the communications have been cut off (see FIGS. 16 and 17). Accordingly, if the bi-directional communication transmission device 63 is positioned therein, the optical signals are transmitted by using all the normal-time and emergency optical fibers 60e to 60h.

In other words, the first and second optical signals are both transmitted from two directions (sides of the bi-direction communication optical transmission devices 63A and 63B) and in two ways.

The first optical signals transmitted from the bi-directional communication optical transmission device 63A are inputted from the optical fiber 60e. Then, the optical coupler 22A branches these optical signals to the first optical ADM unit 1C side. The distribution compensator 24A compensated for the distribution of the optical signals. The distribution compensated optical signals are then subjected to specified optical transmission processing including branching/insertion each performed by the units 101A to 109. In this case, the optical signals are passed through the optical switches 101A and 108A. These first optical signals are passed through the optical coupler 23A and then outputted from the optical fiber 60f.

On the other hand, the first optical signals transmitted from the bi-directional communication optical transmission device 63B are inputted from the optical fiber 60g. These first optical signals are then branched to the first optical ADM unit 1C side by the optical coupler 32A. The distribution compensator 34A compensates for the distribution of these optical signals. The distribution compensated optical signals are then subjected to processing each performed by the units 108A to 119A, passed through the optical coupler 33A and then outputted from the optical fiber 60h. In this case, the optical signals are passed through the optical switches 108A and 101A.

In other words, since branching/insertion for the first optical signals is performed while these optical signals are being transmitted from the bi-directional communication optical transmission device 63A through the normal-time optical fibers 60e and 60f, when the first optical signals are transmitted from the bi-directional communication optical transmission device 63B, these optical signals are simply passed. Thus, in the optical fibers 60g and 60h, distribution compensation is performed, the SV signals are read/written and then the optical signals are amplified and outputted.

The second optical signals transmitted from the bi-directional communication optical transmission device 63B are inputted from the optical fiber 60f. The optical coupler 23A then branches these second optical signals to the second optical ADM unit 1D side. The distribution compensator 25A compensated for the distribution of these optical signals. The distribution compensated optical signals are subjected to specified optical transmission processing including branching/insertion each performed by the units 101B to 109. In this case, the optical signals are passed through the optical switches 101B and 108B. Then, these second optical signals are passed through the optical coupler 22A and outputted from the optical fiber 60e.

On the other hand, the second optical signals transmitted from the bi-directional communication optical transmission device 63A are inputted through the optical fiber 60h. Then, the optical coupler 33A branches these second optical signals to the second optical ADM unit 1D side. The distribution compensator 35A compensates for the distribution of these optical signals. The distribution compensated optical signals are subjected to processing each performed by the units 108B to 119B, passed through the optical fiber 32A and then outputted from the optical fiber 60g. In this case, the optical signals are passed through the optical switches 108B and 101B.

In other words, since branching/insertion for the second optical signals are performed while these optical signals are being transmitted from the bi-directional communication optical transmission device 63B through the optical fibers 60e and 60f, when the second optical signals are transmitted from the bi-directional communication optical transmission device 63A, these optical signals are simply passed. Thus, also in this case, in the optical fibers 60g and 60h, distribution compensation is performed, the SV signals are read/written and the optical signals are amplified and outputted.

When the optical signals are transmitted through the normal-time optical fibers 60e and 60f, processing like that performed at a normal time is performed. When the optical signals are transmitted through the emergency optical fibers 60g and 60h, these optical signals are passed through without performing any switching operations.

As apparent from the foregoing, the bi-directional communication optical transmission device 63 is advantageous in that since optical signals transmitted from two directions are individually processed, the number of optical signals to be processed can be reduced and a speed for specified optical transmission processing performed in each of the optical ADM units 1C and 1D can be increased.

Since first and second optical signals transmitted at a normal time and first and second optical signals transmitted in an emergency are all subjected to distribution compensation, the necessity of keeping constant distances among the nodes (distance between optical ADM) can be eliminated. Accordingly, the degree of flexibility for constructing an optical communication network can be increased.

Since the spectral states of first and second optical signals transmitted at a normal time and first and second optical signals transmitted in an emergency are batch-monitored by one optical spectrum monitor 122, the circuitry can be reduced in size and costs.

The bi-directional communication optical transmission device 63 is also advantageous in that since in the first and second optical ADM units 1C and 1D, branching/insertion is performed for optical signals by wavelength units, signals carrying information regarding first and second optical signals can be individually processed in optical states and the processing speed of the optical transmission device 63 can be increased.

Since optical signals can also be branched/inserted by using the AOTF 7, the degree of flexibility for system construction can be increased.

Furthermore, since in the first and second optical ADM units 1C and 1D, the signals levels of optical signals returned in an emergency are kept constant, wavelength variance among optical signals can be surely eliminated. Accordingly, highly accurate optical signals can be transmitted.

(e) Others

It should be understood that the present invention is not limited to the foregoing embodiments, and various modifications and changes can be made without departing from the spirit and scope of the invention.

What is claimed is:

1. An optical transmission device for transmitting first and second optical signals having different wavelengths and traveling in opposite directions through a bi-directional optical communications network, said optical transmission device comprising:
    a uni-directional optical signal processing unit, shared by said first and second optical signals and having an input port and an output port, for processing optical signals received at said input port and then outputting a processed optical signal from said output port; and
    a uni-direction/bi-direction changing unit, operatively connected to the input and output ports of said processing unit, for directing both the first and second optical signals to said input port, whereby the first and second optical signals travel in opposite directions through the network but travel in the same direction from the changing unit to the processing unit.

2. An optical transmission device as claimed in claim 1, wherein
    said uni-direction/bi-direction changing unit forwards said first optical signals received from a first bi-directional communication optical transmission path of the network and said second optical signals received from a second bi-directional communication optical transmission path of the network to said unidirectional optical signal processing unit, and
    said unidirectional optical signal processing unit outputs said forwarded first optical signals to the second bi-directional communication optical transmission path and said forwarded second optical signals to said first bi-directional communication optical transmission path.

3. An optical transmission device as claimed in claim 2, wherein said uni-direction/bi-direction changing unit includes,
    an optical wavelength multiplexing unit, operatively connected with said unidirectional optical signal processing unit, for multiplexing said first optical signals and said second optical signals and outputting the multiplexed optical signals to said uni-directional optical signal processing unit,
    an optical wavelength demultiplexing unit, operatively connected with said unidirectional optical signal processing unit, for demultiplexing the multiplexed optical signals, which is processed by said uni-directional optical signal processing unit, to said first and second optical signals,
    a first optical signal branching unit for routing said first optical signals, which is received from the first bi-directional communication optical transmission path, to said optical wavelength multiplexing unit and routing said second optical signals, which is demultiplexed by said optical wavelength demultiplexing unit, to the first bi-directional communication optical transmission path, and
    a second optical signal branching unit for routing said second optical signals, which is received from said second bi-directional communication optical transmission path, to said optical wavelength multiplexing unit and routing said first optical signals, which is obtained by demultiplexing demultiplexed by said optical wavelength demultiplexing unit, to said second bi-directional communication optical transmission path.

4. An optical transmission device as claimed in claim 3, wherein said optical wavelength multiplexing and demultiplexing units are respectively constructed as wavelength-division multiplexing/demultiplexing type optical couplers.

5. An optical transmission device as claimed in claim 3, wherein said first and second optical signal branching units are respectively constructed as optical circulators.

6. An optical transmission device as claimed in claim 3, wherein said first and second optical signal branching units are respectively constructed as wavelength-division multiplexing/demultiplexing type optical couplers.

7. An optical transmission device as claimed in claim 4, wherein said first and second optical signal branching units are respectively constructed as optical circulators.

8. An optical transmission device as claimed in claim 4, wherein said first and second optical signal branching units are respectively constructed as wavelength-division multiplexing/demultiplexing type optical couplers.

9. An optical transmission device as claimed in claim 2, wherein
    said uni-direction/bi-direction changing unit is a wavelength-division multiplexing/demultiplexing type optical coupler including,
        a first I/O port operatively connected to said first bi-direction communication optical transmission path,
        a second I/O port operatively connected to said second bi-direction communication optical transmission path,
        a third I/O port operatively connected to an input port of said uni-directional optical signal processing unit, and
        a fourth I/O port operatively connected to an output port of said unidirectional optical signal processing unit,
    said wavelength-division multiplexing/demultiplexing type optical coupler multiplexes wavelengths of the first optical signals received via said first I/O port and wavelengths of second optical signals received via said second I/O port and then outputs said wavelength-multiplexed optical signals to said third I/O port,
    said wavelength-division multiplexing/demultiplexing type optical coupler demultiplexes the multiplexed optical signals, which is processed by said uni-directional optical signal processing unit and received via said fourth I/O port, to said first and second optical signals and outputs said first optical signals to said second I/O port and second optical signals to said first I/O port.

10. An optical transmission device as claimed in claim 1, wherein said uni-directional optical signal processing unit includes a batch distribution compensating unit for batch-compensating for distributions of said first and second optical signals flow-unified in a single direction by said uni-direction/bi-direction changing unit.

11. An optical transmission device as claimed in claim 1, wherein said uni-direction/bi-direction changing units includes an individual distribution compensating unit for individually compensating for distributions of said clockwise and counterclockwise optical signals.

12. An optical transmission device as claimed in claim 11, wherein said individual distribution compensating unit includes a first distribution compensator for compensating distribution of said clockwise optical signals before said clockwise and counterclockwise optical signals are flow-unified in a single direction and a second distribution compensator for compensating for distribution of said counterclockwise optical signals before said clockwise and counterclockwise optical signals are flow-unified in a single direction.

13. An optical transmission device as claimed in claim 1, wherein said uni-directional optical signal processing unit includes an add/drop processing unit for performing branching/insertion by wavelength units for said optical signals flow-unified in a single direction by said uni-direction/bi-direction changing unit.

14. An optical transmission device as claimed in claim 13, wherein said add/drop processing unit includes an optical wavelength demultiplexer for demultiplexing inputted optical signals by wavelength units, a plurality of branching optical switches for branching said optical signals demultiplexed by said optical wavelength demultiplexer by wavelength units, a plurality of insertion optical switches for inserting optical signals having wavelengths equal to wavelengths of said optical signals branched by said plurality of branching optical switches and an optical wavelength multiplexer for multiplexing optical signals of respective wavelengths inputted by said plurality of insertion optical switches.

15. An optical transmission device as claimed in claim 13, wherein said add drop processing unit includes an acousto-optical tunable filter for branching optical signals of desired wavelengths by impressing frequency signals equivalent to wavelengths of optical signals to be inserted and a light source for producing optical signals of wavelengths to be inserted.

16. An optical transmission device as claimed in claim 1, wherein said uni-directional optical signal processing unit includes an optical amplifier for amplifying said optical signals flow-unified in a single direction by said uni-direction/bi-direction changing unit.

17. An optical transmission device for transmitting first and second optical signals having different wavelengths and traveling in opposite directions through a bi-directional optical communications network, said optical transmission device comprising:

- a uni-directional optical signal processing unit, shared by said first and second optical signals and having an input port and an output port, for processing optical signals received at said input port and then outputting a processed optical signal from said output port; and
- a uni-direction/bi-direction changing unit, operatively connected to the input and output ports of said processing unit, for directing both the first and second optical signals to said input port, whereby the first and second optical signals travel in opposite directions through the network, but travel in the same direction from the changing unit to the processing unit,
- wherein said uni-directional optical signal processing unit includes an optical signal level adjusting unit for keeping constant signal levels of optical signals of respective wavelengths.

18. An optical transmission device as claimed in claim 17, wherein said optical signal level adjusting unit includes a plurality of optical attenuators for adjusting attenuation degrees of said optical signals by wavelength units.

19. An optical transmission device for transmitting first and second optical signals having different wavelengths and traveling in opposite directions through a bi-directional optical communications network, said optical transmission device comprising:

- a uni-directional optical signal processing unit, shared by said first and second optical signals and having an input port and an output port, for processing optical signals received at said input port and then outputting a processed optical signal from said output port; and
- a uni-direction/bi-direction changing unit, operatively connected to the input and output ports of said processing unit, for directing both the first and second optical signals to said input port, whereby the first and second optical signals travel in opposite directions through the network, but travel in the same direction from the changing unit to the processing unit,
- wherein said uni-directional optical signal processing unit includes a spectrum monitoring unit for monitoring spectral states of processed optical signals flow-unified in a single direction by said uni-direction/bi-direction changing unit.

20. An optical transmission device for transmitting first and second optical signals having different wavelengths and traveling in opposite directions through a bi-directional optical communications network, said optical transmission device comprising:

- a uni-directional optical signal processing unit, shared by said first and second optical signals and having an input port and an output port, for processing optical signals received at said input port and then outputting a processed optical signal from said output port;
- a uni-direction/bi-direction changing unit, operatively connected to the input and output ports of said processing unit, for directing both the first and second optical signals to said input port, whereby the first and second optical signals travel in opposite directions through the network, but travel in the same direction from the changing unit to the processing unit;
- an emergency bi-directional communication optical transmission path for substitutively communicating for the bi-directional optical communications network in such a emergency case that the bi-directional optical communications network is not usable; and
- an emergency uni-direction/bi-direction changing unit, operatively connected to the input and output ports of said processing unit, for directing, in the emergency case, both of first and second optical signals to said input port, whereby the first and second optical signals travel in opposite directions through said emergency bi-directional communication optical transmission path, but travel in the same direction from the changing unit to the processing unit.

21. An optical transmission device as claimed in claim 20, wherein

- the emergency bi-directional communication optical transmission path comprises first and second emergency bi-directional communication optical transmission paths, and
- said emergency uni-direction/bi-direction changing unit forwards, in case of the emergency, said first optical signals, which are received from the first emergency bi-directional communication optical transmission path, and said second optical signals, which are received from the second emergency bi-directional communication optical transmission path, to said input port of said uni-directional optical signal processing unit, and outputs said first optical signals to said second emergency bi-directional communication optical transmission path and said second optical signals to said first emergency bi-directional communication optical transmission path.

22. An optical transmission device as claimed in claim 20, wherein

- the emergency bi-directional communication optical transmission path comprises first and second emergency bi-directional communication optical transmission paths, said unidirectional optical signal processing unit includes a uni-directional returning optical switch for returning said first and second optical signals inputted from said uni-direction/bi-direction changing unit to said emergency bi-directional communication optical transmission paths, and said emergency uni-direction/bi-direction changing unit forwards said first optical signals returned by said uni-directional returning optical switch to said second emergency bi-directional communication optical transmission path and said second optical signals returned by said unidirectional returning optical switch to said first emergency bi-directional communication optical transmission path.

23. An optical transmission device as claimed in claim 21, wherein said emergency uni-direction/bi-direction changing unit comprises:

an emergency optical wavelength multiplexing unit to multiplex said first and second optical signals received from the first and second emergency bi-directional communication optical transmission paths and to output multiplexed optical signals to said unidirectional optical signal processing unit;

an emergency optical wavelength demultiplexing unit to demultiplex optical signals from said uni-directional optical signal processing unit into first and second optical signals;

a first emergency optical signal branching unit to branch said first optical signals from the first emergency bi-directional communication optical transmission path to said emergency optical wavelength multiplexing unit and to supply the second optical signals demultiplexed by said emergency optical wavelength demultiplexing unit to the first emergency bi-directional communication optical transmission path; and a second emergency optical signal branching unit to branch the second optical signals from the second emergency bi-directional communication optical transmission path to said emergency optical wavelength multiplexing unit and to supply the first optical signals demultiplexed by said emergency optical wavelength demultiplexing unit to second emergency bi-directional communication optical transmission path.

24. An optical transmission device as claimed in claim 21, wherein said emergency uni-direction/bi-direction changing unit is constructed as a wavelength-division multiplexing/demultiplexing type optical coupler including a first emergency I/O port connected to said first emergency bi-directional communication optical transmission path, a second emergency I/O port connected to said second emergency bi-directional communication optical transmission path, a third emergency I/O port connected to said input port of said unidirectional optical signal processing unit and a fourth emergency I/O port connected to said output port of said unidirectional optical signal processing unit, said wavelength-division multiplexing/demultiplexing type optical coupler multiplexes wavelengths of first optical signals with wavelengths of second optical signals to produce multiplexed optical signals, said first optical signals being inputted to said first emergency I/O port and said second optical signals being inputted to said second emergency I/O port, outputs said multiplexed optical signals to said third emergency I/O port, and outputs, among optical signals inputted to said fourth emergency I/O port, first optical signals to said second emergency I/O port and second optical signals to said first emergency I/O port.

25. An optical transmission device as claimed in claim 23, wherein said emergency optical wavelength multiplexing and demultiplexing units are respectively constructed as wavelength-division multiplexing/demultiplexing type optical couplers.

26. An optical transmission device as claimed in claim 23, wherein said first and second emergency optical signal branching units are respectively constructed as optical circulators.

27. An optical transmission device as claimed in claim 23, wherein said first and second emergency optical signal branching units are respectively constructed as wavelength-division multiplexing/demultiplexing type optical couplers.

28. An optical transmission device as claimed in claim 25, wherein said first and second emergency optical signal branching units are respectively constructed as optical circulators.

29. An optical transmission device as claimed in claim 25, wherein said first and second emergency optical signal branching units are each constructed as wavelength-division multiplexing/demultiplexing type optical couplers.

30. An optical transmission device for transmitting first and second optical signals having different wavelengths and traveling in opposite directions through a bi-directional optical communications network, said optical transmission device comprising:

a uni-directional optical signal processing unit, shared by said first and second optical signals and having an input port and an output port, for processing optical signals received at said input port and then outputting a processed optical signal from said output port; and a uni-direction/bi-direction changing unit, operatively connected to the input and output ports of said processing unit, for directing both the first and second optical signals to said input port, whereby the first and second optical signals travel in opposite directions through the network, but travel in the same direction from the changing unit to the processing unit, wherein said uni-directional optical signal processing unit includes an emergency optical signal level adjusting unit for keeping constant signal levels of optical signals of respective wavelengths returned by said uni-directional returning optical switch in said emergency.

31. An optical transmission device as claimed in claim 30, wherein said emergency optical signal level adjusting unit is constructed as a gain equalizer for adjusting gains of said optical signals by wavelength units.

32. An optical transmission device for transmitting first and second optical signals of different wavelengths, the first and second optical signals traveling in first and second opposite directions through a bi-directional optical communications network having first and second transmission lines, said optical transmission device comprising:

a first optical signal processing unit to process the first optical signals;

a second optical signal processing unit to process the second optical signals;

a first branching unit for branching optical signals to and from the first transmission line, to input first optical signals from the first transmission line to the first optical signal processing unit and to output second optical signals from the second optical signal processing unit to the first transmission line;

a second branching unit for branching optical signals to and from the second transmission line, to input second optical signals from the second transmission line to the second optical signal processing unit and to output first optical signals from the first optical signal processing unit to the second transmission line; and first and second emergency bi-directional communication optical transmission lines for transmitting, in an emergency when bi-directional communications over said first and second transmission lines are impossible, the first and second optical signals, wherein
said first optical signal processing unit includes a first returning optical switch for returning, when bi-directional communications over the second transmission line are impossible, the first optical signals inputted from said first transmission line to the second emergency bi-directional communication optical transmission line, and said second optical signal processing unit includes a second returning optical switch for returning, when bi-directional communications over the first transmission line are impossible, the second optical signals inputted from said second transmission line to the the first emergency bi-directional communication optical transmission line.

33. An optical transmission device as claimed in claim 32, further comprising:

a third branching unit for branching the first optical signals returned by another optical transmission device and inputted through said first emergency bi-directional communication optical transmission line in said emergency to said first optical signal processing unit and second optical signals from said second optical signal processing unit to said first emergency bi-directional communication optical transmission line in said emergency, and a fourth branching unit for branching second optical signals returned by said another optical transmission device and inputted through said second emergency bi-directional optical transmission line in said emergency to said second optical signal processing unit and first optical signals from said first optical signal processing unit to said second emergency bi-directional optical transmission line in said emergency.

34. An optical transmission device as claimed in claim 33, wherein said first optical signal processing unit includes a third distribution compensator for compensating for distribution of said first optical signals inputted through said first transmission line, and said second optical signal processing unit includes a fourth distribution compensator for compensating for distribution of said second optical signals inputted through said second transmission line.

35. An optical transmission device as claimed in claim 33, wherein said first optical signal processing unit includes a fifth distribution compensator for compensating for distribution of said first optical signals returned by said another optical transmission device and inputted through said first emergency bi-directional communication optical transmission line in said emergency, and said second optical signal processing unit includes a sixth distribution compensator for compensating for distribution of said second optical signals returned by said another optical transmission device and inputted through said second emergency bi-directional communication optical transmission line in said emergency.

36. An optical transmission device as claimed in claim 33, wherein said first optical signal processing unit includes a third distribution compensator for compensating for distribution of said first optical signals inputted through said first transmission line and a fifth distribution compensator for compensating for distribution of said first optical signals returned by said another optical transmission device and inputted through said first emergency bi-directional communication optical transmission line in said emergency, and said second optical signal processing unit includes a fourth distribution compensator for compensating for distribution of said second optical signals inputted through said second transmission line and a sixth distribution compensator for compensating for distribution of said second optical signals returned by said another optical transmission device and inputted through said second emergency bi-directional communication optical transmission line in said emergency.

37. An optical transmission device as claimed in claim 32, wherein said first optical signal processing unit includes a third distribution compensator for compensating for distribution of said first optical signals inputted through said first transmission line, and said second optical signal processing unit includes a fourth distribution compensator for compensating for distribution of said second optical signals inputted through said second transmission line.

38. An optical transmission device as claimed in claim 32, further comprising a spectrum monitoring unit for monitoring spectral states of said first and second optical signals respectively processed by said first and second optical signal processing units at a normal time and said first and second optical signals respectively processed by said first and second optical signal processing units in said emergency.

39. An optical transmission device as claimed in claim 38, wherein said spectrum monitoring unit alternately monitors spectral states of said normal time optical signals and spectral states of said emergency optical signals at specified cycles.

40. An optical transmission device as claimed in claim 32, wherein said first and second optical signal processing units each include an optical signal level adjusting unit for keeping constant signal levels of optical signals of respective wavelengths.

41. An optical transmission device as claimed in claim 40, wherein said optical signal level adjusting unit includes a plurality of optical attenuators for adjusting attenuation degrees of said optical signals by wavelength units.

42. An optical transmission device as claimed in claim 32, wherein said first and second optical signal processing units each include an emergency optical signal level adjusting unit for keeping constant signal levels of optical signals of respective wavelengths returned to said emergency bi-directional communication optical transmission lines by said first and second returning optical switches in said emergency.

43. An optical transmission device as claimed in claim 42, wherein said emergency optical signal level adjusting unit is constructed as a gain equalizer for adjusting gains of said optical signals by wavelength units.

44. An optical transmission device for transmitting first and second optical signals of different wavelengths the first and second optical signals traveling in first and second opposite directions through a bi-directional optical communications network having first and second transmission lines, said optical transmission device comprising:

a first optical signal processing unit to process the first optical signals;

a second optical signal processing unit to process the second optical signals;

a first branching unit for branching optical signals to and from the first transmission line, to input first optical signals from the first transmission line to the first optical signal processing unit and to output second optical signals from the second optical signal processing unit to the first transmission line;

a second branching unit for branching optical signals to and from the second transmission line, to input second optical signals from the second transmission line to the second optical signal processing unit and to output first optical signals from the first optical signal processing unit to the second transmission line; and a spectrum monitoring unit for monitoring spectral states of said clockwise and counterclockwise optical signals respectively processed by said first and second optical signal processing units at a normal time and said clockwise and counterclockwise optical signals respectively processed by said first and second optical signal processing units in said emergency.

45. An optical transmission device as claimed in claim 44, wherein said spectrum monitoring unit alternately monitors spectral states of said normal time optical signals and spectral states of said emergency optical signals at specified cycles.

46. An optical transmission device for transmitting first and second optical signals of different wavelengths, the first and second optical signals traveling in first and second opposite directions through a bi-directional optical communications network having first and second transmission lines, said optical transmission device comprising:

a first optical signal processing unit to process the first optical signals;

a second optical signal processing unit to process the second optical signals;

a first branching unit for branching optical signals to and from the first transmission line, to input first optical signals from the first transmission line to the first optical signal processing unit and to output second optical signals from the second optical signal processing unit to the first transmission line; and a second branching unit for branching optical signals to and from the second transmission line, to input second optical signals from the second transmission line to the second optical signal processing unit and to output first optical signals from the first optical signal processing unit to the second transmission line, wherein said first and second optical signal processing units each include an add/drop processing unit for performing branching/insertion for inputted optical signals by wavelength units.

47. An optical transmission device as claimed in claim 46, wherein said add,'drop processing unit includes an optical wavelength demultiplexer for demultiplexing said inputted optical signals by wavelength units, a plurality of branching optical switches for branching said optical signals of respective wavelengths demultiplexed by said optical wavelength demultiplexer by wavelength units, a plurality of insertion optical switches for inserting optical signals having wavelengths equal to wavelengths of said optical signals branched by said plurality of branching optical switches, and an optical wavelength multiplexer for multiplexing said optical signals of respective wavelengths inputted by said plurality of insertion optical switches.

48. An optical transmission device as claimed in claim 46, wherein said add/drop processing unit includes an acousto-optical tunable filter for branching optical signals of desired wavelengths by impressing frequency signals equivalent to wavelengths of said optical signals to be branched and a light source for producing optical signals of wavelengths to be inserted.

49. An optical transmission device for transmitting first and second optical signals of different wavelengths the first and second optical signals traveling in first and second opposite directions through a bi-directional optical communications network having first and second transmission lines, said optical transmission device comprising:

a first optical signal processing unit to process the first optical signals;

a second optical signal processing unit to process the second optical signals;

a first branching unit for branching optical signals to and from the first transmission line, to input first optical signals from the first transmission line to the first optical signal processing unit and to output second optical signals from the second optical signal processing unit to the first transmission line; and a second branching unit for branching optical signals to and from the second transmission line, to input second optical signals from the second transmission line to the second optical signal processing unit and to output first optical signals from the first optical signal processing unit to the second transmission line, wherein said first and second optical signal processing units each include an optical signal level adjusting unit for keeping constant signal levels of optical signals of respective wavelengths.

50. An optical transmission device as claimed in claim 49, wherein said optical signal level adjusting unit includes a plurality of optical attenuators for adjusting attenuation degrees of said optical signals by wavelength units.

51. An optical transmission device as claimed in claim 49, wherein said first and second optical signal processing units each include an optical amplifier for amplifying inputted optical signals.

52. An optical transmission device as claimed in claim 49, wherein said first and second optical signal processing units each include an emergency optical signal level adjusting unit for keeping constant signal levels of optical signals of respective wavelengths returned to said emergency bi-directional communication optical transmission lines by said first and second returning optical switches in said emergency.

53. An optical transmission device as claimed in claim 49, wherein said first and second optical signal processing units each include an add/drop processing unit for performing branching/insertion for inputted optical signals by wavelength units.

54. An optical transmission device for transmitting first and second optical signals of different wavelengths, the first and second optical signals traveling in first and second opposite directions through a bi-directional optical communications network having first and second transmission lines, said optical transmission device comprising:

a first optical signal processing unit to process the first optical signals;

a second optical signal processing unit to process the second optical signals;

a first branching unit for branching optical signals to and from the first transmission line, to input first optical signals from the first transmission line to the first optical signal processing unit and to output second optical signals from the second optical signal processing unit to the first transmission line; and a second branching unit for branching optical signals to and from the second transmission line, to input second optical signals from the second transmission line to the second optical signal processing unit and to output first optical signals from the first optical signal processing unit to the second transmission line, wherein said first and second optical signal processing units each include an optical amplifier for amplifying inputted optical signals.

55. An optical transmission device for transmitting first and second optical signals of different wavelengths, the first and second optical signals traveling in first and second opposite directions through a bi-directional optical communications network having first and second transmission lines, said optical transmission device comprising:

a first optical signal processing unit to process the first optical signals;

a second optical signal processing unit to process the second optical signals;

a first branching unit for branching optical signals to and from the first transmission line, to input first optical signals from the first transmission line to the first optical signal processing unit and to output second optical signals from the second optical signal processing unit to the first transmission line; and a second branching unit for branching optical signals to and from the second transmission line, to input second optical signals from the second transmission line to the second optical signal processing unit and to output first optical signals from the first optical signal processing unit to the second transmission line, wherein said first and second optical signal processing units each includes an emergency optical signal level adjusting unit for keeping constant signal levels of optical signals of respective wavelengths returned to said emergency bi-directional optical communication optical transmission lines by said first and second returning optical switches in said emergency.

56. An optical transmission device as claimed in claim 55, wherein said emergency optical signal level adjusting unit is constructed as a gain equalizer for adjusting gains of said optical signals by wavelength units.

57. An optical transmission device as claimed in claim 55, wherein said first and second optical signal processing units each include an add/drop processing unit for performing branching/insertion for inputted optical signals by wavelength units.

58. An optical transmission device as claimed in claim 55, wherein said first and second optical signal processing units each include an optical signal level adjusting unit for keeping constant signal levels of optical signals of respective wavelengths.

59. An optical transmission device as claimed in claim 55, wherein said first and second optical signal processing unit each includes an optical amplifier for amplifying inputted optical signals.

* * * * *